United States Patent
Park et al.

(10) Patent No.: US 8,547,896 B2
(45) Date of Patent: Oct. 1, 2013

(54) SIGNAL TRANSMITTING/RECEIVING METHOD FOR A RELAY NODE AND RELAY NODE USING THE METHOD

(75) Inventors: Kyu Jin Park, Anyang-si (KR); Jae Hoon Chung, Anyang-si (KR); Han Gyu Cho, Anyang-si (KR); Yeong Hyeon Kwon, Anyang-si (KR); Min Seok Noh, Anyang-si (KR); Moon Il Lee, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/202,034

(22) PCT Filed: Feb. 18, 2010

(86) PCT No.: PCT/KR2010/001020
§ 371 (c)(1),
(2), (4) Date: Oct. 28, 2011

(87) PCT Pub. No.: WO2010/095871
PCT Pub. Date: Aug. 26, 2010

(65) Prior Publication Data
US 2012/0039239 A1 Feb. 16, 2012

Related U.S. Application Data

(60) Provisional application No. 61/153,631, filed on Feb. 18, 2009, provisional application No. 61/154,769, filed on Feb. 24, 2009, provisional application No. 61/180,418, filed on May 21, 2009, provisional application No. 61/227,438, filed on Jul. 22, 2009, provisional application No. 61/235,706, filed on Aug. 21, 2009, provisional application No. 61/250,005, filed on Oct. 9, 2009.

(30) Foreign Application Priority Data

Feb. 18, 2010 (KR) .................... 10-2010-0014760

(51) Int. Cl.
*H04B 7/14* (2006.01)
*H04W 72/04* (2009.01)
*H04J 11/00* (2006.01)

(52) U.S. Cl.
USPC ........... 370/315; 370/329; 370/344; 370/281; 370/252; 370/208; 455/450

(58) Field of Classification Search
USPC ............... 370/203, 208, 210, 315, 328, 338, 370/329, 280, 294–295, 335–336, 342–343, 370/464, 479, 480, 344–345; 455/11.1, 450
See application file for complete search history.

(56) References Cited

U.S. PATENT DOCUMENTS 8,031,688 B2 * 10/2011 Papasakellariou et al. ... 370/344
8,031,698 B2 * 10/2011 Neyman ........................ 370/352

(Continued)

FOREIGN PATENT DOCUMENTS

EP 1916782 A1 4/2008

*Primary Examiner* — Candal Elpenord
(74) *Attorney, Agent, or Firm* — Birch, Stewart, Kolasch & Birch, LLP

(57) ABSTRACT

Disclosed is a method in which a relay node transmits/receives signals via a specific downlink subframe and a specific uplink subframe. The relay node may consider the propagation delay in accordance with the distance between a base station and the relay node to set a subframe timing for transmitting/receiving signals to/from the base station. The relay node may further consider the delay time of 0.5 symbol, 1 symbol or the like in addition to said propagation delay in the event of setting a downlink receiving timing. Setting an uplink subframe timing of the relay node can be divided into the event the timing is set on the basis of a backhaul link and the event the timing is set on the basis of an access link. In the event the timing is set on the basis of the access link, the propagation delay can be double that of the event the timing is set on the basis of the backhaul link, which should be considered in setting the timing.

11 Claims, 50 Drawing Sheets

(56) References Cited

U.S. PATENT DOCUMENTS

| | | | |
|---|---|---|---|
| 8,040,830 B2* | 10/2011 | Son et al. ................... 370/315 |
| 8,169,950 B2* | 5/2012 | Shen et al. .................. 370/328 |
| 8,391,201 B2* | 3/2013 | Khayrallah et al. ......... 370/315 |
| 2009/0225706 A1* | 9/2009 | Ramachandran et al. .... 370/329 |
| 2010/0080139 A1* | 4/2010 | Palanki et al. ............... 370/252 |
| 2010/0177807 A1* | 7/2010 | Zhang .......................... 375/211 |
| 2010/0275083 A1* | 10/2010 | Nam et al. ................... 714/748 |
| 2011/0170458 A1* | 7/2011 | Chen et al. ................... 370/279 |
| 2011/0243107 A1* | 10/2011 | Koivisto et al. ............. 370/336 |

* cited by examiner

SIGNAL TRANSMITTING/RECEIVING METHOD FOR A RELAY NODE AND RELAY NODE USING THE METHOD

CROSS REFERENCE TO RELATED APPLICATIONS

This application is the National Phase of PCT/KR2010/001020 filed on Feb. 18, 2010, which claims the benefit under 35 U.S.C. 119(e) of U.S. Provisional Application Nos. 61/153,631; 61/154,769; 61/180,418; 61/227,438; 61/235,706 and 61/250,005 filed on Feb. 18, 2009; Feb. 24, 2009; May 21, 2009; Jul. 22, 2009; Aug. 21, 2009 and Oct. 9, 2009; respectively, and claims priority under 35 U.S.C. 119 (a) to Patent Application No. 10-2010-0014760 filed in Republic of Korea on Feb. 18, 2010. All of which are hereby expressly incorporated by reference into the present application.

TECHNICAL FIELD

The present invention relates to a wireless communication system, and more particularly, to a signal transmitting/receiving method off a relay node.

BACKGROUND ART

In case that a channel status between a base station and a user equipment is poor, it is able to provide a radio channel having a better channel status to the user equipment by installing a relay node (RN) between the base station and the user equipment. If a relay node is introduced and used on a cell boundary area having a poor channel status from a base station, a faster data channel can be provided and a cell service area can be extended. Thus, the relay node is the technology introduced to get rid of a radio wave shade area in a wireless communication system and is being used widely.

A recent relay node scheme continues to be developed into a further intelligent form, whereas a past relay node scheme if limited to a repeater function of amplifying and transmitting a signal simply. Moreover, the relay node technology corresponds to the technology mandatory for the service coverage extension and the data throughput improvement by reducing the cost for the base station establishment and the maintenance expense for a backhaul network in the next generation mobile communication system. In accordance with the ongoing development of the relay node technology, a new wireless communication system needs to support a relay node used by a related art wireless communication system.

In 3GPP LTE ($3^{rd}$ partnership project long term evolution) system, as a relay node is equipped with a function of forwarding a link connection between a base station and a user equipment, two kinds of links differing from each other in attribute are applied to an uplink carrier frequency band and a downlink carrier frequency band, respectively. A connection link part established at a link between a base station and a relay node is defined and represented as a backhaul link. If a transmission is performed by FDD (frequency division duplex) or TDD (time division duplex) using a downlink resource, it can be called a backhaul downlink. If a transmission is performed by FDD or TDD using an uplink resource, it can be represented as a backhaul uplink.

In order to support a relay node related link configuration, a user equipment and a base station of the related art implement one kind of a module of a transmitting or receiving module for uplink/downlink. Yet, it is necessary for a relay node to be implemented with two kinds of modules (i.e., a transmitting module and a receiving module) for both off uplink and downlink.

Thus, a relay node is able to transmit a signal to a base station in uplink and is also able to receive a signal from a user equipment. Moreover, the relay node is able to receive a signal from the base station in downlink and is also able to transmit a signal to the user equipment. However, when the relay node simultaneously transmits and receives signals, interference considerably increases and error frequently occurs. And, it is not preferable that signals are simultaneously transmitted and received.

Therefore, in order for a relay node to enables signals to be exchanged between a base station and a user equipment, a proper timing is required. However, a frame structure designed for a relay node to enable signals to be exchanged between a base station and a user equipment has not been proposed yet.

DISCLOSURE OF THE INVENTION

Technical Problem

An object of the present invention is to provide a method for a relay node to transmit and receive signals.

Another object of the present invention is to provide a relay node apparatus for transmitting and receiving signals.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Technical Solution

To achieve these and other advantages and in accordance with the purpose of the present invention, a method of transmitting/receiving signals at a relay node (RN) via a specific downlink subframe in a wireless communication system, according to the present invention includes the steps of transmitting a physical downlink control channel (PDCCH) to at least one user equipment in a relay cell at a timing point after a time corresponding to a propagation delay in accordance with a distance between a base station and the relay node from a specific downlink subframe start timing point of the base station or after elapse of a time corresponding to a prescribed delayed symbol from a timing point after the propagation delay and receiving the physical downlink control channel and/or a physical downlink shared channel from the base station after elapse of a first guard time subsequent to the physical downlink channel interval, wherein a prescribed number of symbols are allocated to the physical downlink control channel of the relay node and wherein a second guard time is allocated in continuation with the received physical downlink control channel and/or the physical downlink shared channel.

To further achieve these and other advantages and in accordance with the purpose of the present invention, a method of transmitting/receiving signals at a relay node (RN) via a specific uplink backhaul subframe in a wireless communication system, according to the present invention includes the step of transmitting at least one of a physical uplink shared channel, a physical uplink control channel and a sounding reference signal (SRS) from a timing point advancing a time corresponding to a propagation delay in accordance with a distance between a base station and the relay node from a specific uplink backhaul subframe start timing point of the base station or a timing point after a prescribed delayed symbol duration from the advanced timing point or after elapse of a first guard time from the prescribed delayed symbol duration, wherein a prescribed number of symbols are allocated to at least one of the physical uplink shared channel, the physical uplink control channel and the sounding reference signal of the relay node and wherein the second guard time is allocated to a last symbol of the specific uplink backhaul subframe of the relay node or a symbol previous to the last symbol.

To further achieve these and other advantages and in accordance with the purpose of the present invention, a relay node (RN) apparatus for transmitting/receiving via a specific downlink subframe in a wireless communication system, according to the present invention includes a transmitting module configured to transmit a physical downlink control channel (PDCCH) to at least one user equipment in a relay cell at a timing point after a time corresponding to a propagation delay in accordance with a distance between a base station and the relay node from a specific downlink subframe start timing point of the base station or after elapse of a time corresponding to a prescribed delayed symbol from a timing point after the time corresponding to the propagation delay and a receiving module configured to receive the physical downlink control channel and/or a physical downlink shared channel from the base station after elapse of a first guard time subsequent to the physical downlink channel interval, wherein a prescribed number of symbols are allocated to the physical downlink control channel of the relay node and wherein a second guard time is allocated in continuation with the received physical downlink control channel and/or the physical downlink shared channel.

To further achieve these and other advantages and in accordance with the purpose of the present invention, a relay node (RN) apparatus for transmitting/receiving signals via a specific uplink backhaul subframe in a wireless communication system, according to the present invention includes a transmitting module configured to transmit at least one of a physical uplink shared channel, a physical uplink control channel and a sounding reference signal (SRS) from a timing point advancing a time corresponding to a propagation delay in accordance with a distance between a base station and the relay node from a specific uplink backhaul subframe start timing point of the base station or a timing point after a prescribed delayed symbol duration from the advanced timing point or after elapse of a first guard time from the prescribed delayed symbol duration, wherein a prescribed number of symbols are allocated to at least one of the physical uplink shared channel, the physical uplink control channel and the sounding reference signal of the relay node and wherein the second guard time is allocated to a last symbol of the specific uplink backhaul subframe of the relay node or a symbol previous to the last symbol.

Advantageous Effects

Accordingly, signals are transmitted and received by being synchronized with a base station at an appropriate timing, whereby efficiency and accuracy of signal transmission can be enhanced.

Effects obtainable from the present invention are non-limited the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

Figure 50:
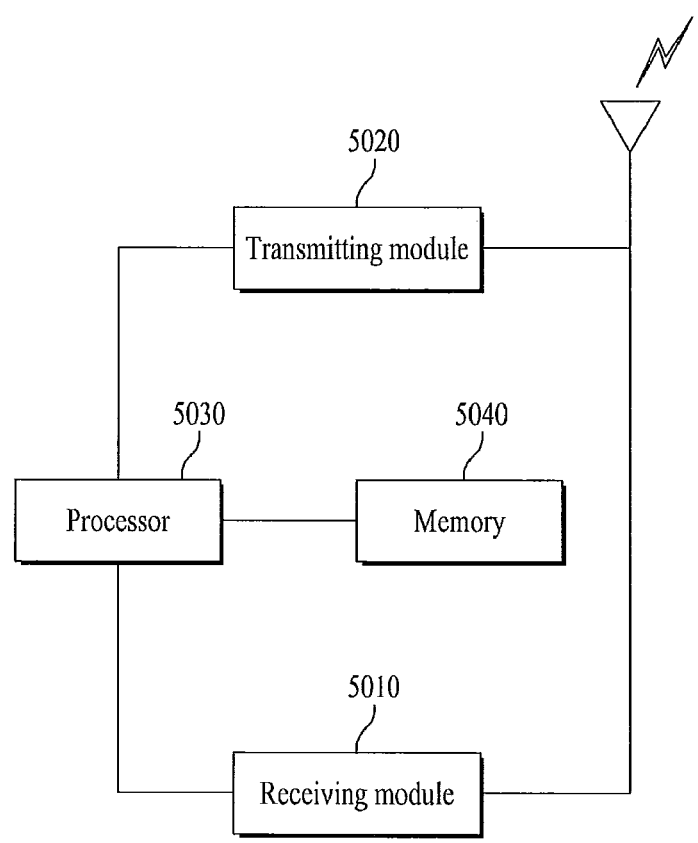

And, FIG. 50 is a block diagram for a preferred configuration of a relay node device according to one embodiment of the present invention.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, they are applicable to other random mobile communication systems except unique features of 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that that a base station is a common name of such a random node of a network stage communicating with a terminal as a node B, eNode B, a base station, an access point (AP) and the like.

In a mobile communication system, a user equipment can receive information in downlink (hereinafter abbreviated DL) from a base station. The user equipment is also able to transmit information in uplink (hereinafter abbreviated UL). The information transmitted/received by the user equipment includes data and various kinds of control informations. And, various physical channels exist according to types and usages of the information transmitted or received by the user equipment.

Figure 1:
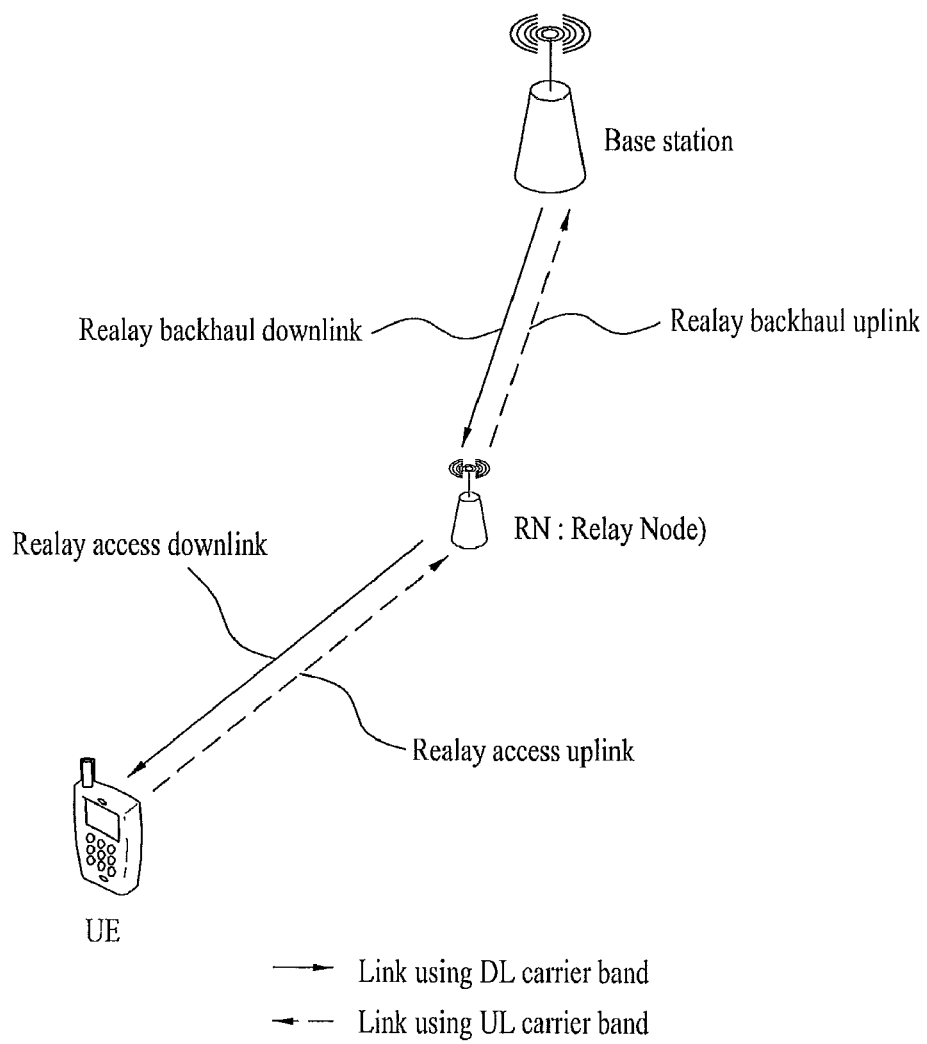
FIG. 1 is a diagram for configurations of a relay backhaul link and a relay access link in a wireless communication system.

FIG. 1 is a diagram for a configuration of a relay backhaul link and a relay access link in a wireless communication system.

Referring to FIG. 1, a relay node (RN) is able to receive information from a base station in a relay backhaul downlink and is also able to transmit information to the base station in a relay backhaul uplink. Moreover, the relay node is able to transmit information to a user equipment in a relay access downlink and is also able to receive information from the user equipment in a relay access uplink.

The relay node is able to perform an initial cell search job such as a synchronization match with the base station and the like. For this, the relay node receives a synchronization channel from the base station, matches synchronization with the base station, and is able to obtain such information as cell ID and the like. Thereafter, the relay node receives a physical broadcast channel from the base station and is then able to obtain intra-cell broadcast information. Meanwhile, the relay node receives a downlink reference signal in the initial cell search step and is then able to check a channel status of the relay backhaul downlink. The relay node receives a physical downlink control channel (PDCCH (physical downlink control channel or R-PDCCH (relay-physical downlink control channel)) and a physical downlink shared channel (PDSCH (physical downlink control channel) or R-PDSCH (relay-physical downlink control channel) in accordance with the physical downlink control channel information and is then able to obtain a detailed system information.

Meanwhile, if the base station is initially accessed or there is no radio resource for signal transmission, the relay node is able to perform a random access procedure on the base station. For this, the relay node transmits a specific sequence as a preamble on a physical random access channel (PRACH) or the like and is then able to receive a response message for the random access on a relay physical downlink control channel and a corresponding relay physical downlink shared channel. In case of a contention based random access except a case of handover, the relay node is then able to perform such a contention resolution procedure as a transmission of an additional physical random access channel and R-PDCCH/R-PDSCH reception.

Having performed the above-described procedures, the relay node is able to perform an R-PDCCH/R-PDSCH and R-PUSCH/R-PUCCH (relay-physical uplink shared channel/relay-physical uplink control channel) transmission as a general uplink/downlink signal transmission procedure. In this case, the control information, which is transmitted to the base station in uplink by the relay node or received by the base station from the relay node, can include a DL/UL (downlink/uplink) ACK/NACK signal, a channel quality information (channel quality indicator: CQI), a precoding matrix index (PMI), a rank indicator (RI) and the like. In case of the 3GPP LTE ($3^{rd}$ partnership long term evolution) system, the relay node is able to transmit such control information as CQI, PRI, RI and the like on R-PUSCH/R-PUCCH.

Figure 2:
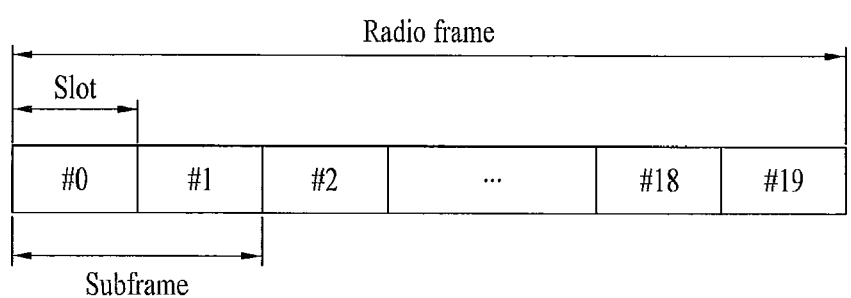
FIG. 2 is a schematic diagram of a frame structure in 3GPP LTE system for example of a mobile communication system.

FIG. 2 is a schematic diagram of a frame structure in 3GPP LTE system for example of a mobile communication system.

Referring to FIG. 2, a single radio frame can include 10 subframes. And, a single subframe is able to include 2 slots in time domain. A time taken to transmit a single subframe can be defined as a transmission time interval (TTI). For instance, a single subframe has a length of 1 ms and a single slot can have a length of 0.5 ms. Moreover, a single slot is able to include a plurality of OFDM (orthogonal frequency division multiplexing) symbols in time domain.

In 3GPP LTE system, OFDMA scheme is used in downlink and OFDM symbol is able to indicate a symbol cycle. And, the OFDM symbol can be regarded as one SC-FDMA symbol or one symbol cycle. A resource block (RB) is a resource allocation unit and is able to include a plurality of subcarriers adjacent to one slot. For instance, 10 subframes are included in a single radio frame, 2 slots are included in a single subframe, and 7 OFDM symbols can be included in a single slot. Yet, each of the subframe number, the slot number and the OFDM symbol number can be changed into one of various values. For clarity of the following description, assume that the number of OFDM symbols contained in a single frame shall be set to 14.

As mentioned in the foregoing description, a relay node needs to be implemented into two kinds of modules including a transmitting module and a receiving module for both uplink and downlink. This is represented as Table 1 in the following.

TABLE 1

| Function | Base station | Relay node | User equipment |
| --- | --- | --- | --- |
| DL transmission | O | O | X |
| DL reception | X | O | O |
| UL transmission | X | O | O |
| UL reception | O | O | X |

Referring to Table 1, a base just needs to implement a receiving module in UL and a transmitting module in DL. A user equipment just needs to implement a transmitting module in UL and a receiving module in DL. In particular, each of the user equipment and the base station needs to implement either a transmitting module or a receiving module in UL or DL. Yet, a relay node plays a role in relaying a signal received from the base station and the like to the user equipment and also plays a role in relaying a signal received from the user equipment to the base station. Therefore, the relay node needs to implement both of the transmitting module and the receiving module in UL/DL.

FIGS. 3 to 6 are diagrams for examples of a symbol structure allocated to R-PDCCH and R-PDSCH transmissions in a downlink backhaul subframe of a base station and MBSFN (multimedia broadcast single frequency network) subframe structure in a relay node, respectively.

Referring to FIGS. 3 to 6, a DL subframe timing of a relay node (RN) can be set in a manner of being time-aligned with a DL reception timing of a base station. If a donor base station (donor eNB) transmits PDCCH to a user equipment within a macro cell or transmits R-PDCCH and R-PDSCH for the relay node, a propagation delay (Tp) due to such a transmission is generated. Hence, after elapse of a time corresponding to the propagation delay starting at a timing point that the donor base station transmits the PDCCH to the user equipment within the macro cell, the relay node is able to transmit the PDCCH to a user equipment with a relay cell. And, the PDCCH for the user equipment within the relay cell of the relay node is able to allocate 2 OFDM symbols. And, a size of the PDCCH of the donor base station may correspond to one of 4 OFDM symbols, 3 OFDM symbols, 2 OFDM symbols and 1 OFDM symbol.

Figure 3:
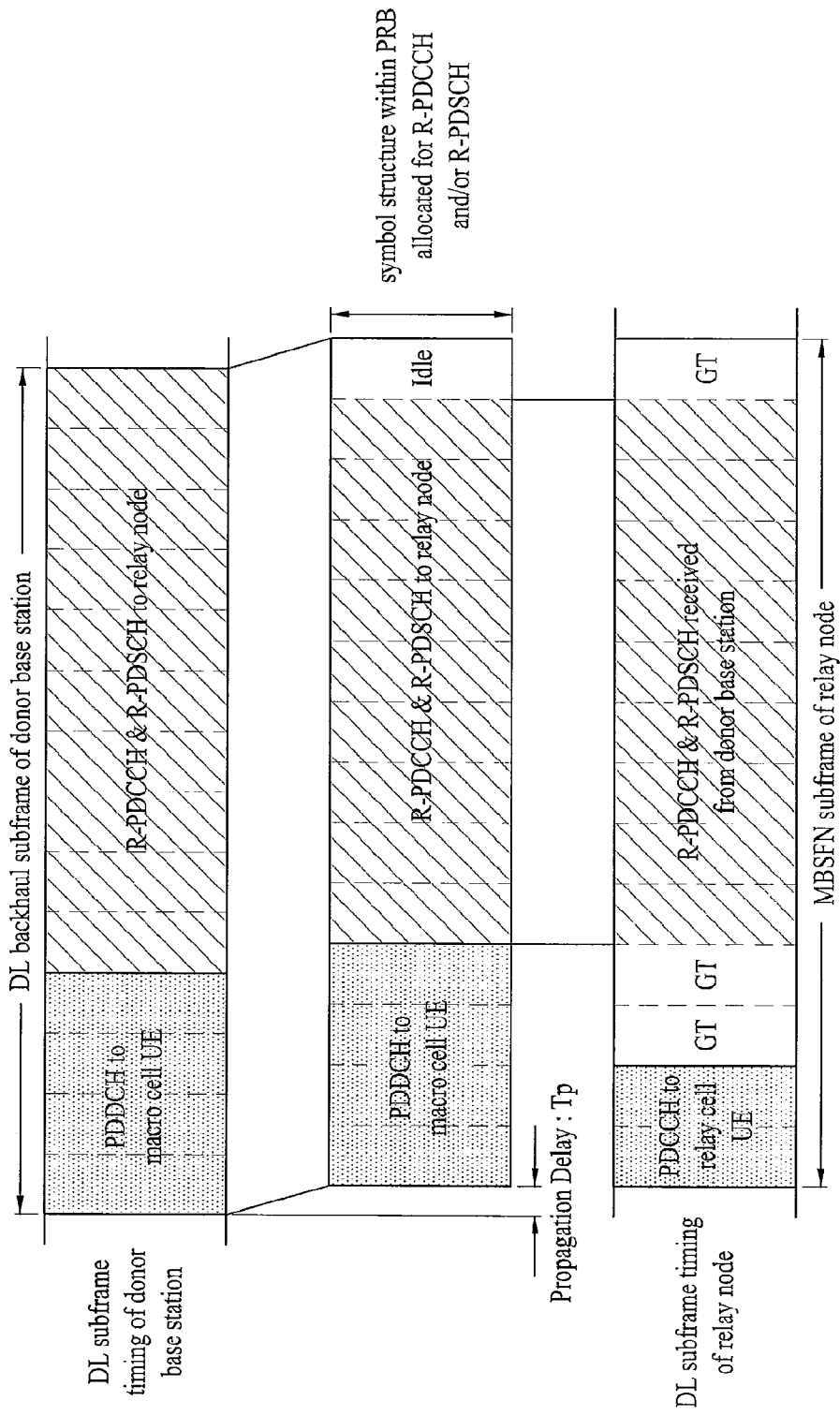
FIGS. 3 to 6 are diagrams for examples of a symbol structure allocated to R-PDCCH and R-PDSCH transmissions in a downlink backhaul subframe of a base station and MBSFN (multimedia broadcast single frequency network) subframe structure in a relay node, respectively.

Referring to FIG. 3, a donor base station is able to allocate 4 OFDM symbols in a single DL backhaul subframe to PDCCH for a user equipment within a macro cell. And, the donor base station is able to allocate the remaining 10 OFDM symbols to PDSCH for the user equipment within the macro cell and R-PDCCH and R-PDSCH for a relay node. In doing so, the donor base station is able to allocate a last one of the remaining 10 OFDM symbols to an idle interval.

After elapse of a time corresponding to a propagation delay starting at a timing point that the donor base station transmits the PDCCH to the user equipment within the macro cell, the relay node is able to transmit the PDCCH to a user equipment within a relay cell due to the propagation delay. In doing so, a mentioned in the foregoing description, the relay node is able to allocate 2 OFDM symbols for the PDCCH transmission in MBSFN subframe. And, the relay node is able to allocate 2 OFDM symbols following the PDCCH to a guard time (GT) for RF switching (i.e., a switching between a transmission mode and a reception mode by a relay node). In particular, in order for the relay node to receive the R-PDCCH and R-PDSCH from the donor base station in the course of transmitting the PDCCH to the user equipment within the relay cell in the MBSFN subframe, an RF switching time is necessary. And, the relay node is able to allocate a last OFDM symbol of the MBSFN subframe to the guard time. Therefore, the relay node is able to receive the R-PDCCH and the R-PDSCH from the donor base station via total 9 OFDM symbol durations.

Figure 4:
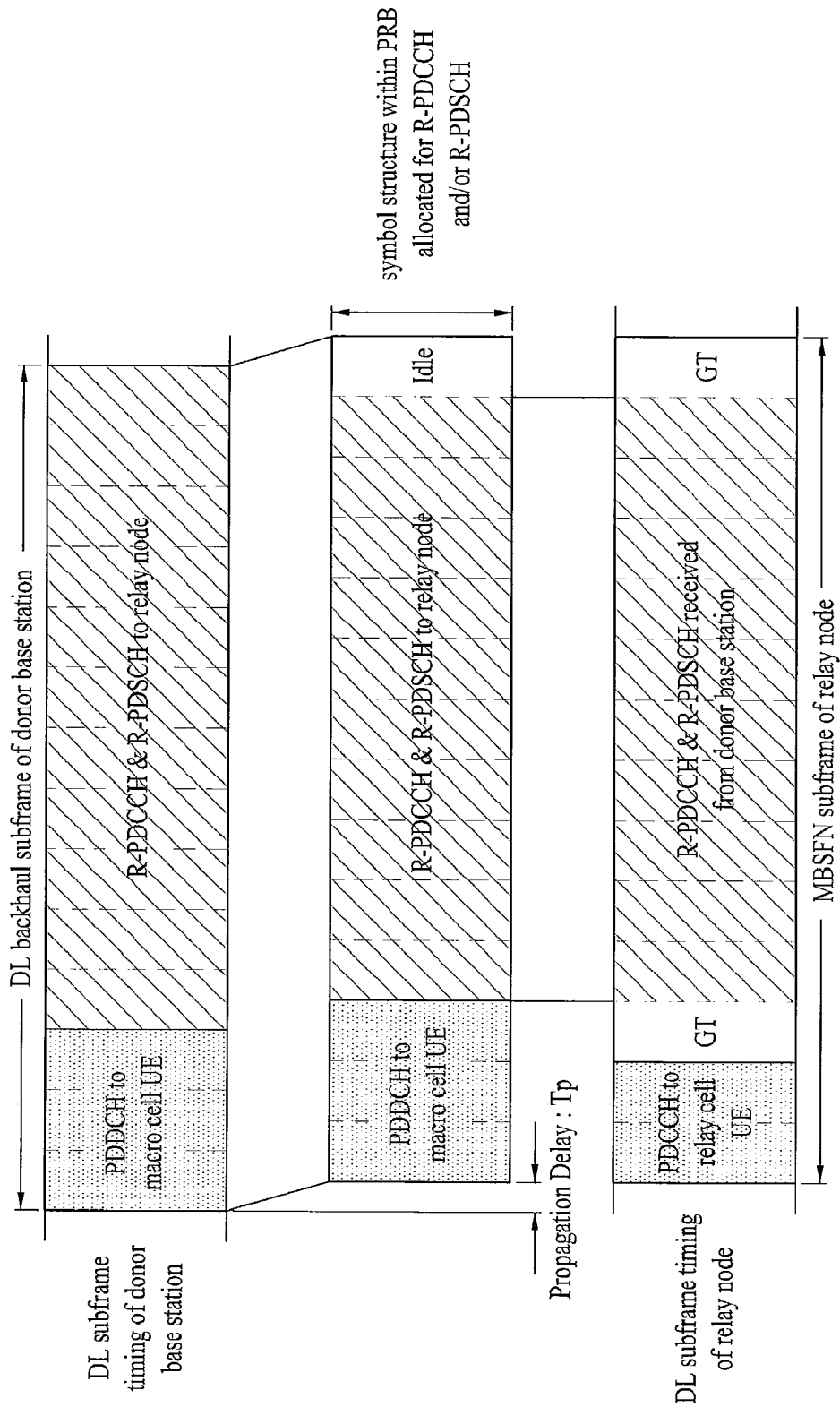

Referring to FIG. 4, a donor base station is able to allocate 3 OFDM symbols in a single DL backhaul subframe to PDCCH for a user equipment within a macro cell. And, the donor base station is able to allocate the remaining 11 OFDM symbols to PDSCH for the user equipment within the macro cell and R-PDCCH and R-PDSCH for a relay node. In doing so, the donor base station is able to allocate a last one of the remaining 11 OFDM symbols to an idle interval.

After elapse of a time corresponding to a propagation delay starting at a timing point that the donor base station transmits the PDCCH to the user equipment within the macro cell, the relay node may transmit the PDCCH to a user equipment within a relay cell due to the propagation delay. In doing so, a mentioned in the foregoing description, the relay node is able to allocate 2 OFDM symbols for the PDCCH transmission in MBSFN subframe. And, the relay node is able to allocate 1 OFDM symbol following the PDCCH to a guard time (GT) for RF switching. And, the relay node is able to allocate a last OFDM symbol of the MBSFN subframe to the guard time. Therefore, the relay node is able to receive the R-PDCCH and the R-PDSCH from the donor base station via total 10 OFDM symbol durations.

Figure 5:
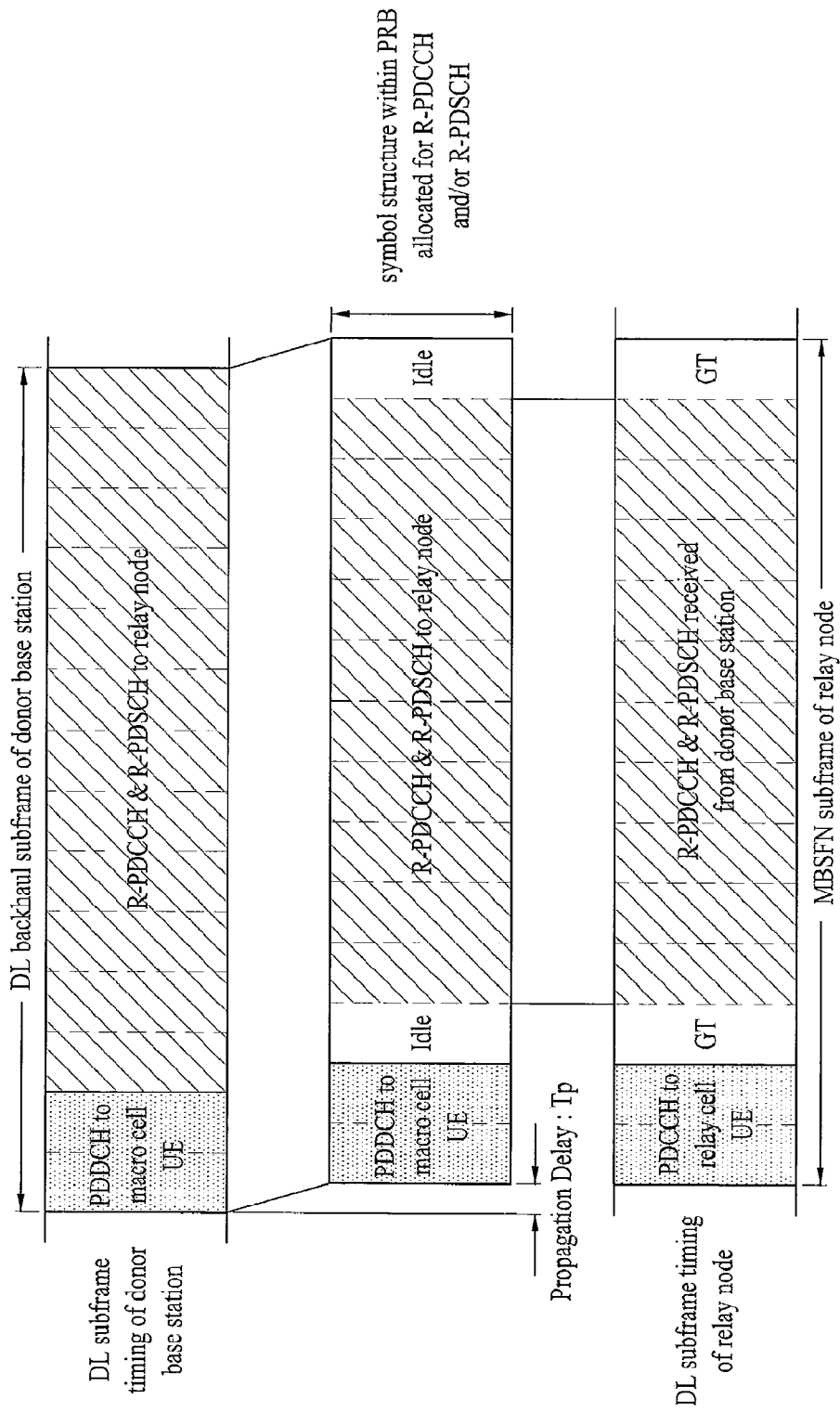

Referring to FIG. 5, a donor base station is able to allocate 2 OFDM symbols in a single DL backhaul subframe to PDCCH for a user equipment within a macro cell. And, the donor base station is able to allocate the remaining 12 OFDM symbols to PDSCH for the user equipment within the macro cell and R-PDCCH and R-PDSCH for a relay node. In doing so, the donor base station is able to allocate 2 of the remaining 12 OFDM symbols to idle intervals, respectively. Preferably, the idle intervals corresponding to the 2 symbols can be located at a first symbol and a last symbol in a remaining region except a PDCCH region for the macro cell user equipment.

After elapse of a time corresponding to a propagation delay starting at a timing point that the donor base station transmits the PDCCH to the user equipment within the macro cell, the relay node is able to transmit the PDCCH to a user equipment within a relay cell due to the propagation delay. In doing so, a mentioned in the foregoing description, the relay node is able to allocate 2 OFDM symbols for the PDCCH transmission in MBSFN subframe. And, the relay node is able to allocate 1 OFDM symbol following the PDCCH to a guard time (GT) for RF switching. And, the relay node is able to allocate a last OFDM symbol of the MBSFN subframe to the guard time. Therefore, the relay node is able to receive the R-PDCCH and the R-PDSCH from the donor base station via total 10 OFDM symbol durations.

Figure 6:
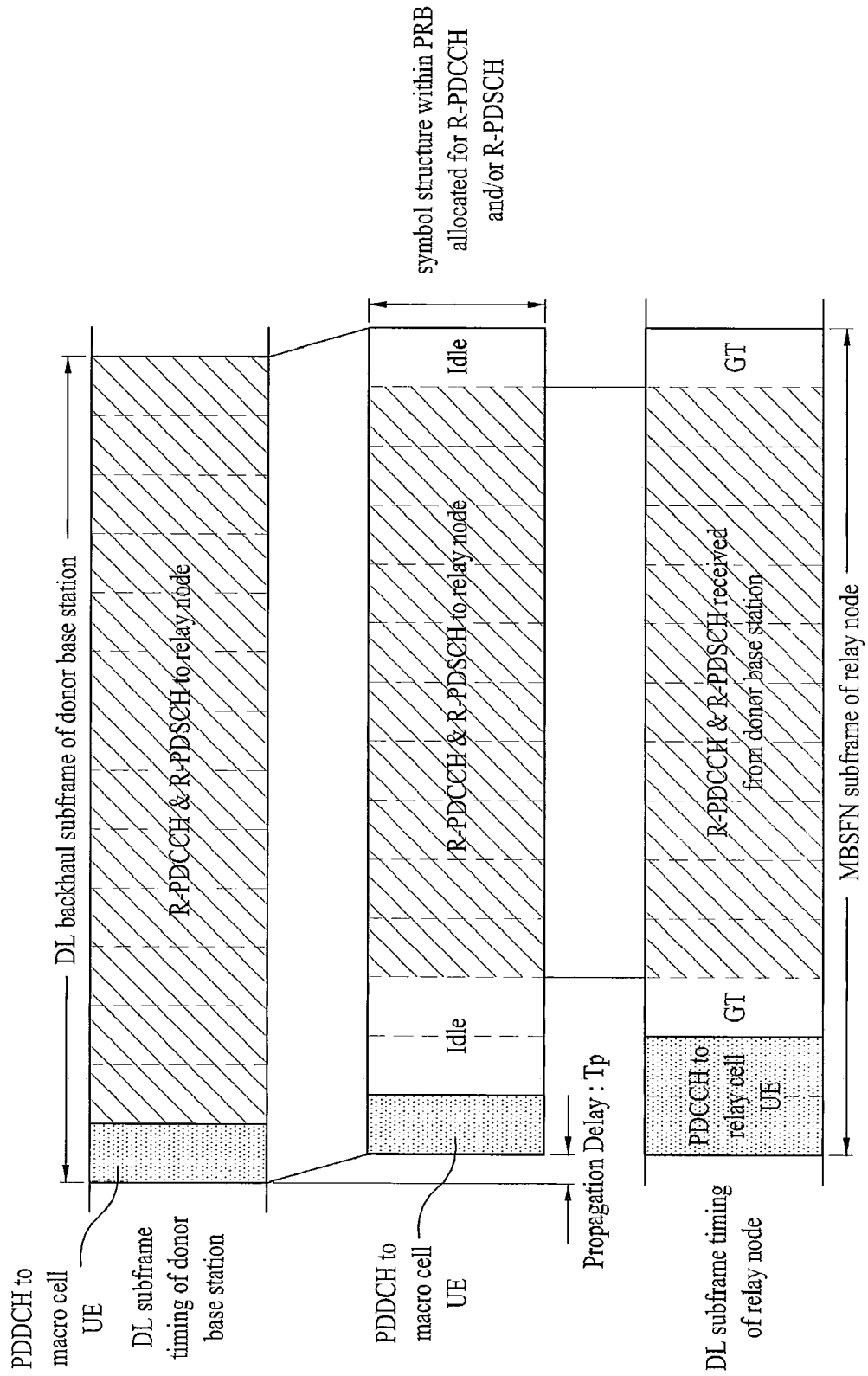

Referring to FIG. 6, a donor base station is able to allocate 1 OFDM symbol in a single DL backhaul subframe to PDCCH for a user equipment within a macro cell. And, the donor base station is able to allocate the remaining 13 OFDM symbols to PDSCH for the user equipment within the macro cell and R-PDCCH and R-PDSCH for a relay node. In doing so, the donor base station is able to allocate 3 of the remaining 13 OFDM symbols to idle intervals, respectively. Preferably, the idle intervals corresponding to the 3 symbols can be located at two first symbols and a last symbol in a remaining region except a PDCCH region for the macro cell user equipment.

After elapse of a time corresponding to a propagation delay starting at a timing point that the donor base station transmits the PDCCH to the user equipment within the macro cell, the relay node is able to transmit the PDCCH to a user equipment within a relay cell due to the propagation delay. The relay node is able to allocate 2 OFDM symbols for the PDCCH transmission in MBSFN subframe. And, the relay node is able to allocate 1 OFDM symbol following the PDCCH to a guard time (GT) for RF switching. And, the relay node is able to allocate a last OFDM symbol of the MBSFN subframe to the guard time. Therefore, the relay node is able to receive the R-PDCCH and the R-PDSCH from the donor base station via total 10 OFDM symbol durations.

FIGS. 7 to 10 are diagrams for examples of a symbol structure allocated to R-PDCCH and R-PDSCH transmissions in a downlink backhaul subframe of a base station and MBSFN subframe structure in a relay node, respectively.

Referring to FIGS. 7 to 10, a DL subframe timing of a relay node (RN) can be set in a manner of being time-aligned with a DL reception timing of a base station. If a donor base station transmits PDCCH to a user equipment within a macro cell or transmits R-PDCCH and R-PDSCH for the relay node, a propagation delay (Tp) due to such a transmission is generated. Hence, after elapse of a time corresponding to the propagation delay starting at a timing point that the donor base station transmits the PDCCH to the user equipment within the macro cell, the relay node is able to transmit the PDCCH to a user equipment within a relay cell of the relay node is able to allocate 1 OFDM symbol. And, a size of the PDCCH of the donor base station may correspond to one of 4 OFDM symbols, 3 OFDM symbols, 2 OFDM symbols and 1 OFDM symbol.

Figure 7:
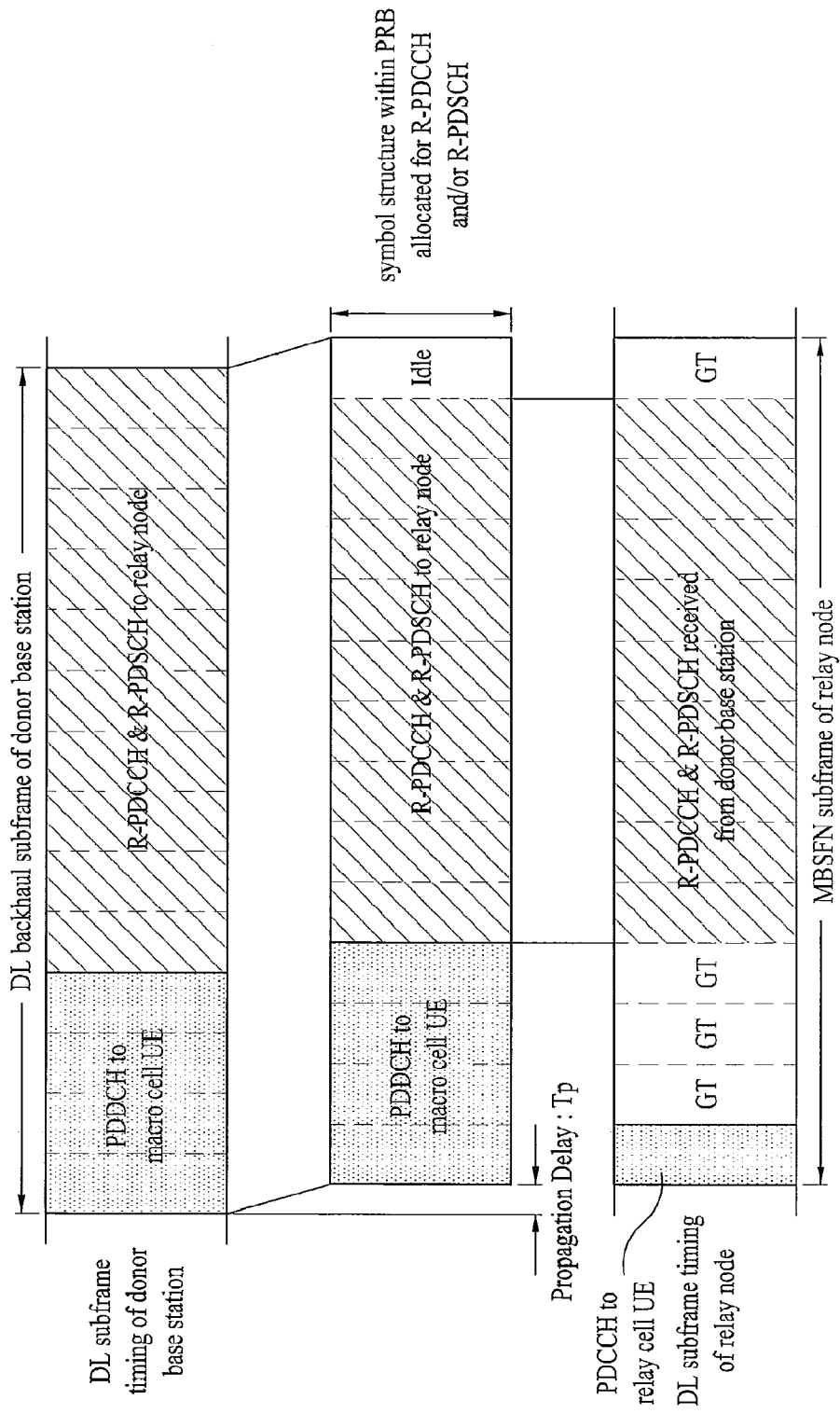
FIGS. 7 to 10 are diagrams for examples of a symbol structure allocated to R-PDCCH and R-PDSCH transmissions in a downlink backhaul subframe of a base station and MBSFN subframe structure in a relay node, respectively.

Referring to FIG. 7, a donor base station is able to allocate 4 OFDM symbols in a single DL backhaul subframe to PDCCH for a user equipment within a macro cell. And, the donor base station is able to allocate the remaining 10 OFDM symbols to PDSCH for the user equipment within the macro cell and R-PDCCH and R-PDSCH for a relay node. In doing so, the donor base station is able to allocate one of the remaining 10 OFDM symbols to an idle interval. Preferably, the idle interval corresponding to the allocated one symbol can be located at a last symbol in a remaining region except a PDCCH region for the user equipment within the macro cell.

After elapse of a time corresponding to a propagation delay starting at a timing point that the donor base station transmits the PDCCH to the user equipment within the macro cell, the relay node is able to transmit the PDCCH to a user equipment within a relay cell due to the propagation delay. In doing so, the relay node is able to allocate 1 OFDM symbol for the PDCCH transmission in MBSFN subframe. And, the relay node is able to allocate 3 OFDM symbols following the PDCCH to a guard time (GT) for RF switching. In particular, in order for the relay node to receive the R-PDCCH and R-PDSCH from the donor base station in the course of transmitting the PDCCH to the user equipment within the relay cell in the MBSFN subframe, an RF switching time is necessary. And, the relay node is able to allocate a last OFDM symbol of the MBSFN subframe to the guard time. Therefore, the relay node is able to receive the R-PDCCH and the R-PDSCH from the donor base station via total 9 OFDM symbol durations.

Figure 8:
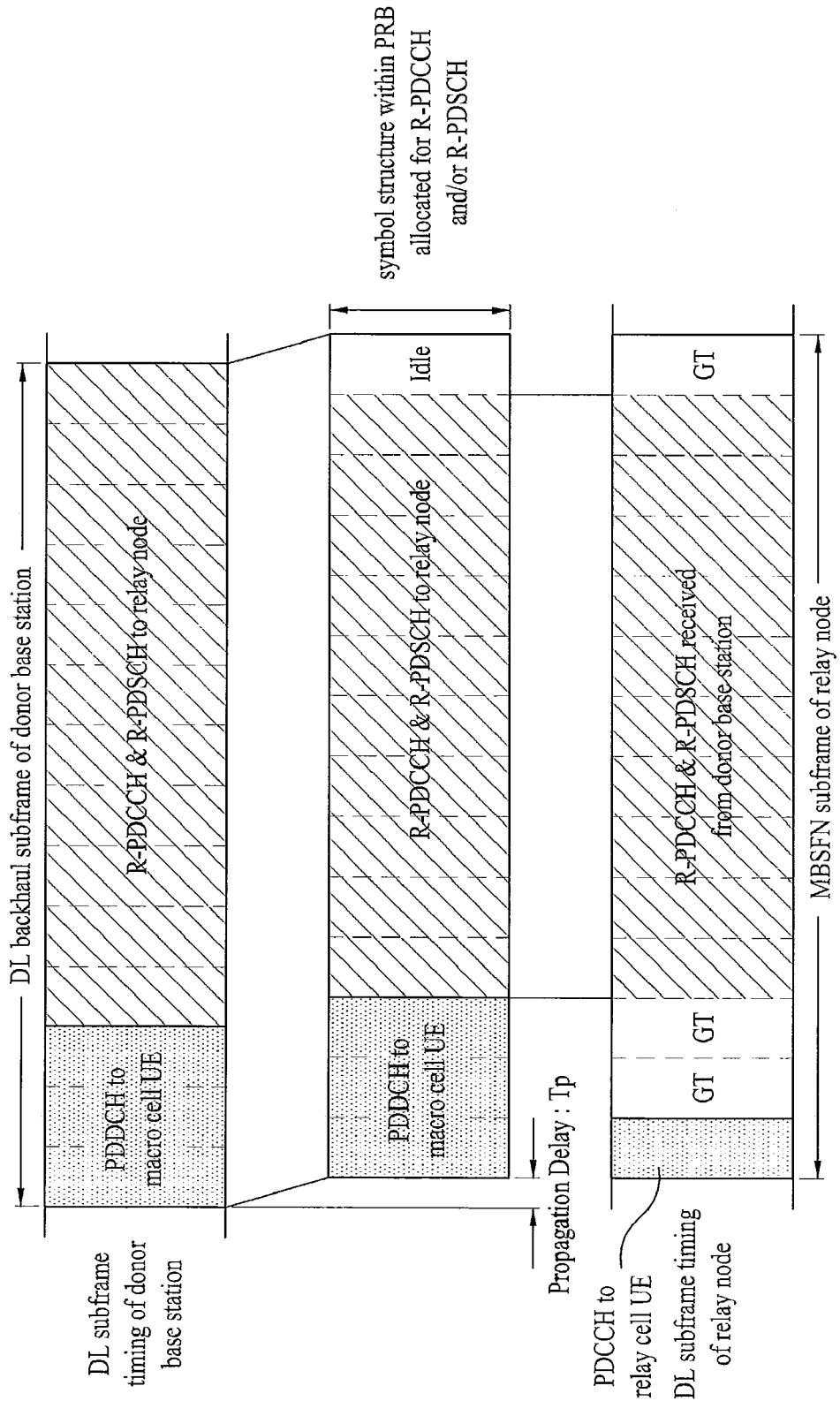

Referring to FIG. 8, a donor base station is able to allocate 3 OFDM symbols in a single DL backhaul subframe to PDCCH for a user equipment within a macro cell. And, the donor base station is able to allocate the remaining 11 OFDM symbols to PDSCH for the user equipment within the macro cell and R-PDCCH and R-PDSCH for a relay node. In doing so, the donor base station is able to allocate one of the remaining 11 OFDM symbols to an idle interval. Preferably, the idle interval corresponding to the allocated one symbol can be located at a last symbol in a remaining region except a PDCCH region for the macro cell user equipment.

After elapse of a time corresponding to a propagation delay starting at a timing point that the donor base station transmits the PDCCH to the user equipment within the macro cell, the relay node is able to allocate 1 OFDM symbol for the PDCCH transmission in MBSFN subframe. And, the relay node is able to allocate 2 OFDM symbols following the PDCCH to a guard time (GT) for RF switching. And, the relay node is able to allocate a last OFDM symbol of the MBSFN subframe to the guard time. Therefore, the relay node is able to receive the R-PDCCH and the R-PDSCH from the donor base station via total 10 OFDM symbol durations.

Figure 9:
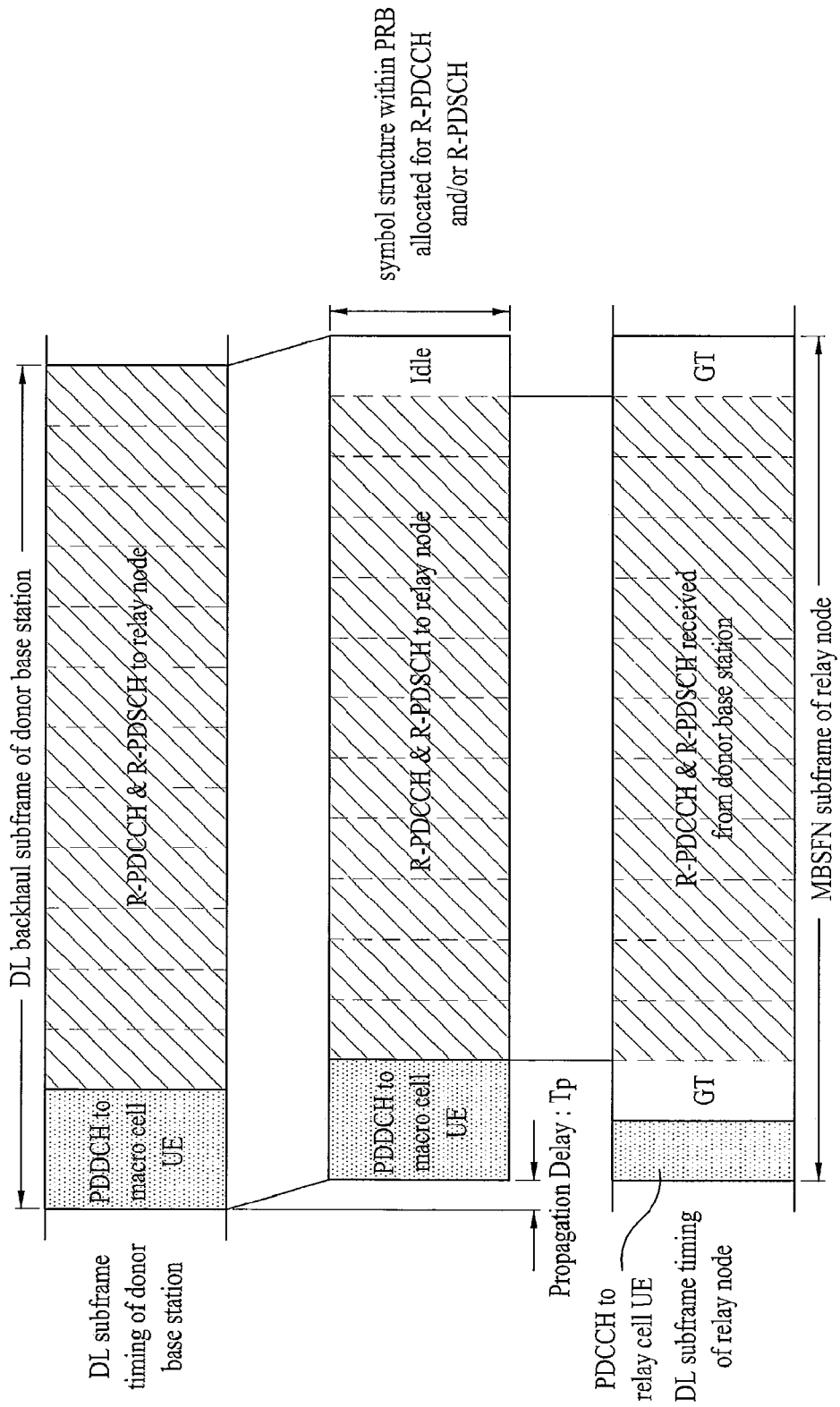

Referring to FIG. 9, a donor base station is able to allocate 2 OFDM symbols in a single DL backhaul subframe to PDCCH for a user equipment within a macro cell. And, the donor base station is able to allocate the remaining 12 OFDM symbols to PDSCH for the user equipment within the macro cell and R-PDCCH and R-PDSCH for a relay node. In doing so, the donor base station is able to allocate one symbol of the remaining 12 OFDM symbols to idle intervals, respectively. Preferably, the idle interval corresponding to one symbol can be located at a last symbol in a remaining region except a PDCCH region for the macro cell user equipment.

After elapse of a time corresponding to a propagation delay starting at a timing point that the donor base station transmits the PDCCH to the user equipment within the macro cell, the relay node is able to allocate 1 OFDM symbols for the PDCCH transmission in MBSFN subframe. And, the relay node is able to allocate 1 OFDM symbol following the PDCCH to a guard time (GT) for RF switching. And, the relay node is able to allocate a last OFDM symbol of the MBSFN subframe to the guard time. Therefore, the relay node is able to receive the R-PDCCH and the R-PDSCH from the donor base station via total 11 OFDM symbol durations.

Figure 10:
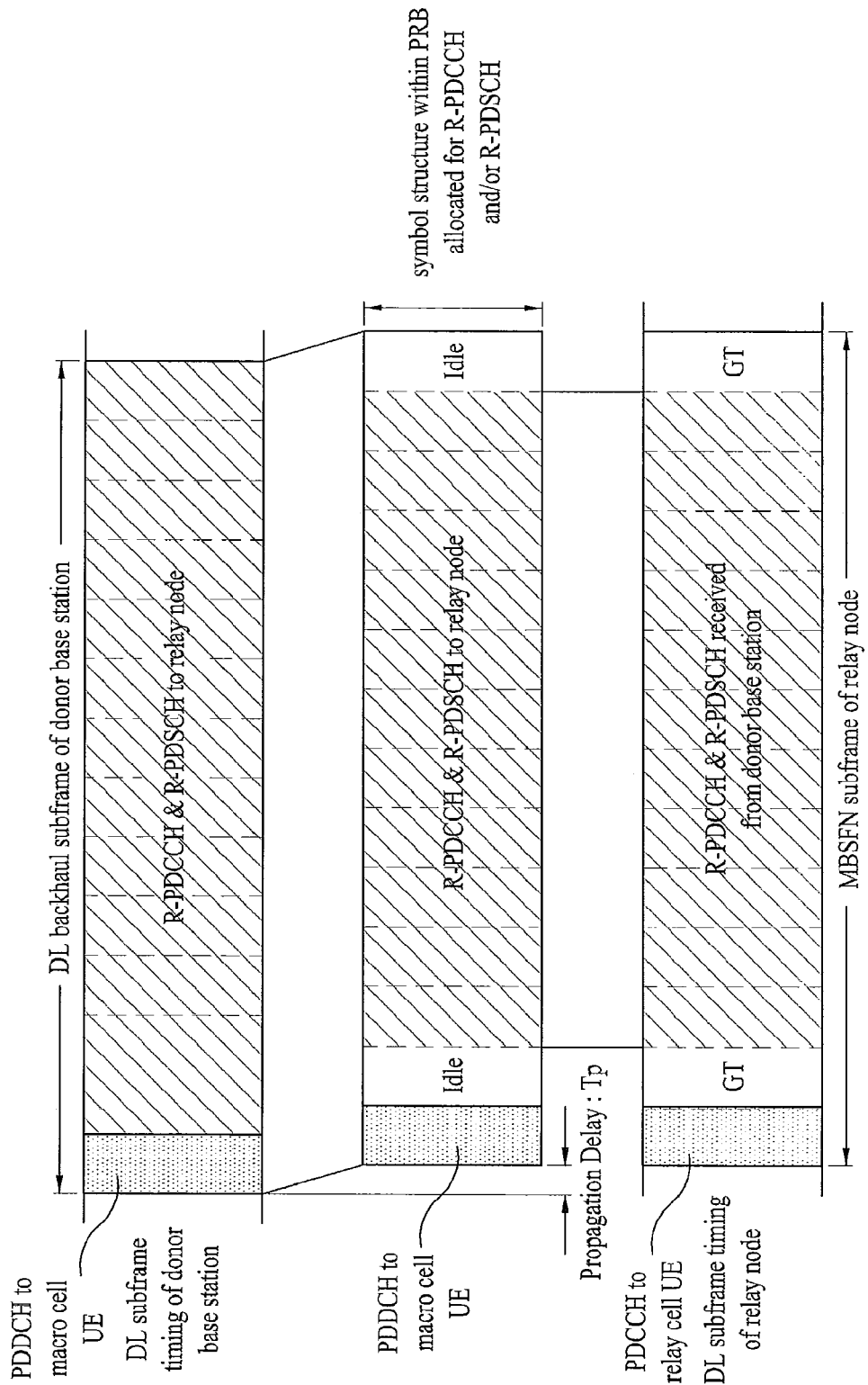

Referring to FIG. 10, a donor base station is able to allocate 1 OFDM symbol in a single DL backhaul subframe to PDCCH for a user equipment within a macro cell. And, the donor base station is able to allocate the remaining 13 OFDM symbols to PDSCH for the user equipment within the macro cell and R-PDCCH and R-PDSCH for a relay node. In doing so, the donor base station is able to allocate 2 symbols of the remaining 13 OFDM symbols to idle intervals, respectively. Preferably, the idle intervals corresponding to the 2 symbols can be located at a first symbol and a last symbol in a remaining region except a PDCCH region for the macro cell user equipment.

After elapse of a time corresponding to a propagation delay starting at a timing point that the donor base station transmits the PDCCH to the user equipment within the macro cell, the relay node is able to allocate 1 OFDM symbol for the PDCCH transmission in MBSFN subframe. And, the relay node is able to allocate 1 OFDM symbol following the PDCCH to a guard time (GT) for RF switching. And, the relay node is able to allocate a last OFDM symbol of the MBSFN subframe to the guard time. Therefore, the relay node is able to receive the R-PDCCH and the R-PDSCH from the donor base station via total 11 OFDM symbol durations.

FIGS. 11 to 14 are diagram for examples of a symbol structure allocated for R-PDCCH and R-PDSCH transmission in a downlink backhaul subframe of a base station and an MBSFN subframe structure in a relay node when a downlink subframe timing of the relay node is set in a manner of being delayed by a half symbol in a downlink backhaul subframe reception timing of the base station.

Referring to FIGS. 11 to 14, unlike FIGS. 3 to 10, a DL subframe timing of a relay node can be set in a manner of being delayed by a half symbol from a DL backhaul frame reception timing of a base station. If a donor base station transmits PDCCH to a user equipment within a macro cell or transmits R-PDCCH and R-PDSCH for the relay node, a propagation delay (Tp) is generated due to such a transmission. Hence, after elapse of a time resulting from adding a time, which corresponds to a propagation delay from a timing point that the donor base station transmits the PDCCH to the user equipment within the macro cell, and 0.5 OFDM symbol duration together, the relay node is able to transmit the PDCCH to a user equipment within a relay cell. The PDCCH for the user equipment within the relay cell of the relay node can allocate 2 OFDM symbols. And, a size of the PDCCH of the donor base station may correspond to one of 4 OFDM symbols, 3 OFDM symbols, 2 OFDM symbols and one OFDM symbol.

Figure 11:
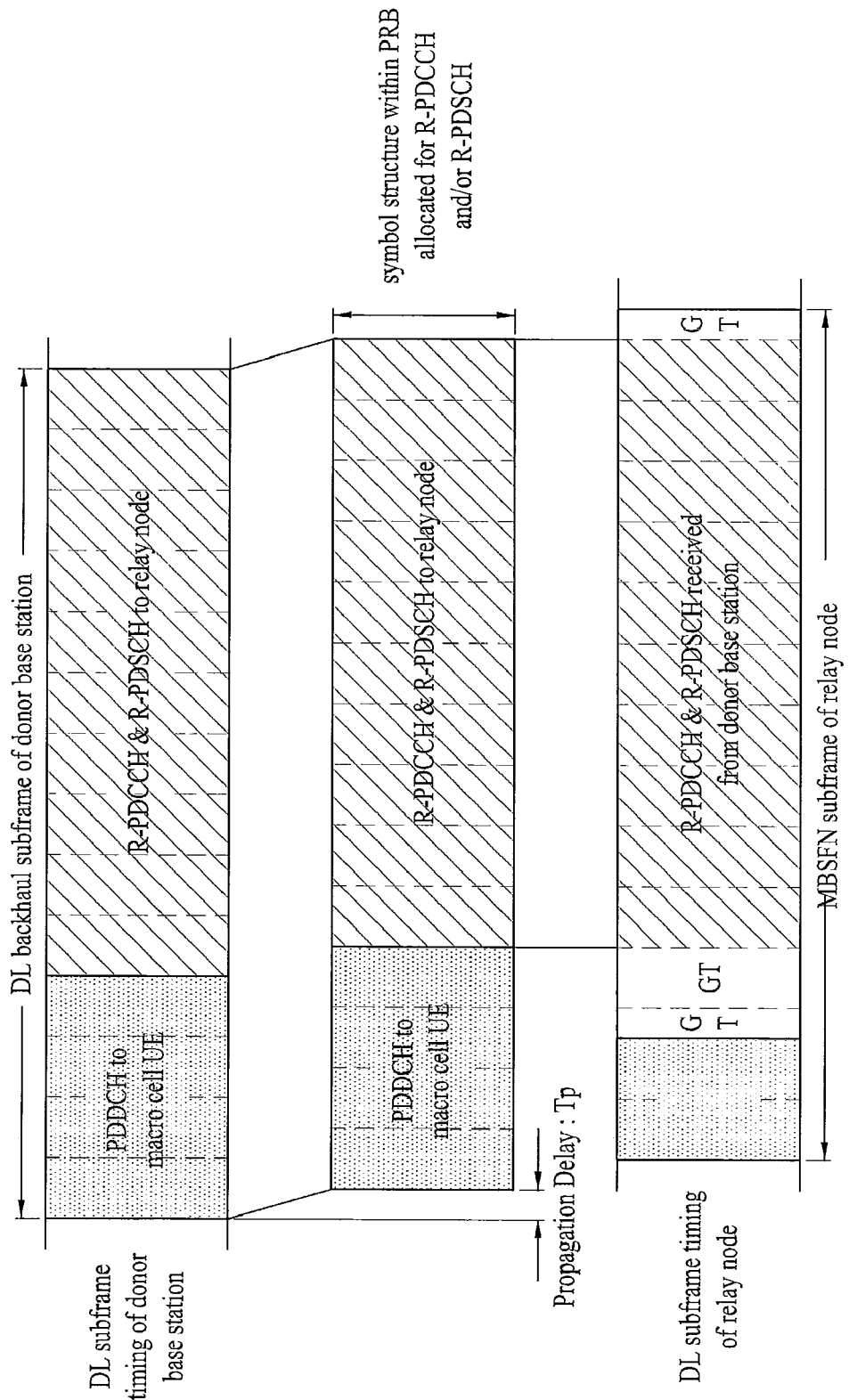
FIGS. 11 to 14 are diagram for examples of a symbol structure allocated for R-PDCCH and R-PDSCH transmission in a downlink backhaul subframe of a base station and an MBSFN subframe structure in a relay node when a downlink subframe timing of the relay node is set in a manner of being delayed by a half symbol in a downlink backhaul subframe reception timing of the base station.

Referring to FIG. 11, a donor base station is able to allocate 4 OFDM symbols in a single DL backhaul subframe to PDCCH for a user equipment within a macro cell. And, the donor base station is able to allocate the remaining 10 OFDM symbols to PDSCH for the user equipment within the macro cell and R-PDCCH and R-PDSCH for a relay node.

Due to the propagation delay and 0.5 OFDM symbol duration delay setup, after elapse of a time resulting from adding a time, which corresponds to a propagation delay from a timing point that the donor base station transmits the PDCCH to the user equipment within the macro cell, and 0.5 OFDM symbol duration together, the relay node is able to transmit the PDCCH to a user equipment within a relay cell. In doing so, the relay node is able to allocate 2 OFDM symbols for the PDCCH transmission in MBSFN subframe. And, the relay node is able to allocate 1.5 OFDM symbols following the PDCCH to a guard time (GT) for RF switching. In particular, in order for the relay node to receive the R-PDCCH and R-PDSCH from the donor base station in the course of transmitting the PDCCH to the user equipment within the relay cell in the MBSFN subframe, an RF switching time is necessary. And, the relay node is able to allocate last 0.5 OFDM symbol of the MBSFN subframe to the guard time. Therefore, the relay node is able to receive the R-PDCCH and the R-PDSCH from the donor base station via total 10 OFDM symbol durations.

Figure 12:
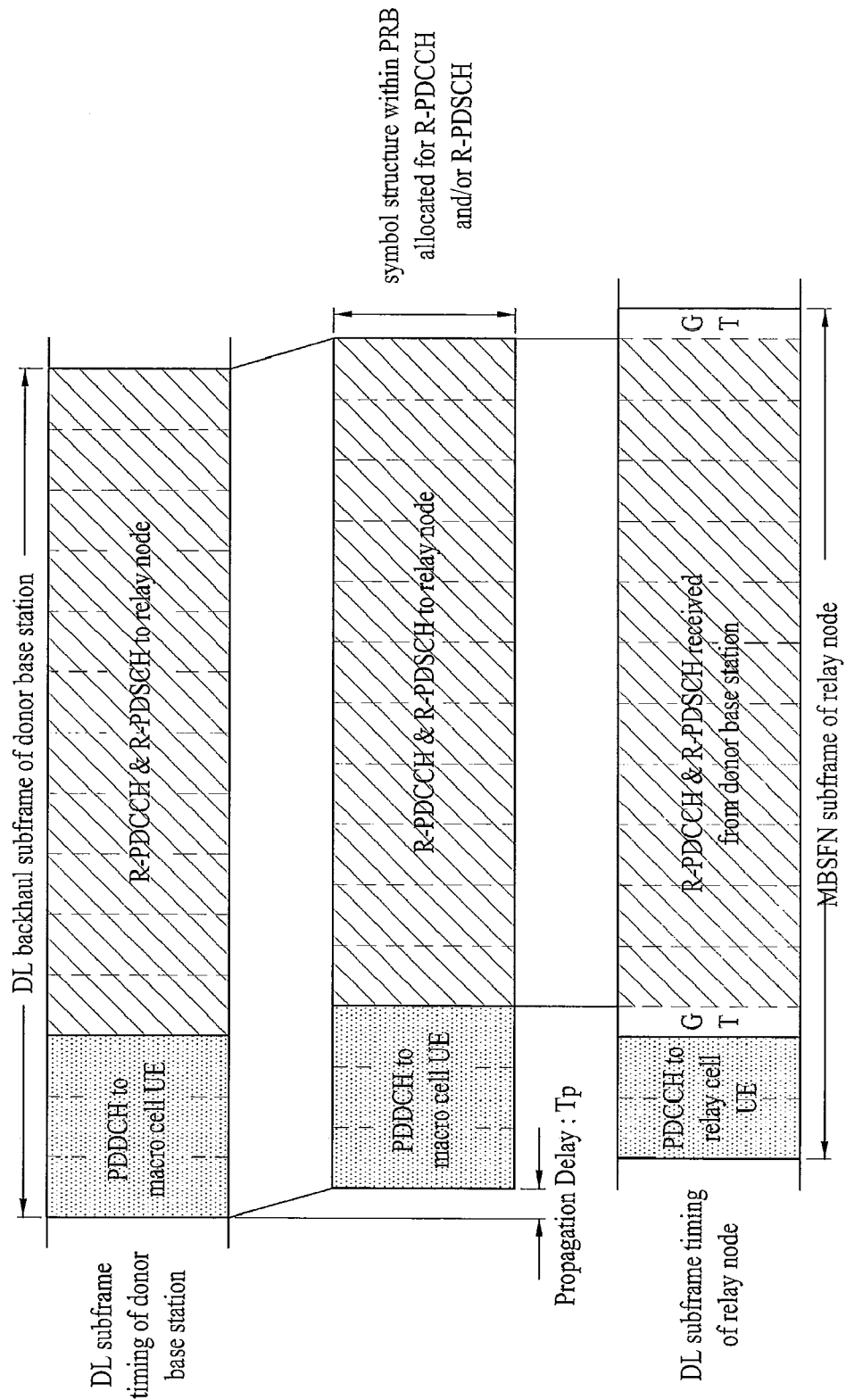

Referring to FIG. 12, a donor base station is able to allocate 3 OFDM symbols in a single DL backhaul subframe to PDCCH for a user equipment within a macro cell. And, the donor base station is able to allocate the remaining 11 OFDM symbols to PDSCH for the user equipment within the macro cell and R-PDCCH and R-PDSCH for a relay node.

Due to the propagation delay and 0.5 OFDM symbol duration delay setup, after elapse of a time resulting from adding a time, which corresponds to a propagation delay from a timing point that the donor base station transmits the PDCCH to the user equipment within the macro cell, and 0.5 OFDM symbol duration together, the relay node is able to transmit the PDCCH to a user equipment within a relay cell. In doing so, the relay node is able to allocate 2 OFDM symbols for the PDCCH transmission in MBSFN subframe. And, the relay node is able to allocate 0.5 OFDM symbol following the PDCCH to a guard time (GT) for RF switching. And, the relay node is able to allocate last 0.5 OFDM symbol of the MBSFN subframe to the guard time. Therefore, the relay node is able to receive the R-PDCCH and the R-PDSCH from the donor base station via total 11 OFDM symbol durations.

Figure 13:
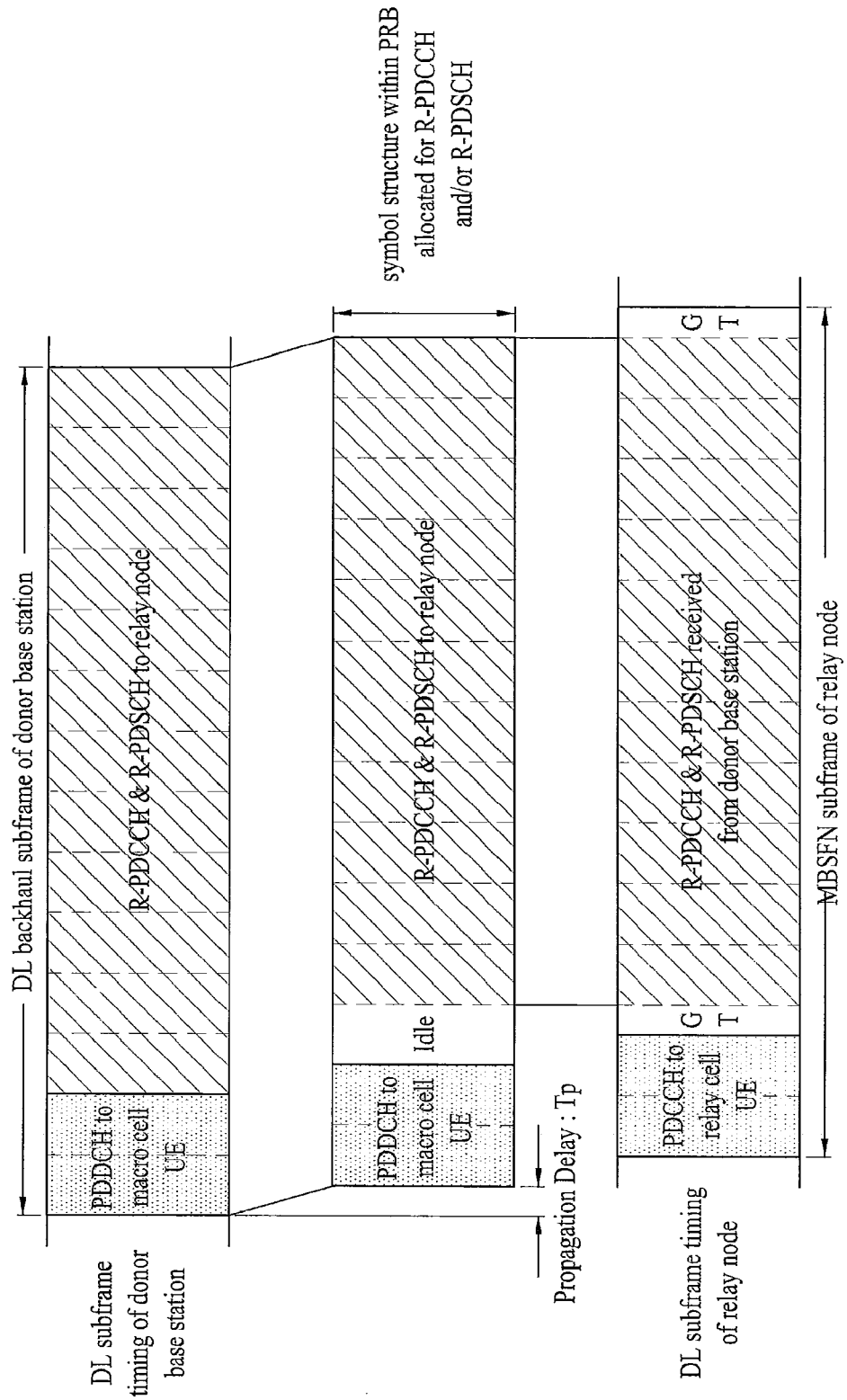

Referring to FIG. 13, a donor base station is able to allocate 2 OFDM symbols in a single DL backhaul subframe to PDCCH for a user equipment within a macro cell. And, the donor base station is able to allocate the remaining 12 OFDM symbols to PDSCH for the user equipment within the macro cell and R-PDCCH and R-PDSCH for a relay node. In doing so, the donor base station is able to allocate one of the remaining OFDM symbols to an idle interval. Preferably, the idle interval corresponding to the allocated one symbol can be located at a first symbol in a remaining region except a PDCCH region for the macro cell user equipment.

Due to the propagation delay and 0.5 OFDM symbol duration delay setup, after elapse of a time resulting from adding a time, which corresponds to a propagation delay from a timing point that the donor base station transmits the PDCCH to the user equipment within the macro cell, and 0.5 OFDM symbol duration together, the relay node is able to transmit the PDCCH to a user equipment within a relay cell. In doing so, the relay node is able to allocate 2 OFDM symbols for the PDCCH transmission in MBSFN subframe. And, the relay node is able to allocate 0.5 OFDM symbol following the PDCCH to a guard time (GT) for RF switching. Moreover, the relay node is able to allocate last 0.5 OFDM symbol of the MBSFN subframe to the guard time. Therefore, the relay node is able to receive the R-PDCCH and the R-PDSCH from the donor base station via total 11 OFDM symbol durations.

Figure 14:
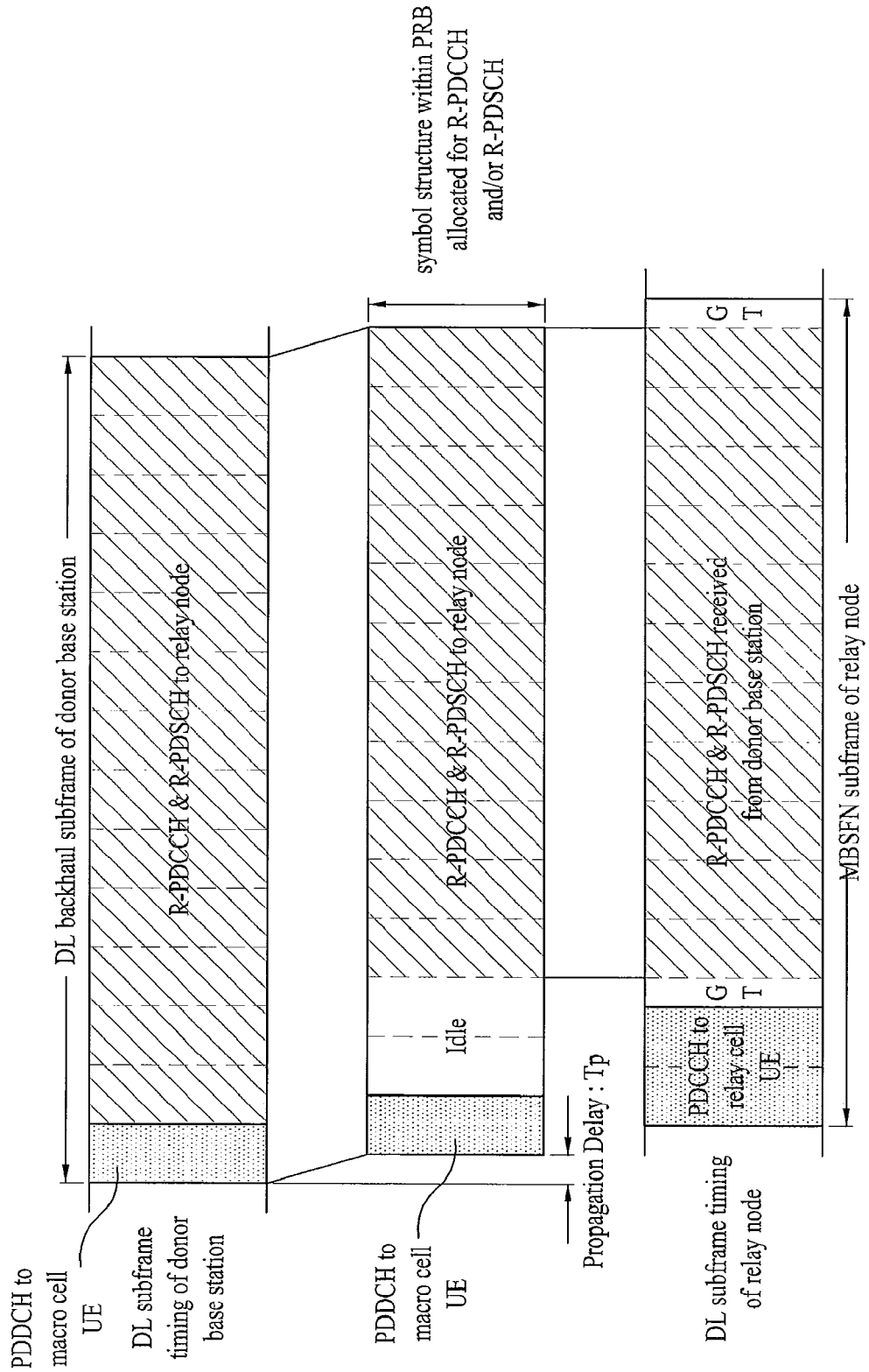

Referring to FIG. 14, a donor base station is able to allocate 1 OFDM symbol in a single DL backhaul subframe to PDCCH for a user equipment within a macro cell. And, the donor base station is able to allocate the remaining 13 OFDM symbols to PDSCH for the user equipment within the macro cell and R-PDCCH and R-PDSCH for a relay node. In doing so, the donor base station is able to allocate 2 symbols of the remaining 13 OFDM symbols to an idle interval. Preferably, the idle interval corresponding to the allocated two symbols can be located at first two symbols in a remaining region except a PDCCH region for the macro cell user equipment.

Due to the propagation delay and 0.5 OFDM symbol duration delay setup, after elapse of a time resulting from adding a time, which corresponds to a propagation delay from a timing point that the donor base station transmits the PDCCH to the user equipment within the macro cell, and 0.5 OFDM symbol duration together, the relay node is able to transmit the PDCCH to a user equipment within a relay cell. In doing so, the relay node is able to allocate 2 OFDM symbols for the PDCCH transmission in MBSFN subframe. And, the relay node is able to allocate 0.5 OFDM symbol following the PDCCH to a guard time (GT) for RF switching. Moreover, the relay node is able to allocate last 0.5 OFDM symbol of the MBSFN subframe to the guard time. Therefore, the relay node is able to receive the R-PDCCH and the R-PDSCH from the donor base station via total 11 OFDM symbol durations.

FIGS. 15 to 18 are diagram for examples of a symbol structure allocated for R-PDCCH and R-PDSCH transmission in a downlink backhaul subframe of a base station and an MBSFN subframe structure in a relay node when a downlink subframe timing of the relay node is set in a manner of being delayed by a half symbol in a downlink backhaul subframe reception timing of the base station.

Referring to FIGS. 15 to 18, like FIGS. 11 to 14, a DL subframe timing of a relay node can be set in a manner of being delayed by a half symbol from a DL backhaul frame reception timing of a base station. If a donor base station transmits PDCCH to a user equipment within a macro cell or transmits R-PDCCH and R-PDSCH for the relay node, a propagation delay (Tp) is generated due to such a transmission. Hence, after elapse of a time resulting from adding a time, which corresponds to a propagation delay from a timing point that the donor base station transmits the PDCCH to the user equipment within the macro cell, and 0.5 OFDM symbol duration together, the relay node is able to transmit the PDCCH to a user equipment within a relay cell. The PDCCH for the user equipment within the relay cell of the relay node can allocate 1 OFDM symbol. And, a size of the PDCCH of the donor base station may correspond to one of 4 OFDM symbols, 3 OFDM symbols, 2 OFDM symbols and one OFDM symbol.

Figure 15:
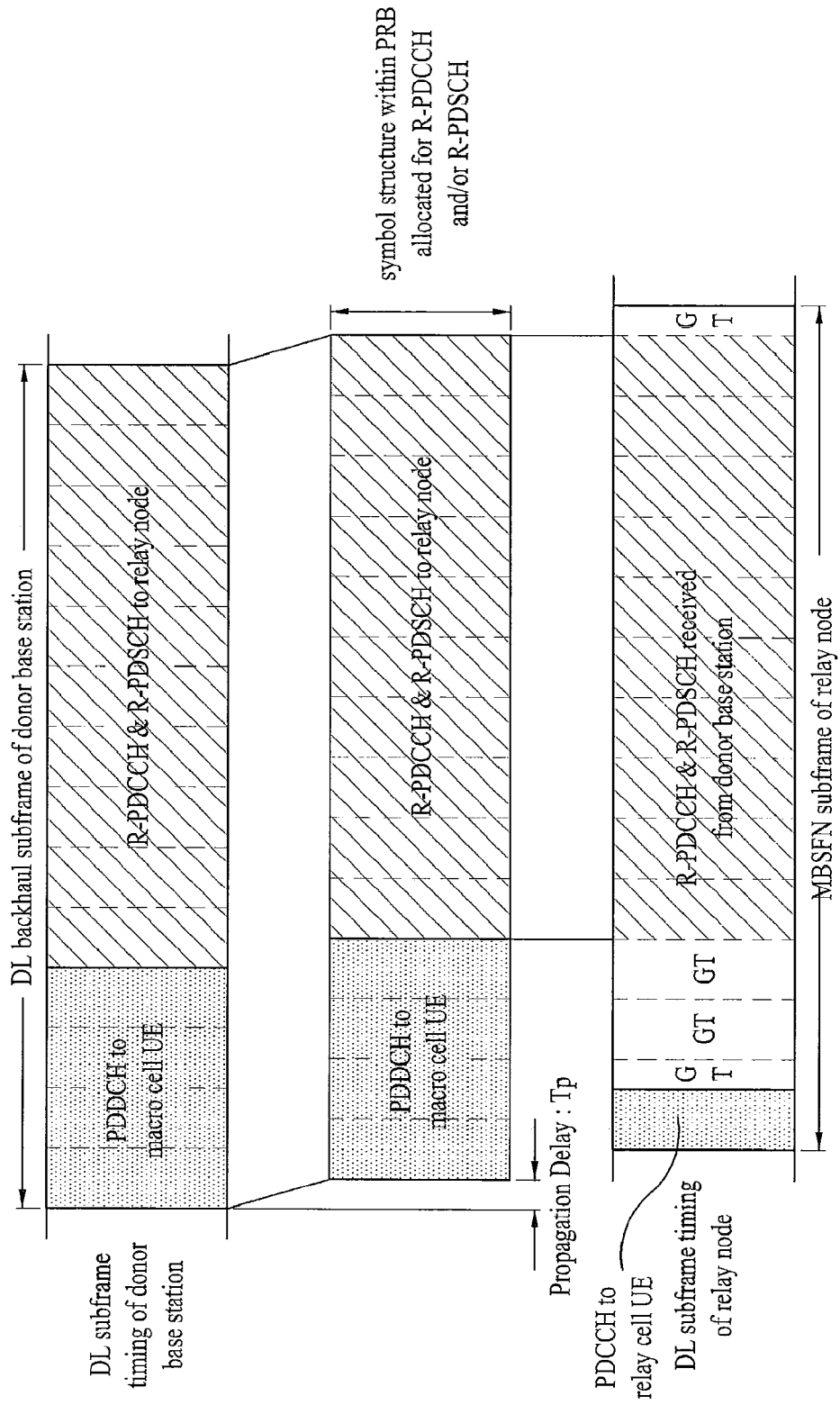
FIGS. 15 to 18 are diagram for examples of a symbol structure allocated for R-PDCCH and R-PDSCH transmission in a downlink backhaul subframe of a base station and an MBSFN subframe structure in a relay node when a downlink subframe timing of the relay node is set in a manner of being delayed by a half symbol in a downlink backhaul subframe reception timing of the base station.

Referring to FIG. 15, a donor base station is able to allocate 4 OFDM symbols in a single DL backhaul subframe to PDCCH for a user equipment within a macro cell. And, the donor base station is able to allocate the remaining 10 OFDM symbols to PDSCH for the user equipment within the macro cell and R-PDCCH and R-PDSCH for a relay node.

Due to the propagation delay and 0.5 OFDM symbol duration delay setup, after elapse of a time resulting from adding a time, which corresponds to a propagation delay from a timing point that the donor base station transmits the PDCCH to the user equipment within the macro cell, and 0.5 OFDM symbol duration together, the relay node is able to transmit the PDCCH to a user equipment within a relay cell. In doing so, the relay node is able to allocate 1 OFDM symbol for the PDCCH transmission in MBSFN subframe. And, the relay node is able to allocate 2.5 OFDM symbols following the PDCCH to a guard time (GT) for RF switching. In particular, in order for the relay node to receive the R-PDCCH and R-PDSCH from the donor base station in the course of transmitting the PDCCH to the user equipment within the relay cell in the MBSFN subframe, an RF switching time is necessary. And, the relay node is able to allocate last 0.5 OFDM symbol of the MBSFN subframe to the guard time. Therefore, the relay node is able to receive the R-PDCCH and the R-PDSCH from the donor base station via total 10 OFDM symbol durations.

Figure 16:
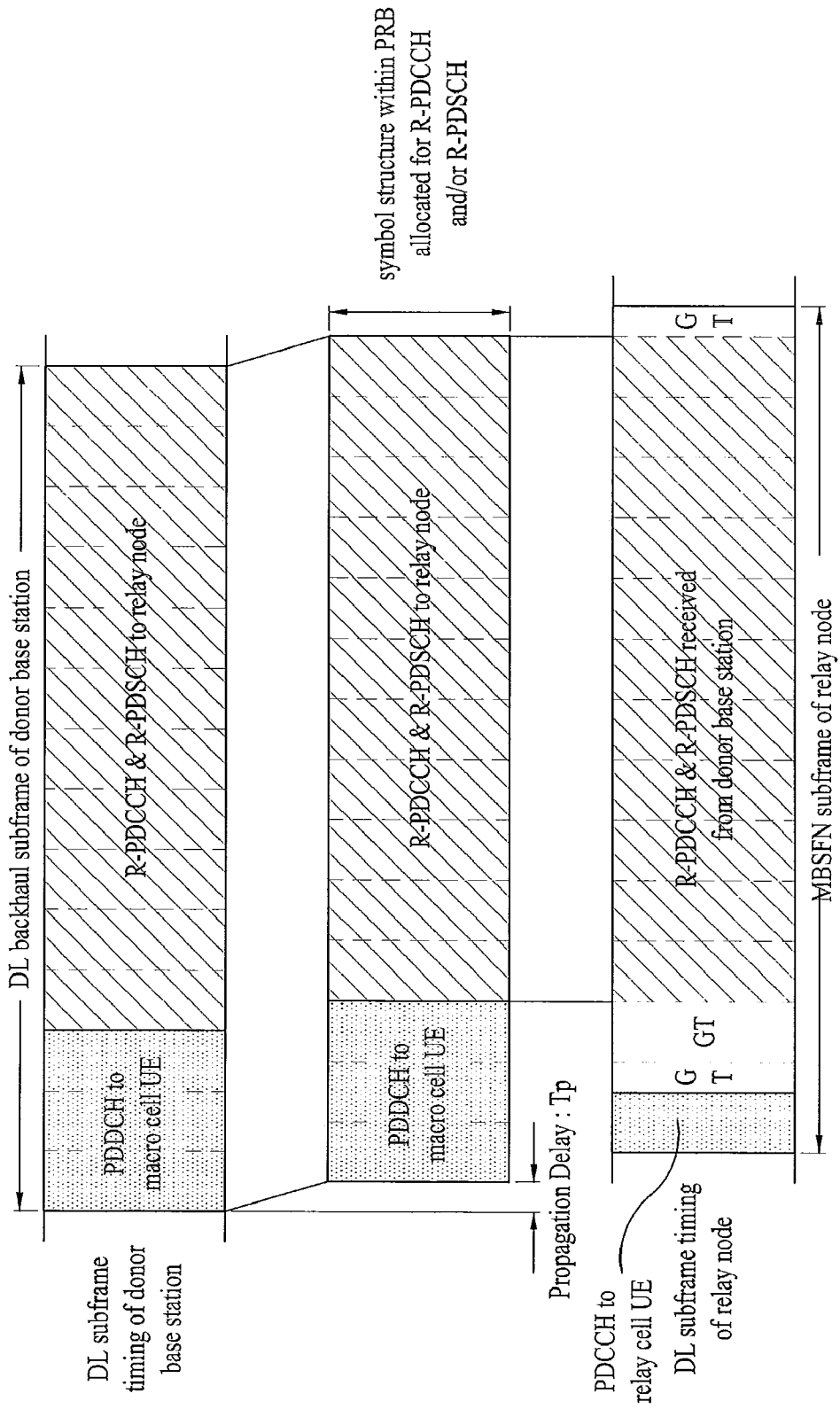

Referring to FIG. 16, a donor base station is able to allocate 3 OFDM symbols in a single DL backhaul subframe to PDCCH for a user equipment within a macro cell. And, the donor base station is able to allocate the remaining 11 OFDM symbols to PDSCH for the user equipment within the macro cell and R-PDCCH and R-PDSCH for a relay node.

Due to the propagation delay and 0.5 OFDM symbol duration delay setup, after elapse of a time resulting from adding a time, which corresponds to a propagation delay from a timing point that the donor base station transmits the PDCCH to the user equipment within the macro cell, and 0.5 OFDM symbol duration together, the relay node is able to transmit the PDCCH to a user equipment within a relay cell. In doing so, the relay node is able to allocate 1 OFDM symbol for the PDCCH transmission in MBSFN subframe. And, the relay node is able to allocate 1.5 OFDM symbol following the PDCCH to a guard time (GT) for RF switching. And, the relay node is able to allocate last 0.5 OFDM symbol of the MBSFN subframe to the guard time. Therefore, the relay node is able to receive the R-PDCCH and the R-PDSCH from the donor base station via total 11 OFDM symbol durations.

Figure 17:
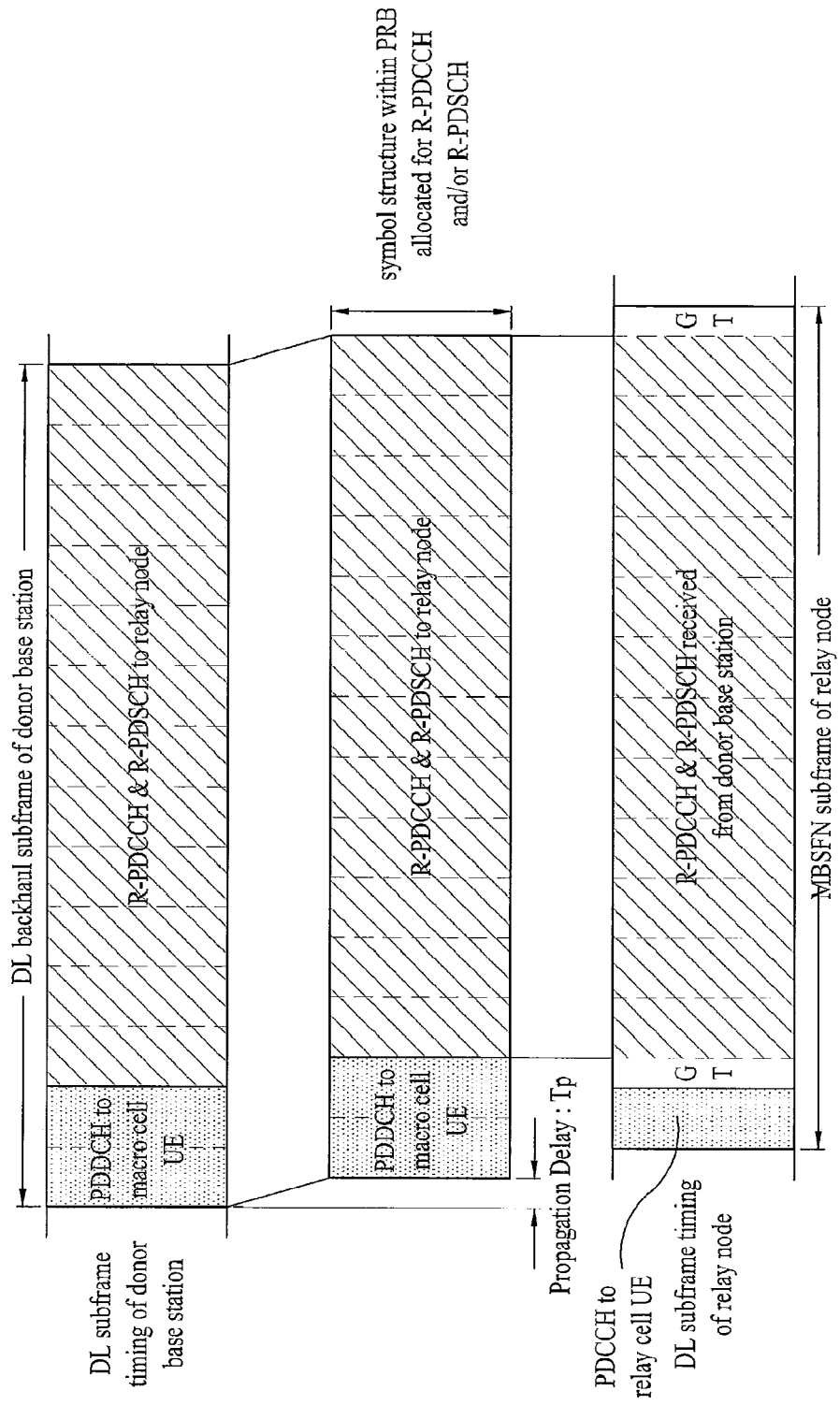

Referring to FIG. 17, a donor base station is able to allocate 2 OFDM symbols in a single DL backhaul subframe to PDCCH for a user equipment within a macro cell. And, the donor base station is able to allocate the remaining 12 OFDM symbols to PDSCH for the user equipment within the macro cell and R-PDCCH and R-PDSCH for a relay node.

Due to the propagation delay and 0.5 OFDM symbol duration delay setup, after elapse of a time resulting from adding a time, which corresponds to a propagation delay from a timing point that the donor base station transmits the PDCCH to the user equipment within the macro cell, and 0.5 OFDM symbol duration together, the relay node is able to transmit the PDCCH to a user equipment within a relay cell. The relay node is able to allocate 1 OFDM symbol for the PDCCH transmission in MBSFN subframe. And, the relay node is able to allocate 0.5 OFDM symbol following the PDCCH to a guard time (GT) for RF switching. Moreover, the relay node is able to allocate last 0.5 OFDM symbol of the MBSFN subframe to the guard time. Therefore, the relay node is able to receive the R-PDCCH and the R-PDSCH from the donor base station via total 12 OFDM symbol durations.

Figure 18:
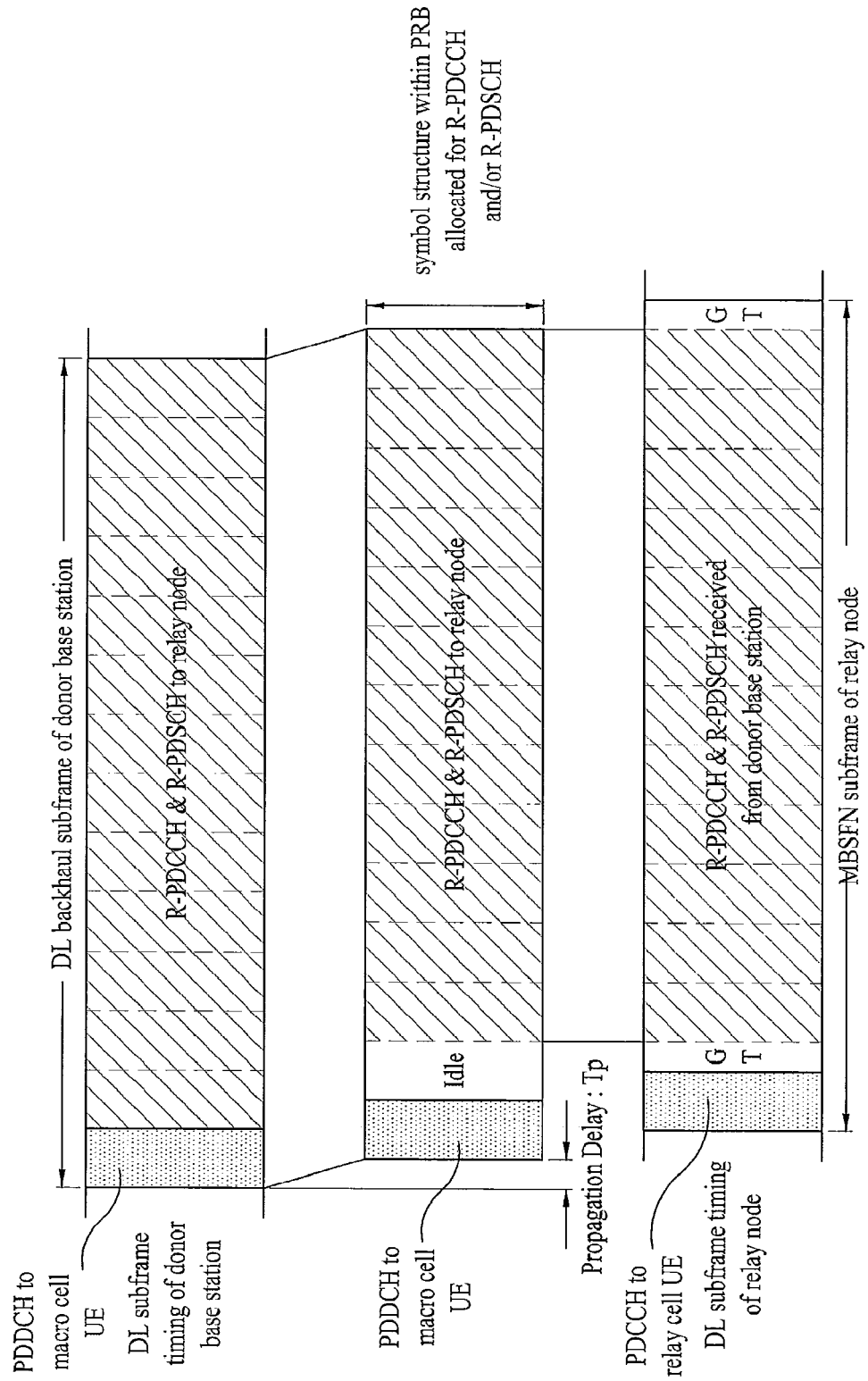

Referring to FIG. 18, a donor base station is able to allocate 1 OFDM symbol in a single DL backhaul subframe to PDCCH for a user equipment within a macro cell. And, the donor base station is able to allocate the remaining 13 OFDM symbols to PDSCH for the user equipment within the macro cell and R-PDCCH and R-PDSCH for a relay node. In doing so, the donor base station is able to allocate 1 of the remaining 13 OFDM symbols to an idle interval. Preferably, the idle interval corresponding to the allocated two symbols can be located at a first symbol in a remaining region except a PDCCH region for the macro cell user equipment.

Due to the propagation delay and 0.5 OFDM symbol duration delay setup, after elapse of a time resulting from adding a time, which corresponds to a propagation delay from a timing point that the donor base station transmits the PDCCH to the user equipment within the macro cell, and 0.5 OFDM symbol duration together, the relay node is able to transmit the PDCCH to a user equipment within a relay cell. The relay node is able to allocate 1 OFDM symbol for the PDCCH transmission in MBSFN subframe. And, the relay node is able to allocate 0.5 OFDM symbol following the PDCCH to a guard time (GT) for RF switching. Moreover, the relay node is able to allocate last 0.5 OFDM symbol of the MBSFN subframe to the guard time. Therefore, the relay node is able to receive the R-PDCCH and the R-PDSCH from the donor base station via total 12 OFDM symbol durations.

FIGS. 19 to 22 are diagram for examples of a symbol structure allocated for R-PDCCH and R-PDSCH transmission in a downlink backhaul subframe of a base station and an MBSFN subframe structure in a relay node when a downlink subframe timing of the relay node is set in a manner of being delayed by one symbol in a downlink backhaul subframe reception timing of the base station.

Referring to FIGS. 19 to 22, unlike FIGS. 11 to 18, a DL subframe timing of a relay node can be set in a manner of being delayed by one symbol from a DL backhaul frame reception timing of a base station. If a donor base station transmits PDCCH to a user equipment within a macro cell or transmits R-PDCCH and R-PDSCH for the relay node, a propagation delay (Tp) is generated due to such a transmission. Hence, after elapse of a time resulting from adding a time, which corresponds to a propagation delay from a timing point that the donor base station transmits the PDCCH to the user equipment within the macro cell, and 1 OFDM symbol duration together, the relay node is able to transmit the PDCCH to a user equipment within a relay cell. The PDCCH for the user equipment within the relay cell of the relay node can allocate 2 OFDM symbols. And, a size of the PDCCH of the donor base station may correspond to one of 4 OFDM symbols, 3 OFDM symbols, 2 OFDM symbols and one OFDM symbol.

Figure 19:
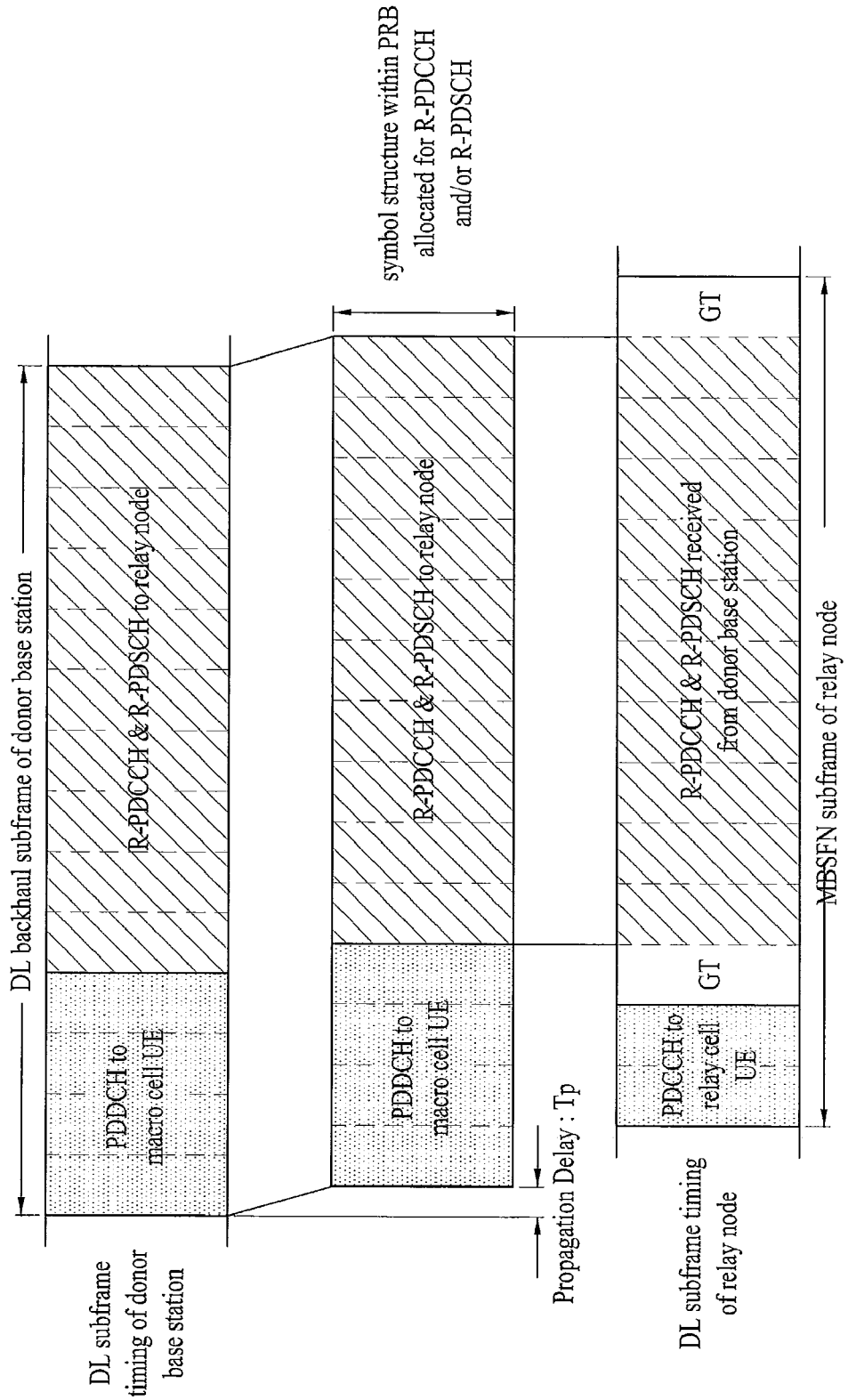
FIGS. 19 to 22 are diagram for examples of a symbol structure allocated for R-PDCCH and R-PDSCH transmission in a downlink backhaul subframe of a base station and an MBSFN subframe structure in a relay node when a downlink subframe timing of the relay node is set in a manner of being delayed by one symbol in a downlink backhaul subframe reception timing of the base station.

Referring to FIG. 19, a donor base station is able to allocate 4 OFDM symbols in a single DL backhaul subframe to PDCCH for a user equipment within a macro cell. And, the donor base station is able to allocate the remaining 10 OFDM symbols to PDSCH for the user equipment within the macro cell and R-PDCCH and R-PDSCH for a relay node.

Due to the propagation delay and 1 OFDM symbol duration delay setup, after elapse of a time resulting from adding a time, which corresponds to a propagation delay from a timing point that the donor base station transmits the PDCCH to the user equipment within the macro cell, and 1 OFDM symbol duration together, the relay node is able to transmit the PDCCH to a user equipment within a relay cell. In doing so, the relay node is able to allocate 2 OFDM symbols for the PDCCH transmission in MBSFN subframe. And, the relay node is able to allocate 1 OFDM symbol following the PDCCH to a guard time (GT) for RF switching. In particular, in order for the relay node to receive the R-PDCCH and R-PDSCH from the donor base station in the course of transmitting the PDCCH to the user equipment within the relay cell in the MBSFN subframe, an RF switching time is necessary. And, the relay node is able to allocate last 1 OFDM symbol of the MBSFN subframe to the guard time. Therefore, the relay node is able to receive the R-PDCCH and the R-PDSCH from the donor base station via total 10 OFDM symbol durations.

Figure 20:
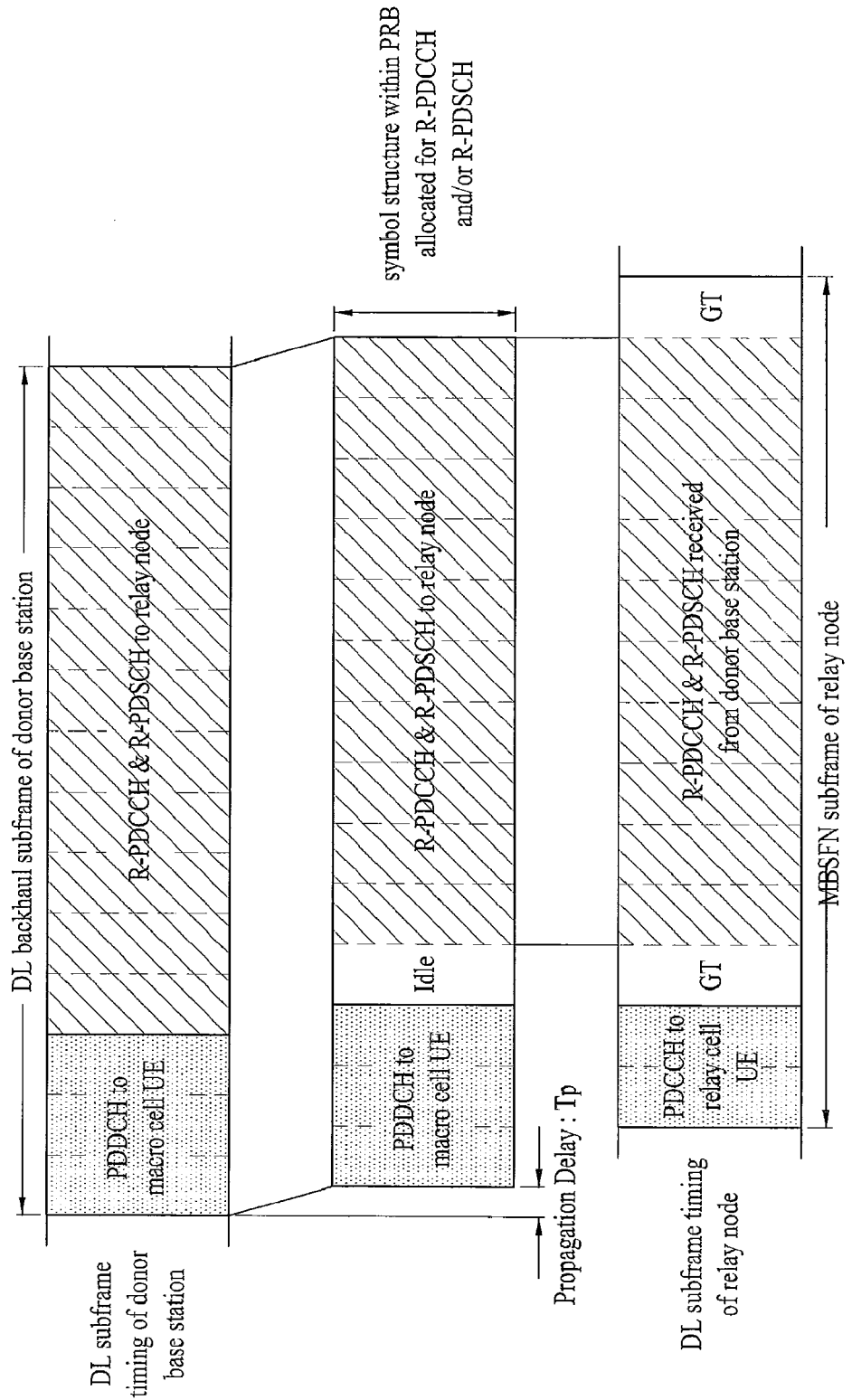

Referring to FIG. 20, a donor base station is able to allocate 3 OFDM symbols in a single DL backhaul subframe to PDCCH for a user equipment within a macro cell. And, the donor base station is able to allocate the remaining 11 OFDM symbols to PDSCH for the user equipment within the macro cell and R-PDCCH and R-PDSCH for a relay node. In this case, the donor base station is able to one of the remaining 11 OFDM symbols to an idle interval. Preferably, the idle interval corresponding to the allocated one symbol can be located at a first 1 symbol in a remaining region except a PDCCH region for the macro cell user equipment.

Due to the propagation delay and 1 OFDM symbol duration delay setup, after elapse of a time resulting from adding a time, which corresponds to a propagation delay from a timing point that the donor base station transmits the PDCCH to the user equipment within the macro cell, and 1 OFDM symbol duration together, the relay node is able to transmit the PDCCH to a user equipment within a relay cell. In doing so, the relay node is able to allocate 1 OFDM symbol for the PDCCH transmission in MBSFN subframe. And, the relay node is able to allocate 1 OFDM symbol following the PDCCH to a guard time (GT) for RF switching. And, the relay node is able to allocate last 1 OFDM symbol of the MBSFN subframe to the guard time. Therefore, the relay node is able to receive the R-PDCCH and the R-PDSCH from the donor base station via total 10 OFDM symbol durations.

Figure 21:
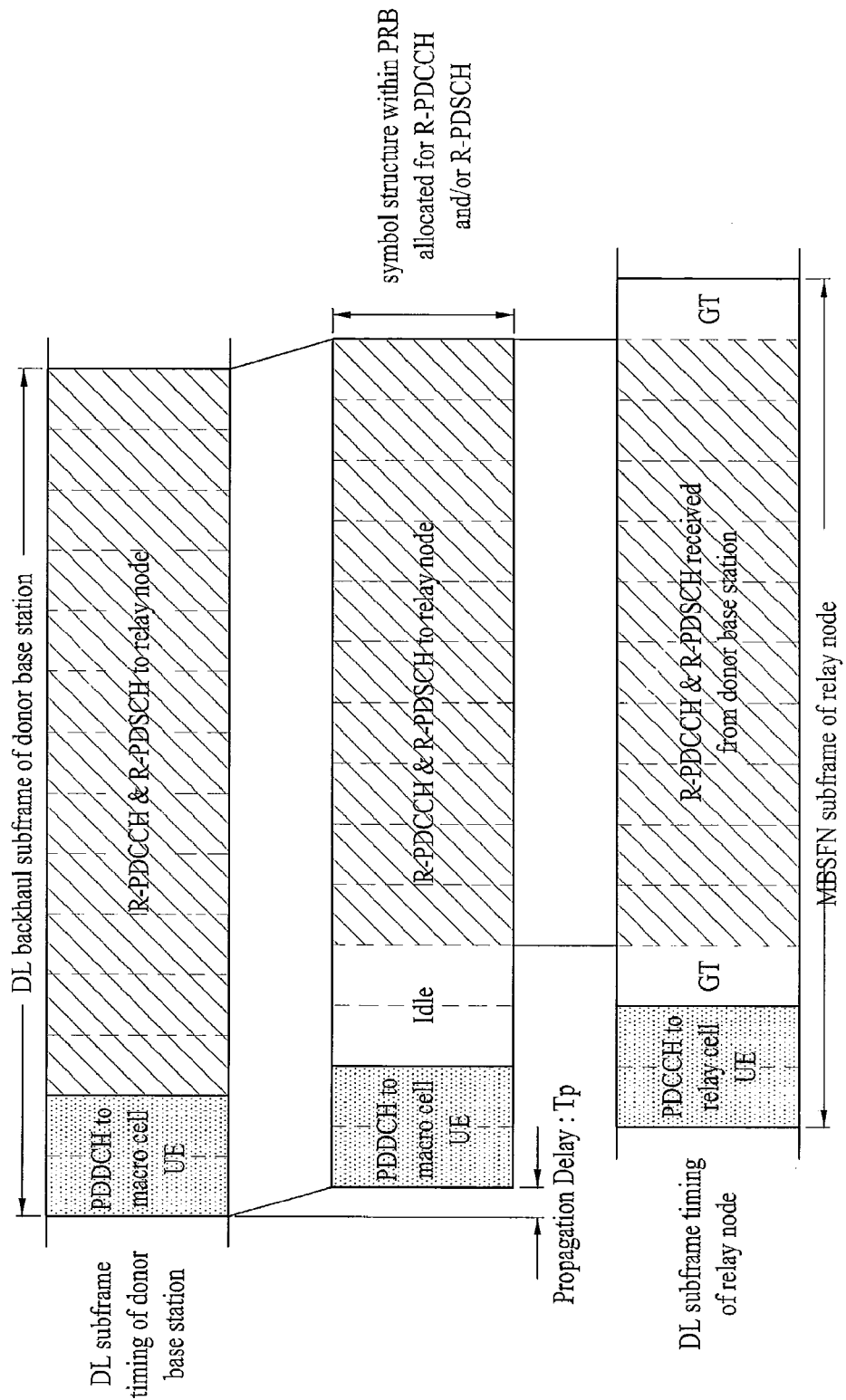

Referring to FIG. 21, a donor base station is able to allocate 2 OFDM symbols in a single DL backhaul subframe to PDCCH for a user equipment within a macro cell. And, the donor base station is able to allocate the remaining 12 OFDM symbols to PDSCH for the user equipment within the macro cell and R-PDCCH and R-PDSCH for a relay node. In doing so, the donor base station is able to allocate 2 OFDM symbols of the remaining 12 OFDM symbols to an idle interval. Preferably, the idle interval corresponding to the allocated 2 symbols can be located at first 2 symbols in a remaining region except a PDCCH region for the macro cell user equipment.

Due to the propagation delay and 1 OFDM symbol duration delay setup, after elapse of a time resulting from adding a time, which corresponds to a propagation delay from a timing point that the donor base station transmits the PDCCH to the user equipment within the macro cell, and 1 OFDM symbol duration together, the relay node is able to transmit the PDCCH to a user equipment within a relay cell. And, the relay node is able to allocate 1 OFDM symbol for the PDCCH transmission in MBSFN subframe. Moreover, the relay node is able to allocate 1 OFDM symbol following the PDCCH to a guard time (GT) for RF switching. Besides, the relay node is able to allocate last 1 OFDM symbol of the MBSFN subframe to the guard time. Therefore, the relay node is able to receive the R-PDCCH and the R-PDSCH from the donor base station via total 10 OFDM symbol durations.

Figure 22:
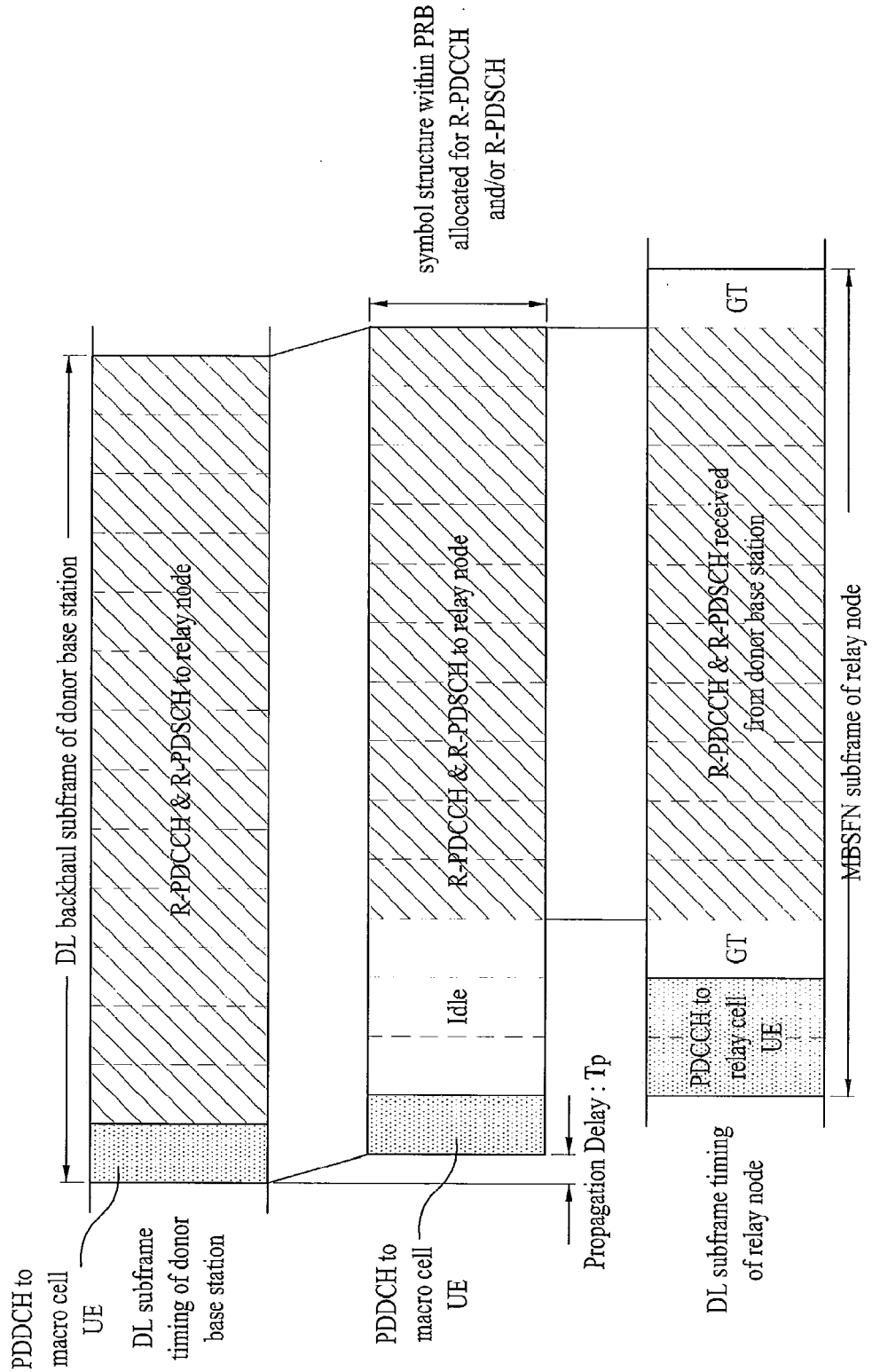

Referring to FIG. 22, a donor base station is able to allocate 1 OFDM symbol in a single DL backhaul subframe to PDCCH for a user equipment within a macro cell. And, the donor base station is able to allocate the remaining 13 OFDM symbols to PDSCH for the user equipment within the macro cell and R-PDCCH and R-PDSCH for a relay node. In doing so, the donor base station is able to allocate 3 of the remaining 13 OFDM symbols to an idle interval. Preferably, the idle interval corresponding to the allocated 3 symbols can be located at first three symbols in a remaining region except a PDCCH region for the macro cell user equipment.

Due to the propagation delay and 1 OFDM symbol duration delay setup, after elapse of a time resulting from adding a time, which corresponds to a propagation delay from a timing point that the donor base station transmits the PDCCH to the user equipment within the macro cell, and 1 OFDM symbol duration together, the relay node is able to transmit the PDCCH to a user equipment within a relay cell. In doing so, the relay node is able to allocate 2 OFDM symbols for the PDCCH transmission in MBSFN subframe. And, the relay node is able to allocate 1 OFDM symbol following the PDCCH to a guard time (GT) for RF switching. Moreover, the relay node is able to allocate last 1 OFDM symbol of the MBSFN subframe to the guard time. Therefore, the relay node is able to receive the R-PDCCH and the R-PDSCH from the donor base station via total 10 OFDM symbol durations.

FIGS. 23 to 26 are diagram for examples of a symbol structure allocated for R-PDCCH and R-PDSCH transmission in a downlink backhaul subframe of a base station and an MBSFN subframe structure in a relay node when a downlink subframe timing of the relay node is set in a manner of being delayed by one symbol in a downlink backhaul subframe reception timing of the base station.

Referring to FIGS. 23 to 26, like FIGS. 19 to 22, a DL subframe timing of a relay node can be set in a manner of being delayed by 1 symbol from a DL backhaul frame reception timing of a base station. If a donor base station transmits PDCCH to a user equipment within a macro cell or transmits R-PDCCH and R-PDSCH for the relay node, a propagation delay (Tp) is generated due to such a transmission. Hence, after elapse of a time resulting from adding a time, which corresponds to a propagation delay from a timing point that the donor base station transmits the PDCCH to the user equipment within the macro cell, and 1 OFDM symbol duration together, the relay node is able to transmit the PDCCH to a user equipment within a relay cell. The PDCCH for the user equipment within the relay cell of the relay node can allocate 1 OFDM symbol. And, a size of the PDCCH of the donor base station may correspond to one of 4 OFDM symbols, 3 OFDM symbols, 2 OFDM symbols and one OFDM symbol.

Figure 23:
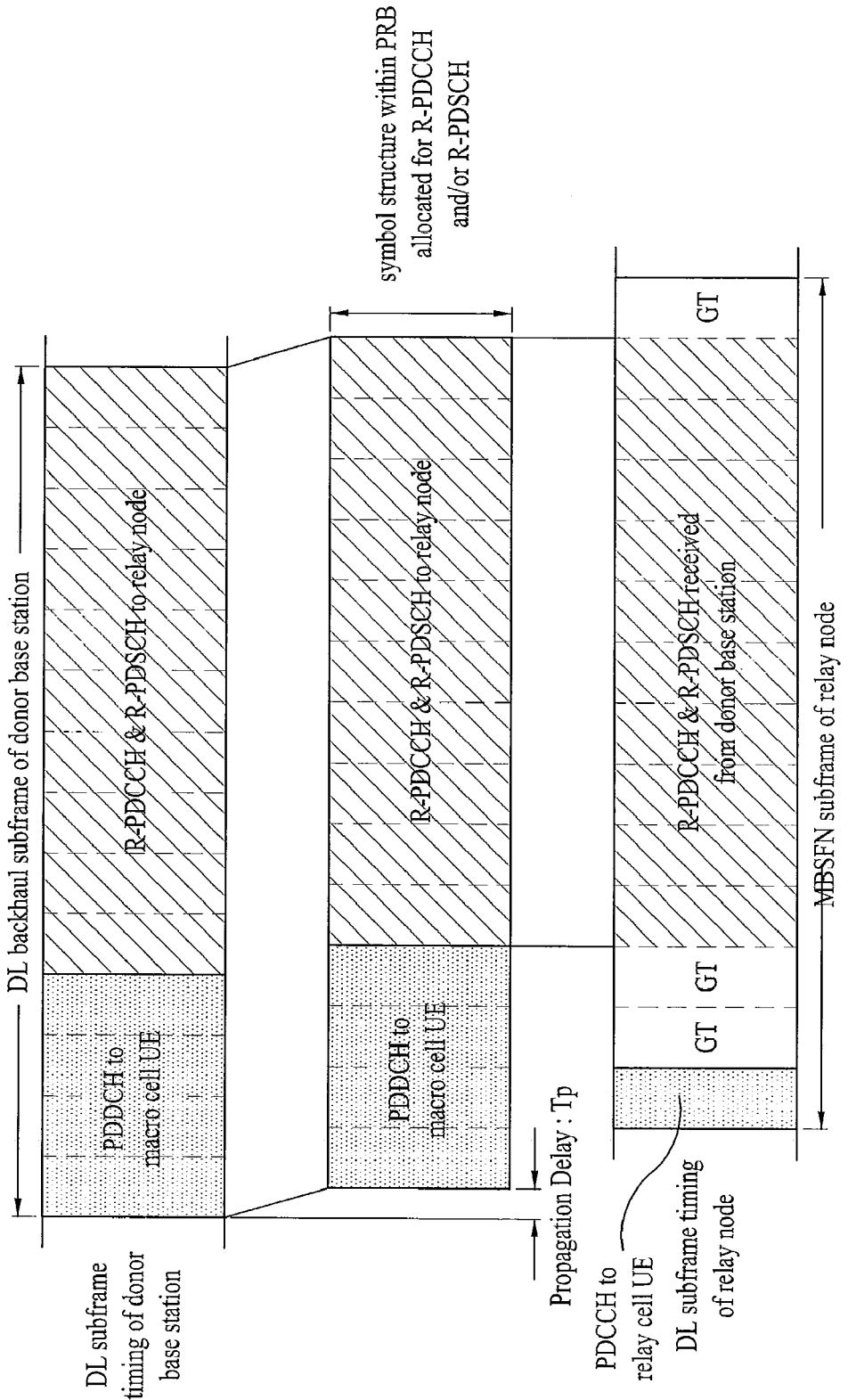
FIGS. 23 to 26 are diagram for examples of a symbol structure allocated for R-PDCCH and R-PDSCH transmission in a downlink backhaul subframe of a base station and an MBSFN subframe structure in a relay node when a downlink subframe timing of the relay node is set in a manner of being delayed by one symbol in a downlink backhaul subframe reception timing of the base station.

Referring to FIG. 23, a donor base station is able to allocate 4 OFDM symbols in a single DL backhaul subframe to PDCCH for a user equipment within a macro cell. And, the donor base station is able to allocate the remaining 10 OFDM symbols to PDSCH for the user equipment within the macro cell and R-PDCCH and R-PDSCH for a relay node.

Due to the propagation delay and 1 OFDM symbol duration delay setup, after elapse of a time resulting from adding a time, which corresponds to a propagation delay from a timing point that the donor base station transmits the PDCCH to the user equipment within the macro cell, and 1 OFDM symbol duration together, the relay node is able to transmit the PDCCH to a user equipment within a relay cell. In doing so, the relay node is able to allocate 1 OFDM symbol for the PDCCH transmission in MBSFN subframe. And, the relay node is able to allocate 2 OFDM symbols following the PDCCH to a guard time (GT) for RF switching. In particular, in order for the relay node to receive the R-PDCCH and R-PDSCH from the donor base station in the course of transmitting the PDCCH to the user equipment within the relay cell in the MBSFN subframe, an RF switching time is necessary. And, the relay node is able to allocate last 1 OFDM symbol of the MBSFN subframe to the guard time. Therefore, the relay node is able to receive the R-PDCCH and the R-PDSCH from the donor base station via total 10 OFDM symbol durations.

Figure 24:
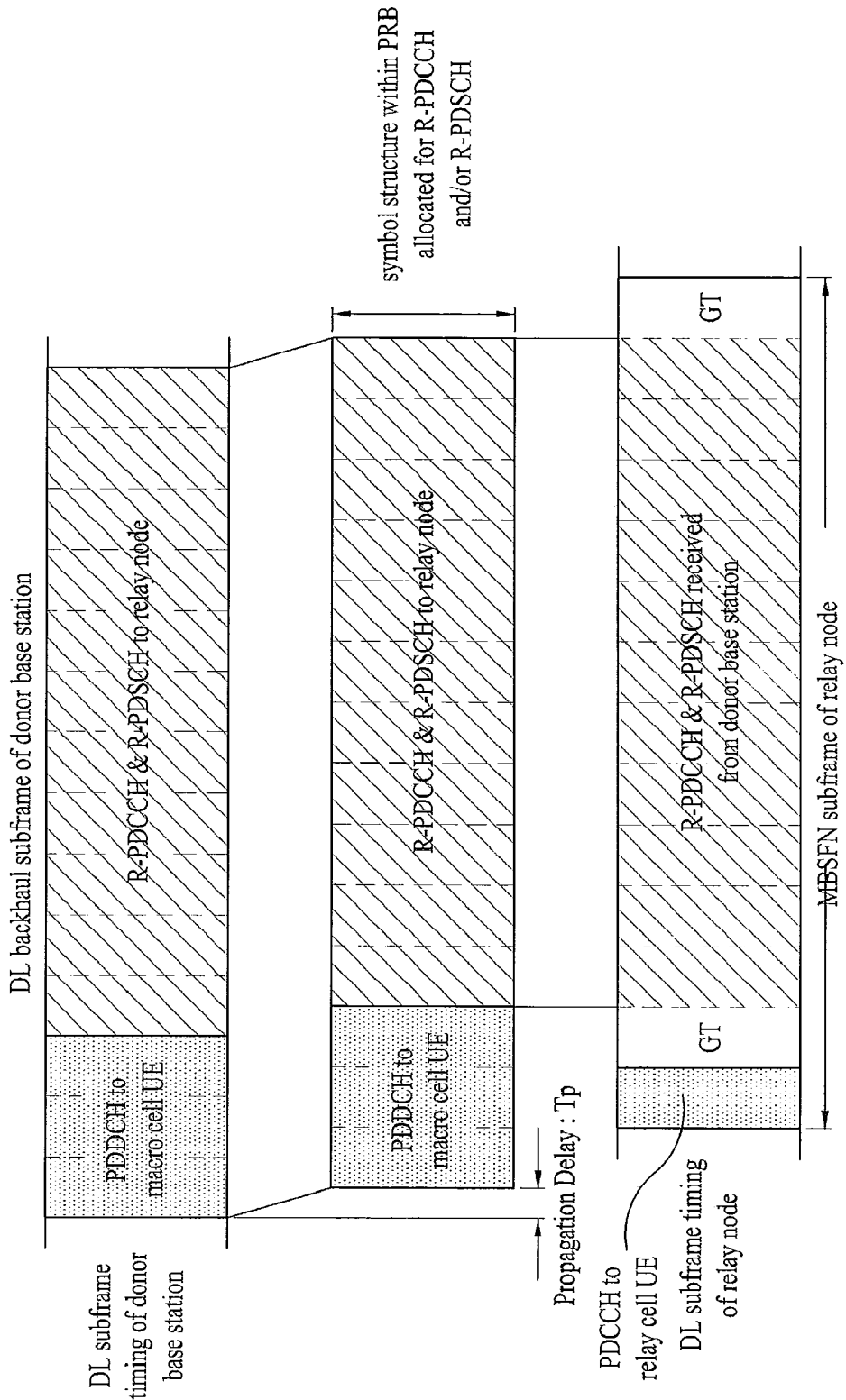

Referring to FIG. 24, a donor base station is able to allocate 3 OFDM symbols in a single DL backhaul subframe to PDCCH for a user equipment within a macro cell. And, the donor base station is able to allocate the remaining 11 OFDM symbols to PDSCH for the user equipment within the macro cell and R-PDCCH and R-PDSCH for a relay node.

Due to the propagation delay and 1 OFDM symbol duration delay setup, after elapse of a time resulting from adding a time, which corresponds to a propagation delay from a timing point that the donor base station transmits the PDCCH to the user equipment within the macro cell, and 1 OFDM symbol duration together, the relay node is able to transmit the PDCCH to a user equipment within a relay cell. In doing so, the relay node is able to allocate 1 OFDM symbol for the PDCCH transmission in MBSFN subframe. The relay node is able to allocate 1 OFDM symbol following the PDCCH to a guard time (GT) for RF switching. And, the relay node is able to allocate last 1 OFDM symbol of the MBSFN subframe to the guard time. Therefore, the relay node is able to receive the R-PDCCH and the R-PDSCH from the donor base station via total 11 OFDM symbol durations.

Figure 25:
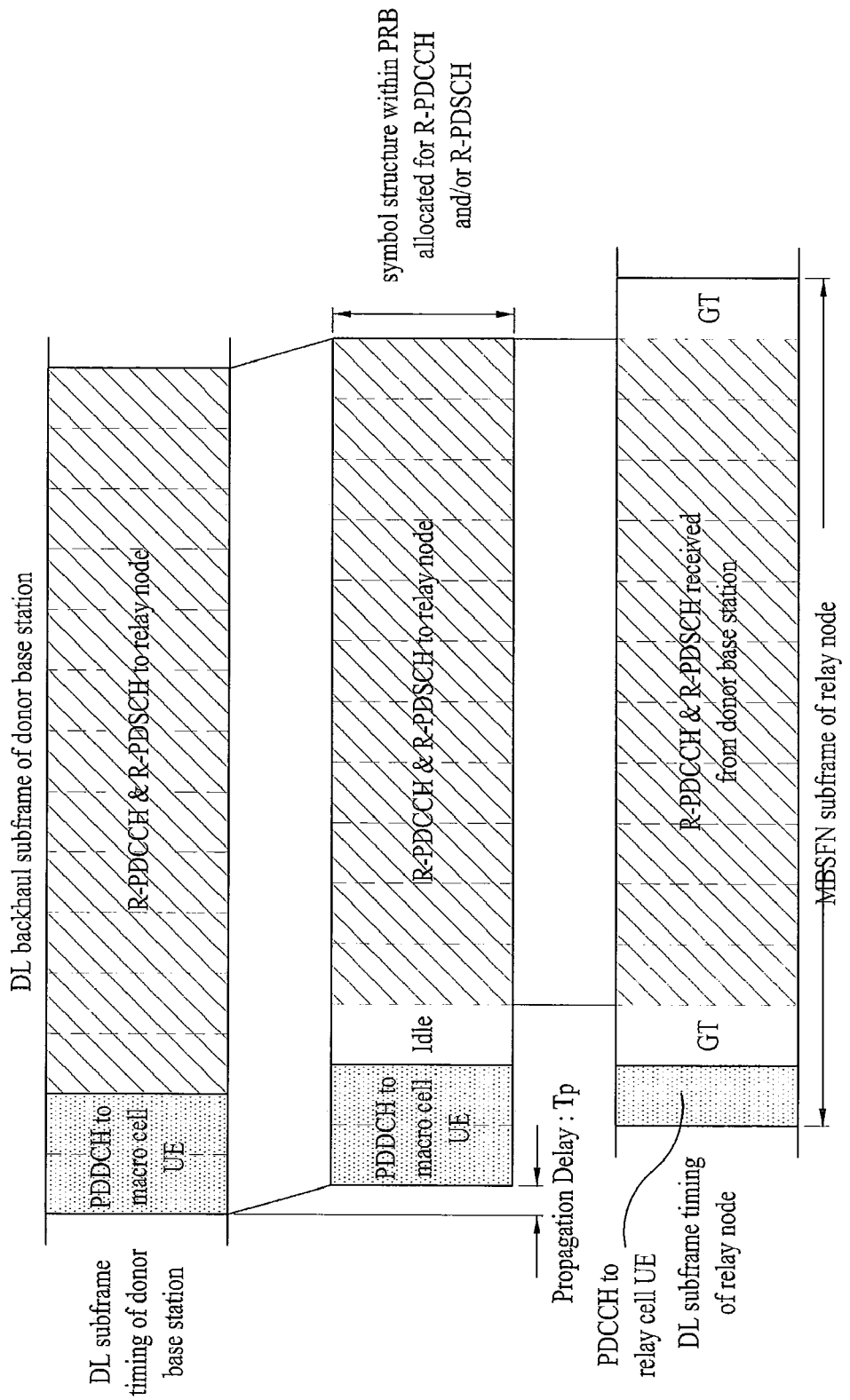

Referring to FIG. 25, a donor base station is able to allocate 2 OFDM symbols in a single DL backhaul subframe to PDCCH for a user equipment within a macro cell. And, the donor base station is able to allocate the remaining 12 OFDM symbols to PDSCH for the user equipment within the macro cell and R-PDCCH and R-PDSCH for a relay node. In this case, the donor base station is able to one of the remaining 12 OFDM symbols to an idle interval. Preferably, the idle interval corresponding to the allocated one symbol can be located at a first 1 symbol in a remaining region except a PDCCH region for the macro cell user equipment.

Due to the propagation delay and 1 OFDM symbol duration delay setup, after elapse of a time resulting from adding a time, which corresponds to a propagation delay from a timing point that the donor base station transmits the PDCCH to the user equipment within the macro cell, and 1 OFDM symbol duration together, the relay node is able to transmit the PDCCH to a user equipment within a relay cell. The relay node is able to allocate 1 OFDM symbol for the PDCCH transmission in MBSFN subframe. And, the relay node is able to allocate 1 OFDM symbol following the PDCCH to a guard time (GT) for RF switching. Moreover, the relay node is able to allocate last 1 OFDM symbol of the MBSFN subframe to the guard time. Therefore, the relay node is able to receive the R-PDCCH and the R-PDSCH from the donor base station via total 11 OFDM symbol durations.

Figure 26:
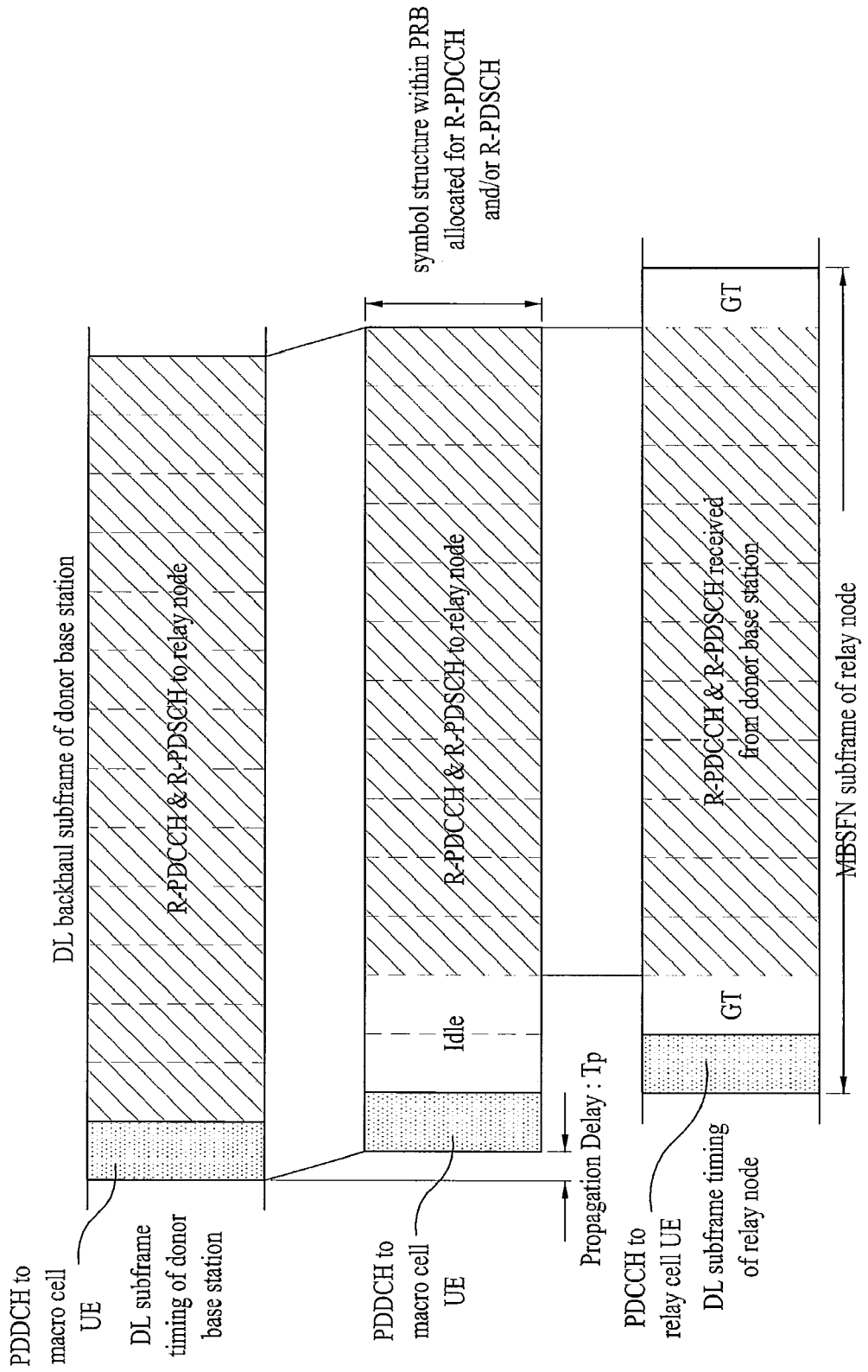

Referring to FIG. 26, a donor base station is able to allocate 1 OFDM symbol in a single DL backhaul subframe to PDCCH for a user equipment within a macro cell. And, the donor base station is able to allocate the remaining 13 OFDM symbols to PDSCH for the user equipment within the macro cell and R-PDCCH and R-PDSCH for a relay node. In doing so, the donor base station is able to allocate 2 of the remaining 13 OFDM symbols to an idle interval. Preferably, the idle interval corresponding to the allocated two symbols can be located at first two symbols in a remaining region except a PDCCH region for the macro cell user equipment.

Due to the propagation delay and 1 OFDM symbol duration delay setup, after elapse of a time resulting from adding a time, which corresponds to a propagation delay from a timing point that the donor base station transmits the PDCCH to the user equipment within the macro cell, and 1 OFDM symbol duration together, the relay node is able to transmit the PDCCH to a user equipment within a relay cell. The relay node is able to allocate 1 OFDM symbol for the PDCCH transmission in MBSFN subframe. And, the relay node is able to allocate 1 OFDM symbol following the PDCCH to a guard time (GT) for RF switching. Moreover, the relay node is able to allocate last 1 OFDM symbol of the MBSFN subframe to the guard time. Therefore, the relay node is able to receive the R-PDCCH and the R-PDSCH from the donor base station via total 11 OFDM symbol durations.

Figure 27:
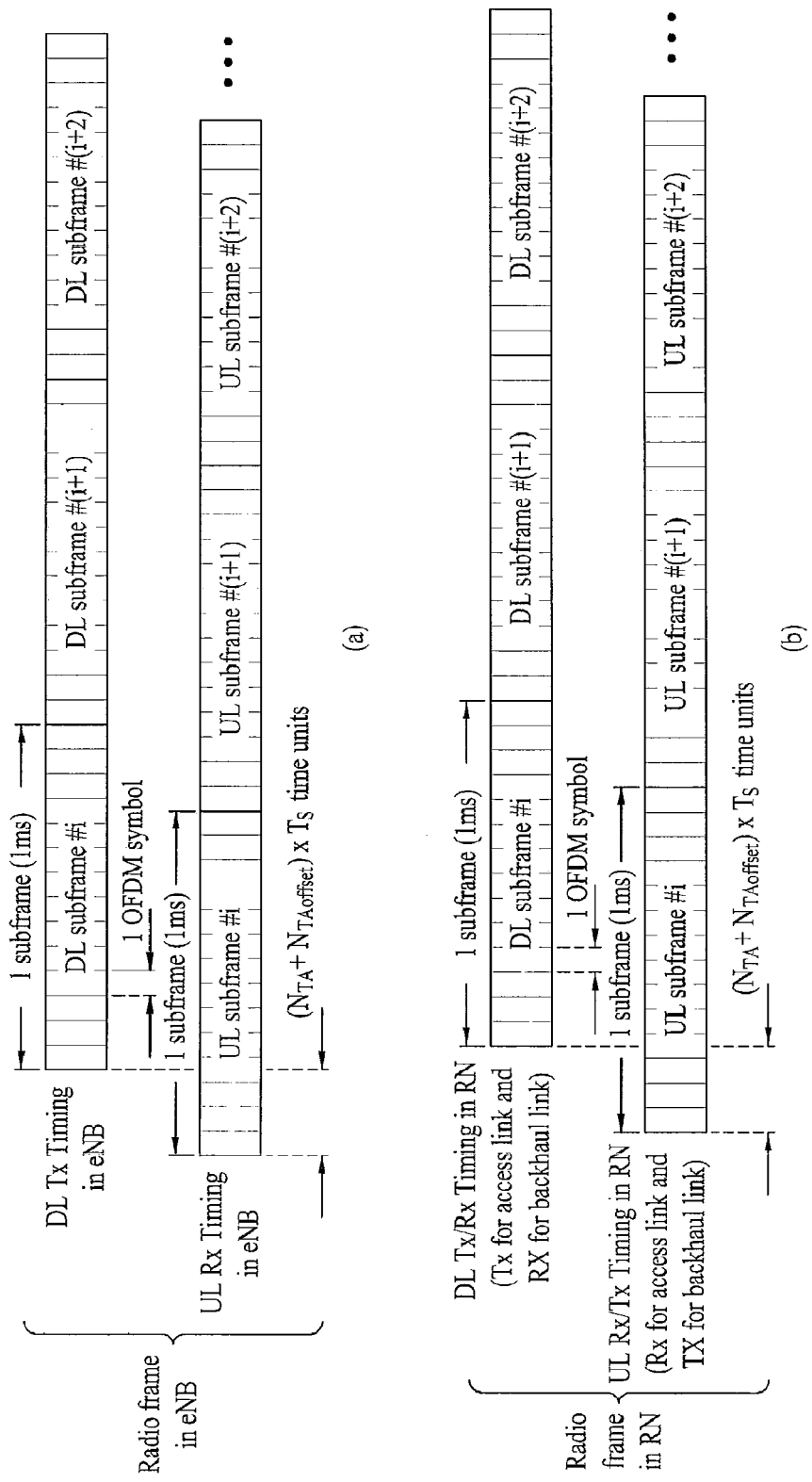
FIG. 27 is a diagram for one example of a frame structure corresponding to a case that subframe timings in uplink and downlink of a base station and a relay node are aligned.

FIG. 27 is a diagram for one example of a frame structure corresponding to a case that subframe timings in uplink and downlink of a base station and a relay node are aligned.

Referring to FIG. 27(a), a UL reception timing in a base station can be set ahead of a DL transmission timing by a time '$(N_{TA}+N_{TAoffset})\times Ts$'. In particular, a start point of a UL subframe i for receiving a UL signal received from a user equipment can be set ahead of a start point of a DL subframe i for performing a DL transmission to the user equipment by the time '$(N_{TA}+N_{TAoffset})\times Ts$'. In this case, the $N_{TA}$ indicates a timing offset between a UL radio frame and a UL radio frame and is represented as a Ts unit. And, the $N_{TAoffset}$ indicates a fixed timing advance offset and can be represented as a Ts unit. In this case, the Ts is a basic time unit. And, it is possible to set $0 \leq N_{TA} \leq 20512$, $N_{TAoffset}=0$ for a frame structure type 1, or $N_{TAoffset}=624$ for a frame structure type 2.

As mentioned in the above description, a UL reception timing in a base station can be set to be ahead of a DL transmission timing in consideration of a propagation delay according to a transmission of a user equipment or a relay node.

Referring to FIG. 27(b), a relay node is able to transmit and receives signals via backhaul link and access link in a UL subframe, respectively. In doing so, a UL transmission timing in the relay node can be set to go ahead of a DL transmission timing of the relay node by a time '$(N_{TA}+N_{TAoffset})\times Ts$'. Moreover, the UL transmission timing in the relay node can go ahead of the former DL subframe timing of the base station shown in FIG. 27(a) by the time '$(N_{TA}+N_{TAoffset})\times Ts$'. Due to the propagation delay in accordance with the transmission of the user equipment, the UL reception timing in the relay node can be set to go ahead of the DL transmission timing of the relay node.

Figure 28:
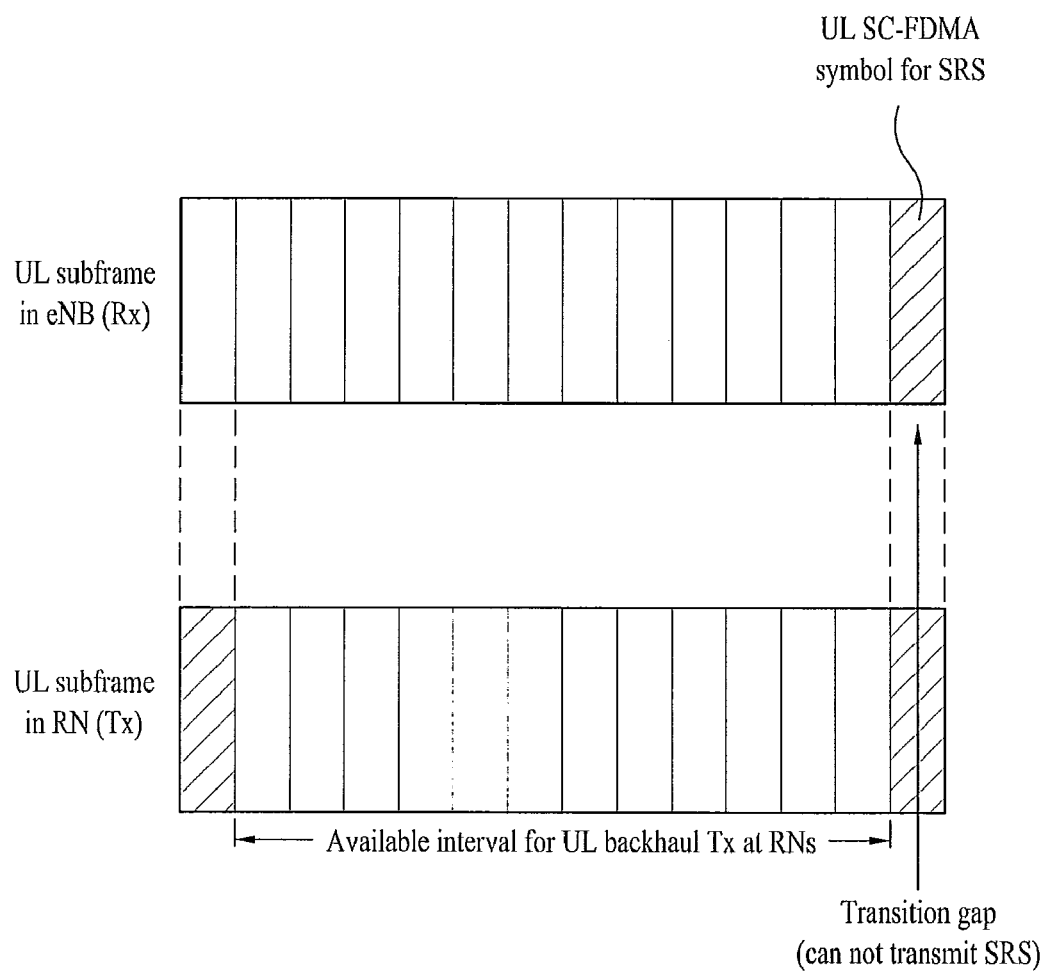
FIG. 28 is a diagram for uplink backhaul subframe operations in a base station and a relay node in accordance with FIG. 27.

FIG. 28 is a diagram for uplink backhaul subframe operations in a base station and a relay node in accordance with FIG. 27.

A base station needs to estimate a channel quality of a UL backhaul channel. For this, a relay node is able to transmit a sounding reference signal (SRS) in an available interval for a UL backhaul transmission. In particular, the relay node is able to transmit the SRS via a last symbol in a UL subframe, and the base station is able to receive the SRS from the relay node via the last symbol in the UL subframe. Yet, in case that a last symbol in a UL backhaul subframe of the relay node is allocated to a transition gap, the relay node is unable to transmit the SRS to the base station. In order to solve this problem, it is able to consider the following structures shown in FIG. 29 and FIG. 30.

Figure 29:
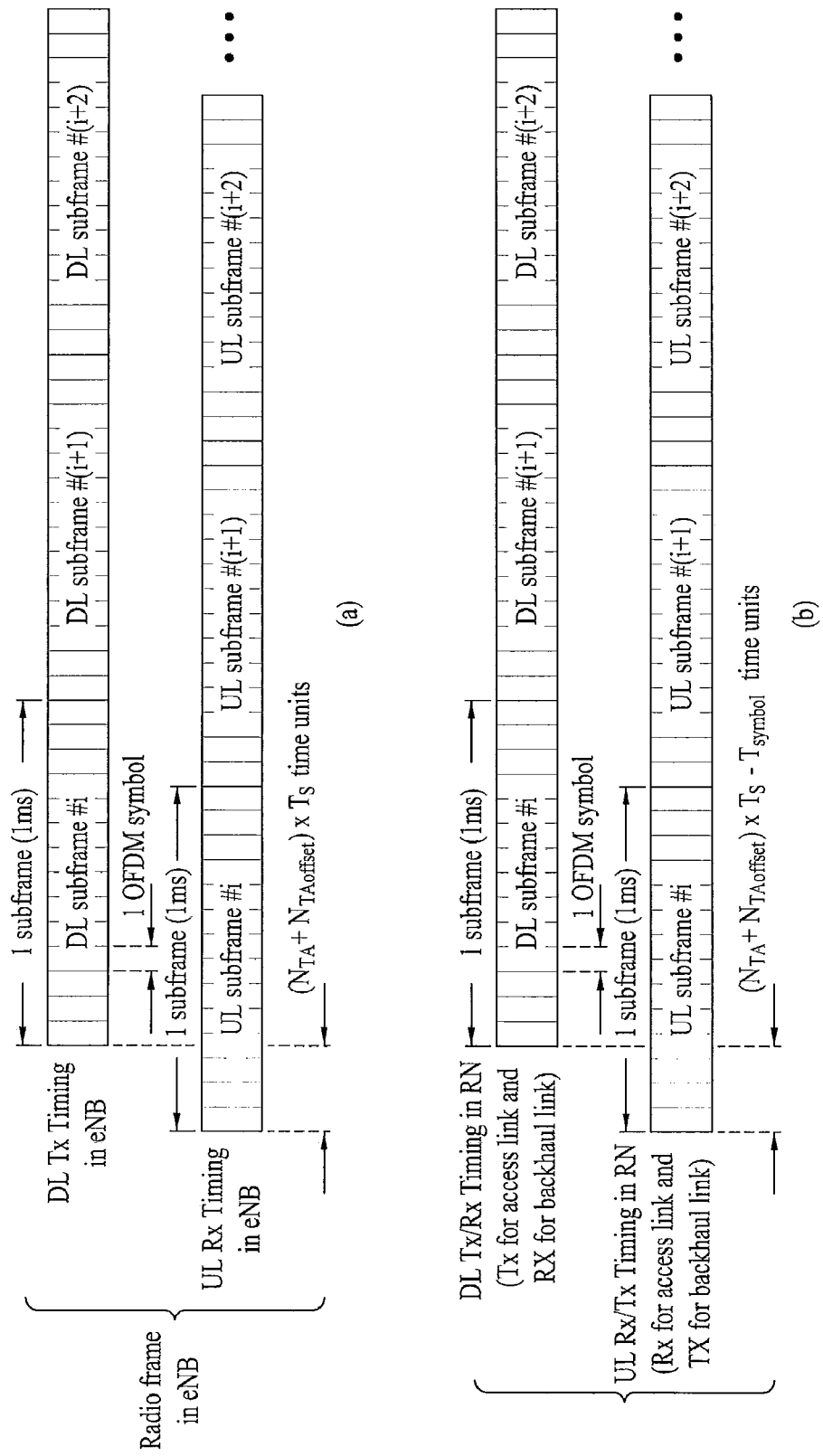
FIG. 29 is a diagram for one example of a frame structure corresponding to a case that an uplink subframe timing in a base station is set to be ahead of an uplink subframe timing in a relay node by a prescribed number of SC-FDMA symbol sections (i.e., $T_{symbol}$) unlike FIG. 28.

FIG. 29 is a diagram for one example of a frame structure corresponding to a case that an uplink subframe timing in a base station is set to be ahead of an uplink subframe timing in a relay node by a prescribed number of SC-FDMA symbol sections (i.e., $T_{symbol}$) unlike FIG. 28.

Referring to FIG. 29(a), a UL reception timing in a base station can be set ahead of a DL transmission timing by a time '$(N_{TA}+N_{TAoffset}) \times Ts$'. In particular, a transmission start point at a UL subframe i of a user equipment can start by going ahead of a reception start point of a corresponding DL subframe i of the user equipment by the time '$(N_{TA}+N_{TAoffset}) \times Ts$'. Like FIG. 28, the $N_{TA}$ indicates a timing offset between a UL radio frame and a UL radio frame and is represented as a Ts unit. And, the $N_{TAoffset}$ indicates a fixed timing advance offset and can be represented as a Ts unit. In this case, the Ts is a basic time unit. And, it is possible to set $0 \le N_{TA} \le 20512$, $N_{TAoffset}=0$ for a frame structure type 1, or $N_{TAoffset}=624$ for a frame structure type 2.

Thus, a UL reception timing in a base station can be set to go ahead of a DL transmission timing in consideration of a propagation delay according to a transmission of a user equipment or a relay node.

Referring to FIG. 29(b), a UL transceiving timing in a relay node can go ahead of a DL transceiving timing of the relay node by '$(N_{TA}+N_{TAoffset}) \times Ts-T_{symbol}$'. For instance, $T_{symbol}$ can include 1 symbol. Yet, the UL transceiving timing of the relay node can be set in a manner of being delayed by $T_{symbol}$ behind a UL receiving timing of a base station. In particular, a start point of a transceiving timing in UL of the relay node can be delayed by $T_{symbol}$ behind a reception timing in UL of the base station.

Figure 30:
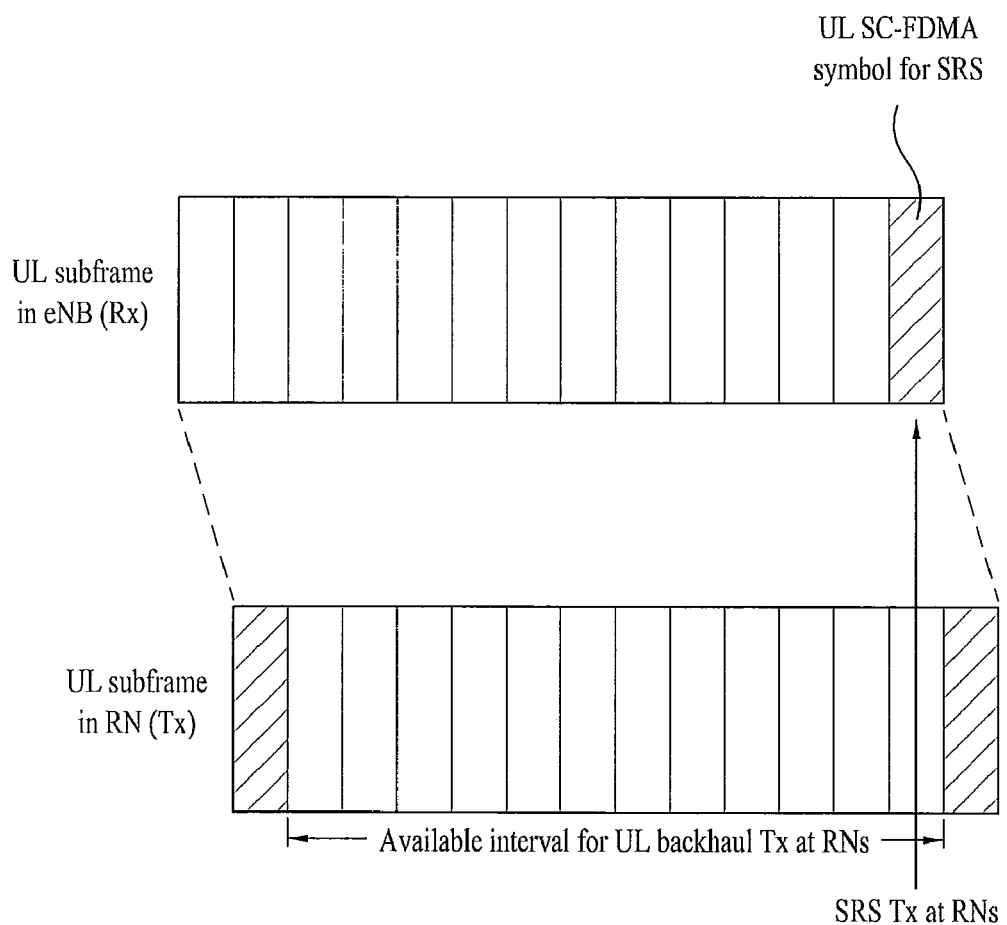
FIG. 30 is a diagram for uplink backhaul subframe operations in a base station and a relay node in accordance with FIG. 29.

FIG. 30 is a diagram for uplink backhaul subframe operations in a base station and a relay node in accordance with FIG. 29.

As FIG. 29(b), a UL transceiving timing of a relay node is set in a manner of being delayed by $T_{symbol}$ behind a UL reception timing of a base station, whereby the relay node is able to transmit SRS to the base station using a symbol (i.e., $13^{th}$ symbol) right previous to a last symbol in a UL subframe shown in FIG. 3 instead of using the last symbol. In case that the relay node transmits SRS using the $13^{th}$ symbol in a specific UL subframe, the base station is able to receive the SRS from the relay node via a last symbol duration in the specific UL subframe. By the UL subframe timing setup of the relay node, it is able to solve the problem that the relay node shown in FIG. 28 is unable to transmit the SRS.

Figure 31:
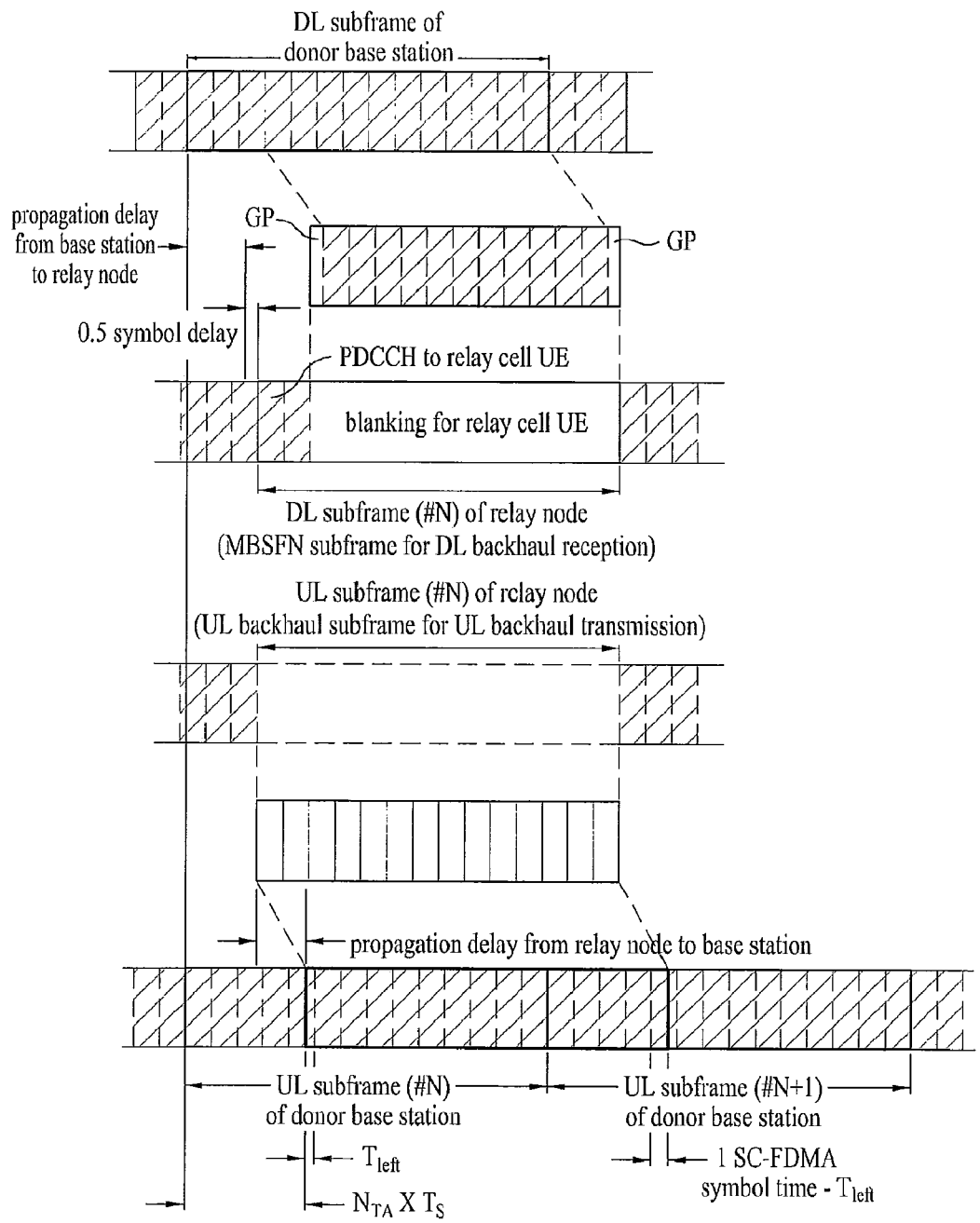
FIG. 31 is a diagram for one example of a frame structure for describing an uplink subframe timing in a relay node.

FIG. 31 is a diagram for one example of a frame structure for describing an uplink subframe timing in a relay node.

FIG. 31 shows one example of a frame structure represented with reference to an access link. In case of FDD (frequency division duplex) system, referring to FIG. 31, a UL subframe timing of a relay node can be set to match a DL subframe timing of the corresponding relay node to enable a relay cell user equipment to avoid impact in performing RACH (random access channel). FIG. 31 shows one example that a DL subframe timing of a relay node is set to a propagation delay at a DL subframe reception point of a base station and a point that 0.5 symbol time is delayed.

In FIG. 31, in an initial RACH procedure (e.g., initial setup, initial deployment, etc.) for a relay node to perform an initial access to a donor base station, a UL timing advance value acquired through an RACH response can be determined as '$N_{TA} \times Ts = 2 \times$(propagation delay value)+0.5 symbol time' in accordance with a propagation delay due to a distance between a base station and a relay node. In particular, with reference to an access link between a relay node and a user equipment, it can be '$N_{TA} \times Ts = 2 \times$(propagation delay time)+0.5 symbol time' or '$N_{TA} \times Ts = 2 \times$(propagation delay time)'.

If a DL subframe timing of a relay node is not delayed by 0.5 symbol, a UL timing advance value may correspond to 'NTA×Ts=2×(propagation delay time)'.

Thus, due to a propagation delay in accordance with a distance between a base station and a relay node, when a DL subframe timing and a UL subframe timing are time-aligned with each other in a relay node, R-PUSCH or R-PUCCH signal, which is transmitted via a UL backhaul subframe shown in FIG. 31, is delayed by a base station in a manner of being delayed by a timing advance value. In particular, referring to FIG. 31, if a relay node performs a UL backhaul transmission to a base station via UL subframe #n of index N, the base station is able to perform a reception across a UL subframe having an index N and a UL subframe having an index N+1.

In FIG. 31, symbols available for R-PUSCH or R-PUCCH transmission can be determined in a random UL subframe of a relay node in accordance with a value of $T_{left}$ and an RF switching time necessary for the relay node. Although the following description is made on the assumption that a range of $T_{switch}$, which is an RF switching time of a relay node, meets '$0 < T_{switch} < 1$ symbol duration', a $T_{switch}$ value deviating from the range is applicable to a UL subframe timing as well.

In the following description, explained are symbols that can be used by a relay node for R-PUSCH or R-PUCCH transmission in a UL subframe in accordance with a $T_{left}$ value a range of a $T_{switch}$ value, which is an RF switching time of a relay node.

First of all, Case 1 ['$T_{left} < T_{switch}$', '(1 symbol duration)–$T_{left} > T_{switch}$'] is described as follows.

In this case, as observed from FIG. 31, in viewpoint of synchronization with a UL symbol timing of a base station in UL backhaul subframe #N, a guard time (GT) [or a guard period (GP)] corresponding to '$T_{left}$+(1 symbol duration)' and a guard time (GT) [or a guard period (GP)] corresponding to '(1 symbol duration)–$T_{left}$' should be provided to a head and a tail of a subframe, respectively. Hence, a relay node is able to perform backhaul transmission via 12 symbols in-between. For instance, when a specific relay node experiences such a propagation delay as shown in FIG. 31, if the relay node performs a UL backhaul transmission using 12 symbols all, a base station receives a corresponding UL backhaul signal via 8 symbols having indexes 6 to 13 of UL subframe #N and 4 symbols having indexes 0 to 3 of subsequent UL subframe # (N+1).

Secondly, Case 2 ['$T_{left} > T_{switch}$', '(1 symbol duration)–$T_{left} < T_{switch}$'] is described as follows.

In this case, as observed from FIG. 31, in viewpoint of synchronization with a UL symbol timing of a base station in UL backhaul subframe having an index N, a GP corresponding to $T_{left}$ and a GP corresponding to '(2 symbol durations)–$T_{left}$' should be provided to a head and a tail of a subframe, respectively. Hence, a relay node is able to perform backhaul transmission via 12 symbols in-between. For instance, when a specific relay node experiences such a propagation delay as shown in FIG. 31, if the relay node performs a UL backhaul transmission using 12 symbols all, a base station receives a corresponding UL backhaul signal via 9 symbols having indexes 5 to 13 of UL subframe #N and 3 symbols having indexes 0 to 2 of subsequent UL subframe # (N+1).

Thirdly, Case 3 ['$T_{left} > T_{switch}$', '(1 symbol duration)–$T_{left} > T_{switch}$'] is described as follows.

In this case, as observed from FIG. 31, in viewpoint of synchronization with a UL symbol timing of a base station in UL backhaul subframe having an index N, a GP corresponding to $T_{left}$ and a GP corresponding to '(1 symbol duration)–$T_{left}$' should be provided to a head and a tail of a subframe, respectively. Hence, a relay node is able to perform backhaul transmission via 13 symbols in-between. For instance, when a specific relay node experiences such a propagation delay as shown in FIG. 31, if the relay node performs a UL backhaul transmission using 13 symbols all, a base station receives a corresponding UL backhaul signal via 9 symbols having indexes 5 to 13 of UL subframe #N and 4 symbols having indexes 0 to 3 of subsequent UL subframe # (N+1).

Fourthly, Case 4 ['$T_{left} < T_{switch}$', '(1 symbol duration)–$T_{left} < T_{switch}$'] is described as follows.

In this case, as observed from FIG. 31, in viewpoint of synchronization with a UL symbol timing of a base station in UL backhaul subframe having an index N, a GP corresponding to '$T_{left}+1$' and a GP corresponding to '(2 symbol durations)–$T_{left}$' should be provided to a head and a tail of a subframe, respectively. Hence, a relay node is able to perform backhaul transmission via 11 symbols in-between. For instance, when a specific relay node experiences such a propagation delay as shown in FIG. 31, if the relay node performs a UL backhaul transmission using 11 symbols all, a base station receives a corresponding UL backhaul signal via 8 symbols having indexes 6 to 13 of UL subframe #N and 3 symbols having indexes 0 to 2 of subsequent UL subframe # (N+1).

As mentioned in the foregoing description with reference to FIG. 31, symbol indexes available for a given UL backhaul subframe can be determined in accordance with $T_{left}$ value and RF switching time in a relay node. Thus, a propagation delay time can vary in accordance with a distance (i.e., geometry) of a relay node introduced in the same donor cell, whereby a UL backhaul subframe structure can be changed per relay node. In particular, in case that a UL subframe having an index N is set as a backhaul UL subframe in a relay node, signaling for indication of an available symbol index except GP may be necessary. A corresponding available UL symbol index indication message can be transmitted to a base station by a relay node by RRC (radio resource control) signaling in consideration of a timing advance value transmitted via RACH response and $T_{left}/T_{switch}$ and the like determined according to the timing advance value in case of an initial setup of the relay node.

The corresponding available UL symbol index indication message can be configured by a bitmap scheme for total 28 symbol indexes (or 24 symbol indexes in case of an extended CP) of a base station UL subframe having an index N and a subsequent UL subframe having an index (N+1). Alternatively, the corresponding available UL symbol index indication message is able to directly signal the symbol indexes respectively corresponding to start and end points of available symbols. In this case, a corresponding message can be configured in size of total 8 bits including 4 bits for a start symbol index transmission in a given UL subframe and 4 bits for a last symbol index transmission in a subsequent UL subframe.

For instance, in Case 3 shown in FIG. 31, a start symbol index 5 (i.e., a start point) of a UL subframe having an index N and an end symbol index 3 of a UL subframe having an index N+1 can be signaled in direct. Alternatively, a relay node transmits quantized information on its hardware RF switching time $T_{switch}$ only and a base station is able to directly calculate a corresponding available symbol index in consideration of a timing advance value calculated through RACH.

In the following description, explained as examples of an available UL backhaul subframe structure based on an available UL backhaul symbol index indication.

Figure 32:
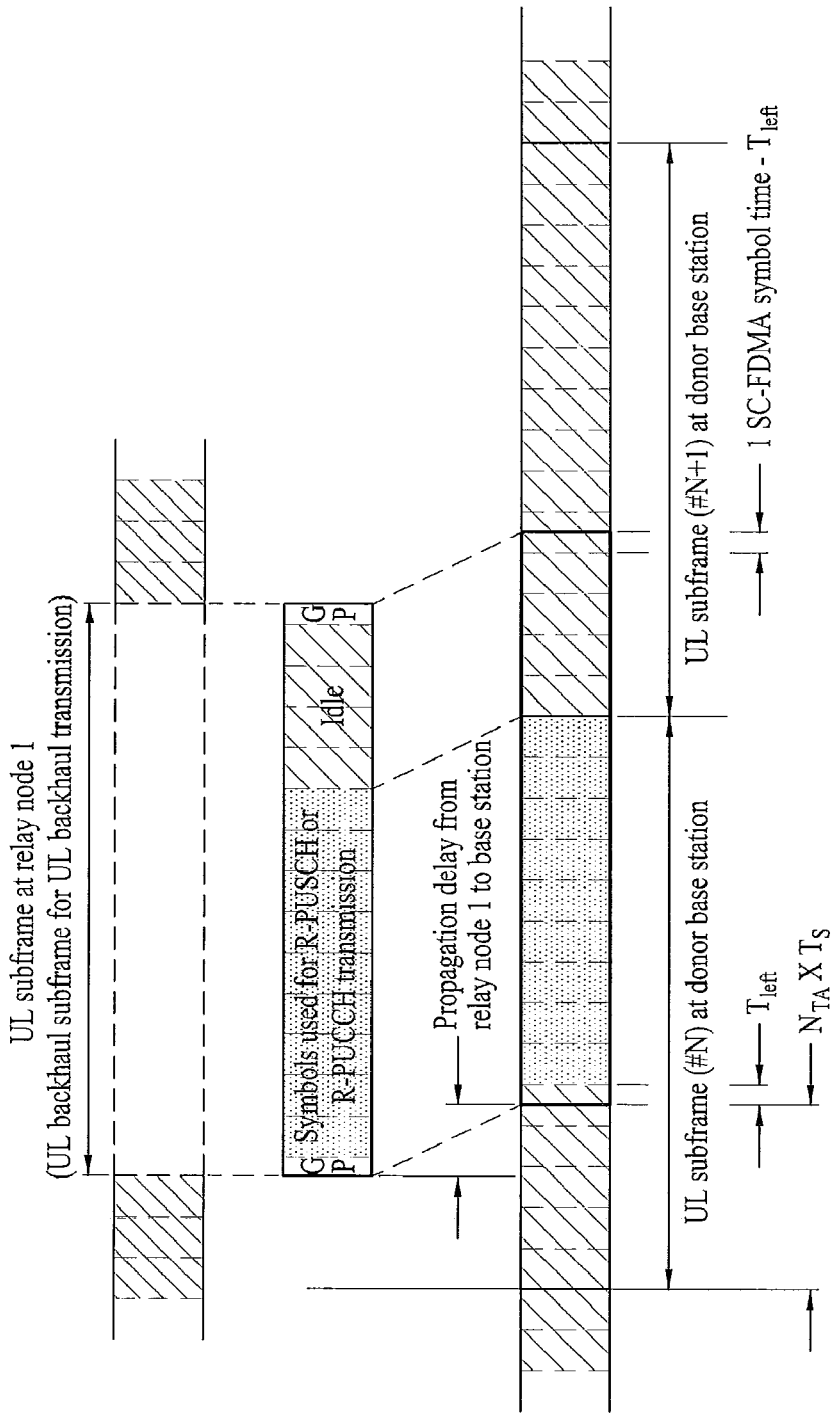
FIG. 32 and FIG. 33 are diagrams for one example of an uplink backhaul subframe possible based on an available uplink backhaul symbol index.
Figure 33:
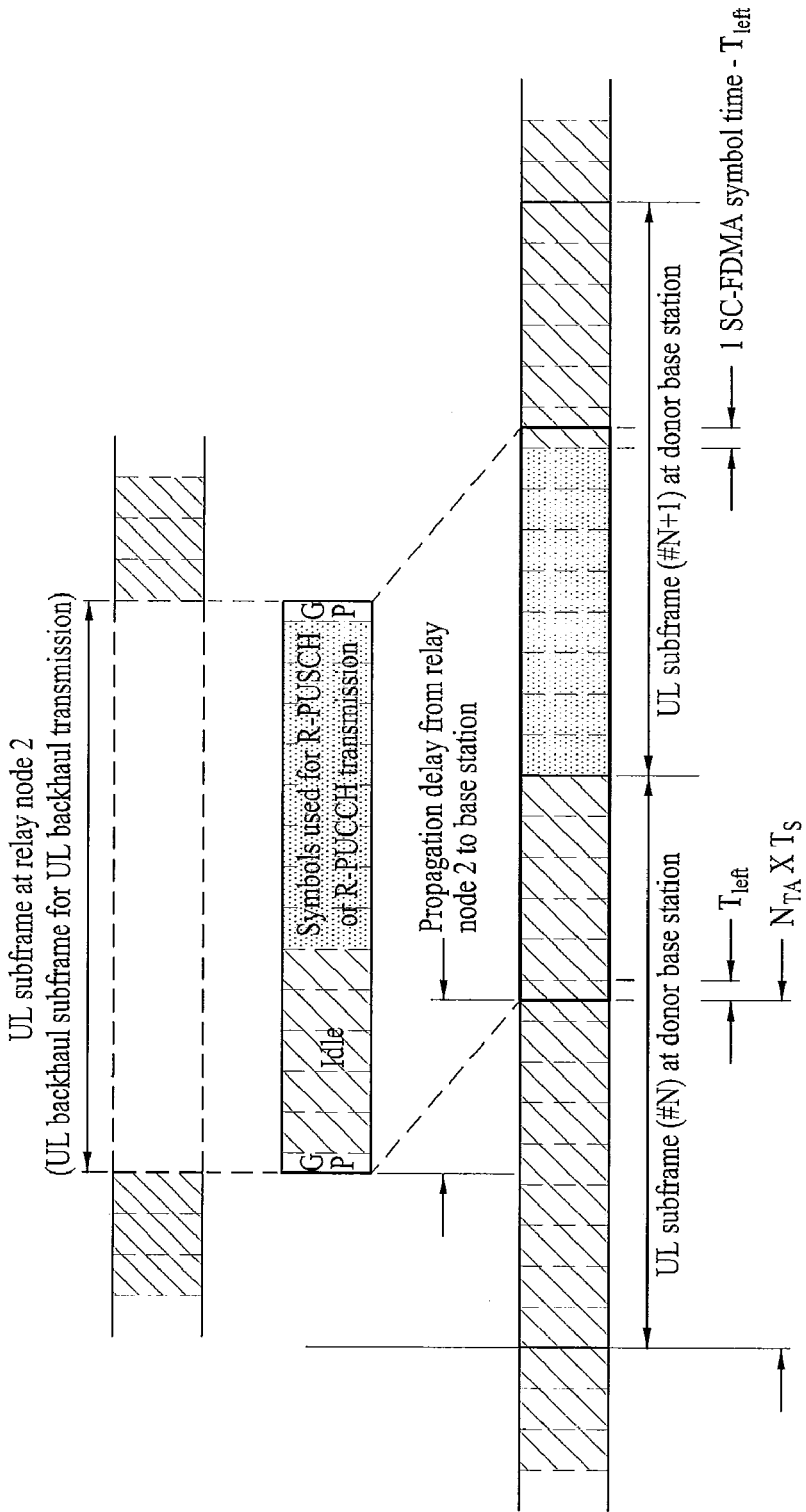

FIG. 32 and FIG. 33 are diagrams for one example of an uplink backhaul subframe possible based on an available uplink backhaul symbol index.

As mentioned in the foregoing description with reference to FIG. 31, based on a determined available UL backhaul symbol index, a relay node is able to determine a transmission structure of a UL subframe. Referring to FIG. 32 and FIG. 33, a UL backhaul subframe start timing of a relay node can go ahead of a UL subframe start timing of a base station by a time corresponding to a propagation delay.

For one example (i.e., Option 1), it is able to determine a UL backhaul subframe structure based on a boundary of a UL subframe of a base station. In particular, among available symbols of a UL backhaul subframe having an index N of a given relay node, transmission is performed using symbols received via a UL subframe having the same index N of a base station only. Among available symbols transmittable via a UL backhaul subframe having an index N of a relay node 1, as shown in FIG. 32, transmission is performed via 9 fore symbols (i.e., symbols in a slashed interval) received via a UL subframe having an index N of a base station only. Alternatively, among available symbols of a UL backhaul subframe having an index N of a relay node 2, as shown in FIG. 33, transmission is performed via 8 symbols (i.e., symbols in a slashed interval) received via a UL subframe having an index N+1 of a base station only.

Figure 34:
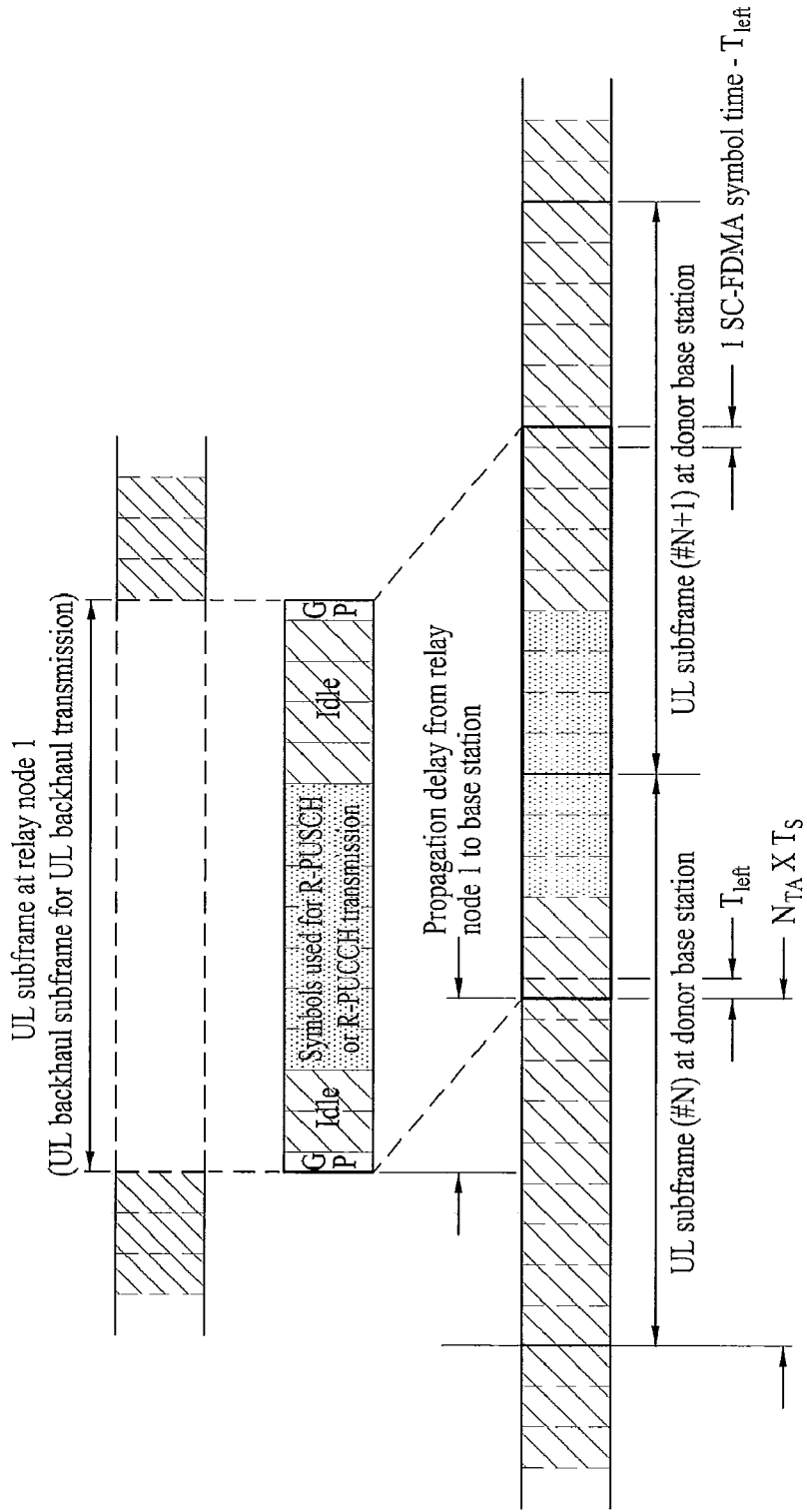
FIGS. 34 to 36 are diagrams for another example of an uplink backhaul subframe possible based on an available uplink backhaul symbol index.
Figure 35:
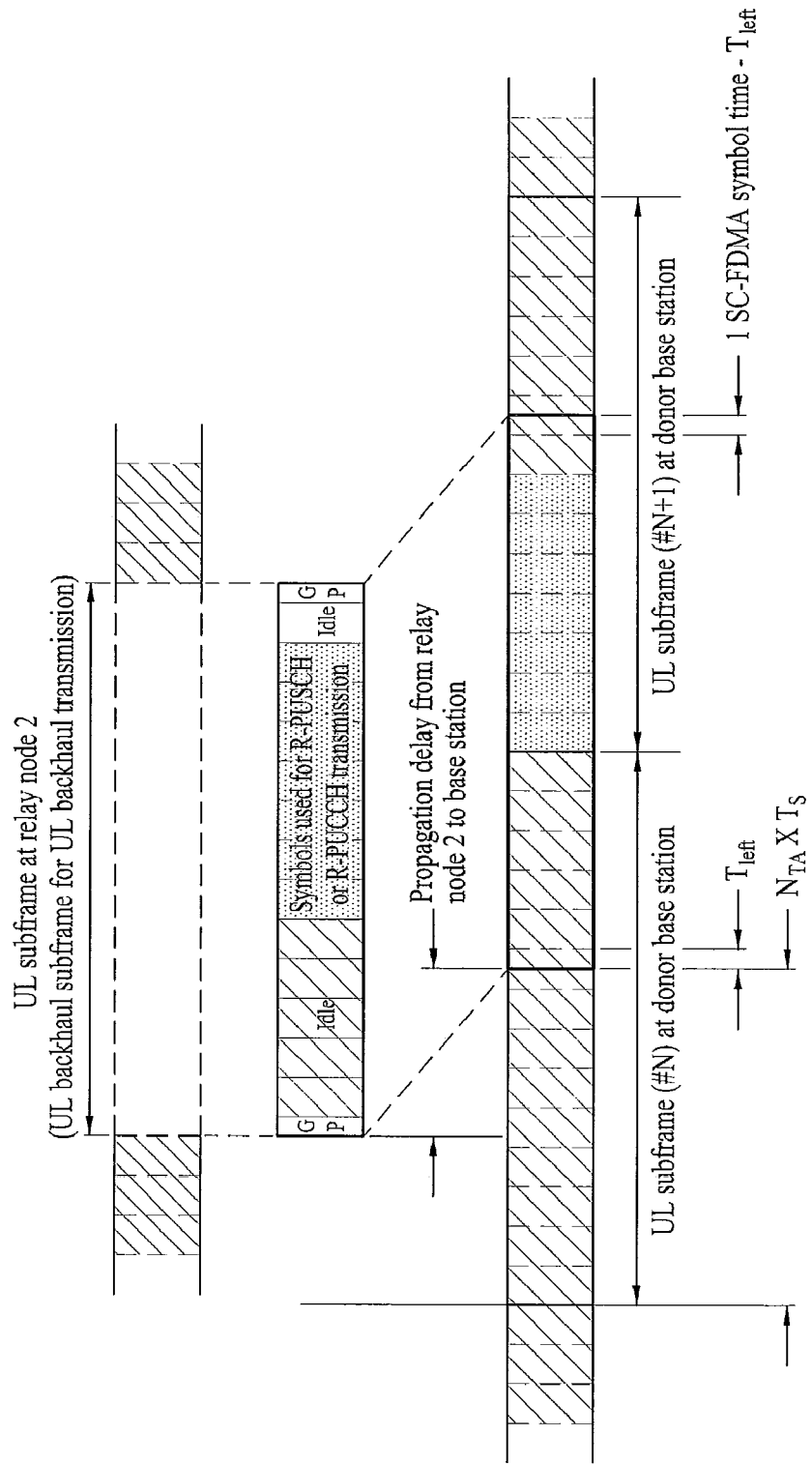
Figure 36:
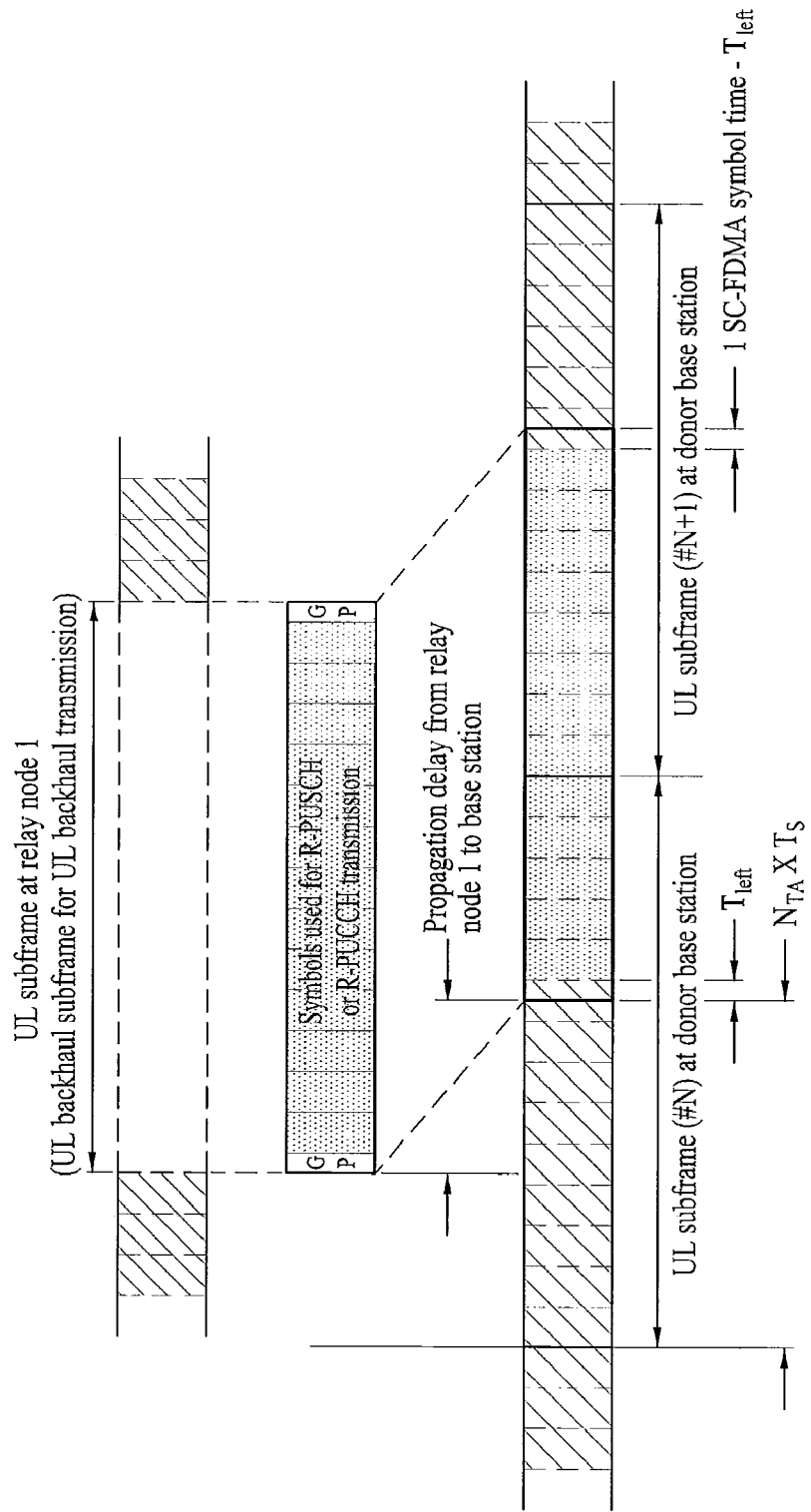

FIGS. 34 to 36 are diagrams for another example of an uplink backhaul subframe possible based on an available uplink backhaul symbol index.

Referring to FIG. 34 and FIG. 36, a UL backhaul subframe start timing of a relay node (i.e., a relay node 1 or a relay node 2) can go ahead of a UL subframe start timing of a base station by a time corresponding to a propagation delay.

For another example (Option 2), based on a slot, transmission can be performed via either a second slot of a UL subframe having an index N of a base station or a first slot of a subsequent UL subframe having an index N+1 only. In particular, referring to FIG. 34, among available symbols of a UL backhaul subframe having an index N of a relay node 1 (RN 1), $3^{rd}$ to $9^{th}$ symbols received via 7 symbols corresponding to a $2^{nd}$ slot of a UL subframe having an index N of a base station are transmitted. Referring to FIG. 35, among available symbols of a UL backhaul subframe having an index N of a relay node 2 (RN 2), $6^{th}$ to $12^{th}$ symbols received via a $1^{st}$ slot of a UL subframe having an index N+1 of a base station are transmitted.

For another example (Option 3), referring to FIG. 36, all available symbols (i.e., a slashed interval) in a UL backhaul subframe of a relay node can be transmitted.

Regarding the examples for the structures of the UL backhaul subframes described with reference to FIGS. 32 to 36, a method of configuring a UL backhaul subframe structure used per relay node is described as follows.

First of all, it is able to fix a UL backhaul subframe structure implicitly. It is able to implicitly fix which one of the UL backhaul structure examples described with reference to FIGS. 32 to 36 shall be used. Secondly, it is able to determine a UL backhaul subframe structure semi-fixedly. In particular, in an initial setting step and update of a relay node, which one of the examples of the UL backhaul structures descried with reference to FIGS. 32 to 36 is determined and applied as a UL backhaul subframe structure can be transmitted to each relay node through a higher layer signaling.

On the contrary, it is able to dynamically determine a UL backhaul subframe structure. When a relay node allocates a resource for R-PUSCH transmission via R-PDCCH, which one of the frame structure examples shown in FIGS. 32 to 36 will be used as a UL backhaul subframe structure for a transmission can be dynamically signaled via UL grant each time. In this case, an option field in the corresponding one of the frame structure examples shown in FIGS. 32 to 36 is contained in a UL grant message and an option selected in scheduling is dynamically signaled (e.g., an option to be used for Options 1, 2 and 3 in the descriptions with reference to FIGS. 32 to 36 can be signaled on each resource allocation). Alternatively, a bitmap field according to the number of available symbols shown in FIG. 31 is defined and symbol allocation information is transmitted on each resource allocation.

Moreover, it is necessary to indicate a symbol index used for a data demodulation reference signal (DMRS) in a given UL backhaul subframe structure. In the given UL backhaul subframe structure, when a relay node transmits R-PUSCH (or R-PUCCH), a symbol index to be used for DMRS among available symbols is bitmap-indicated or a symbol index can be directly indicated.

Figure 37:
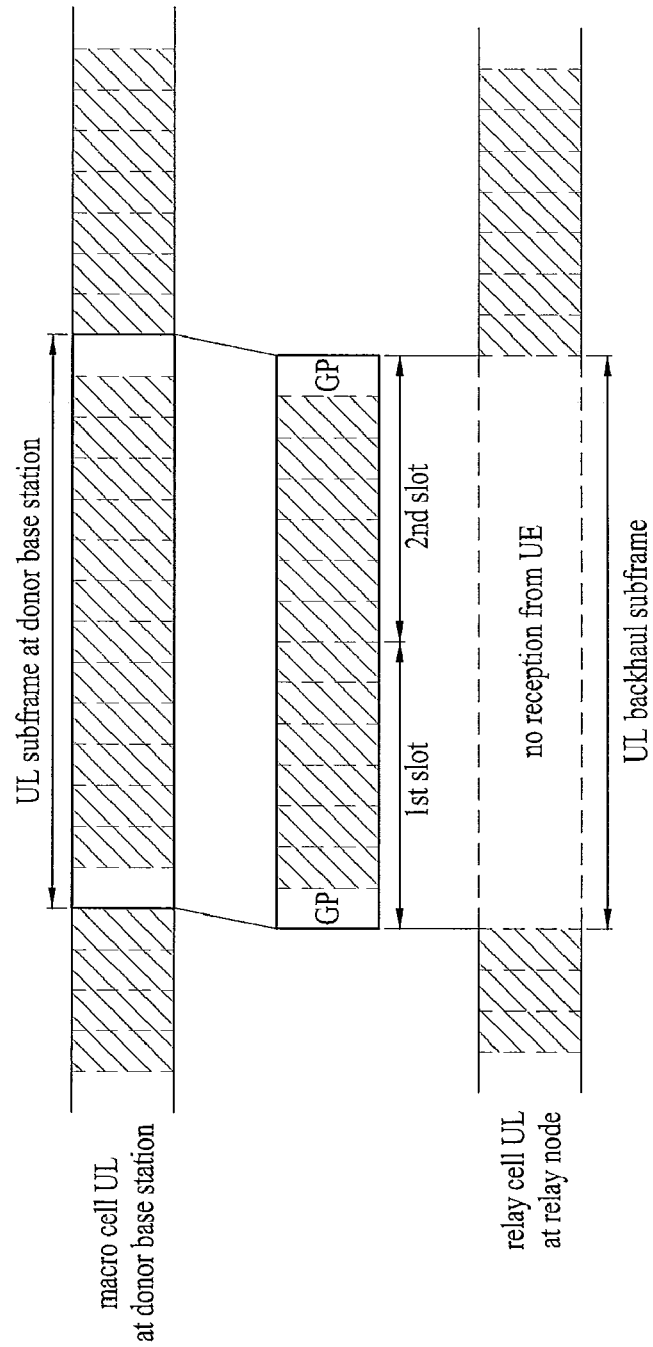
FIGS. 37 to 39 are diagrams for one example of a frame structure for describing a timing of an uplink frame in a relay node and an uplink frame reception timing in a base station.
Figure 38:
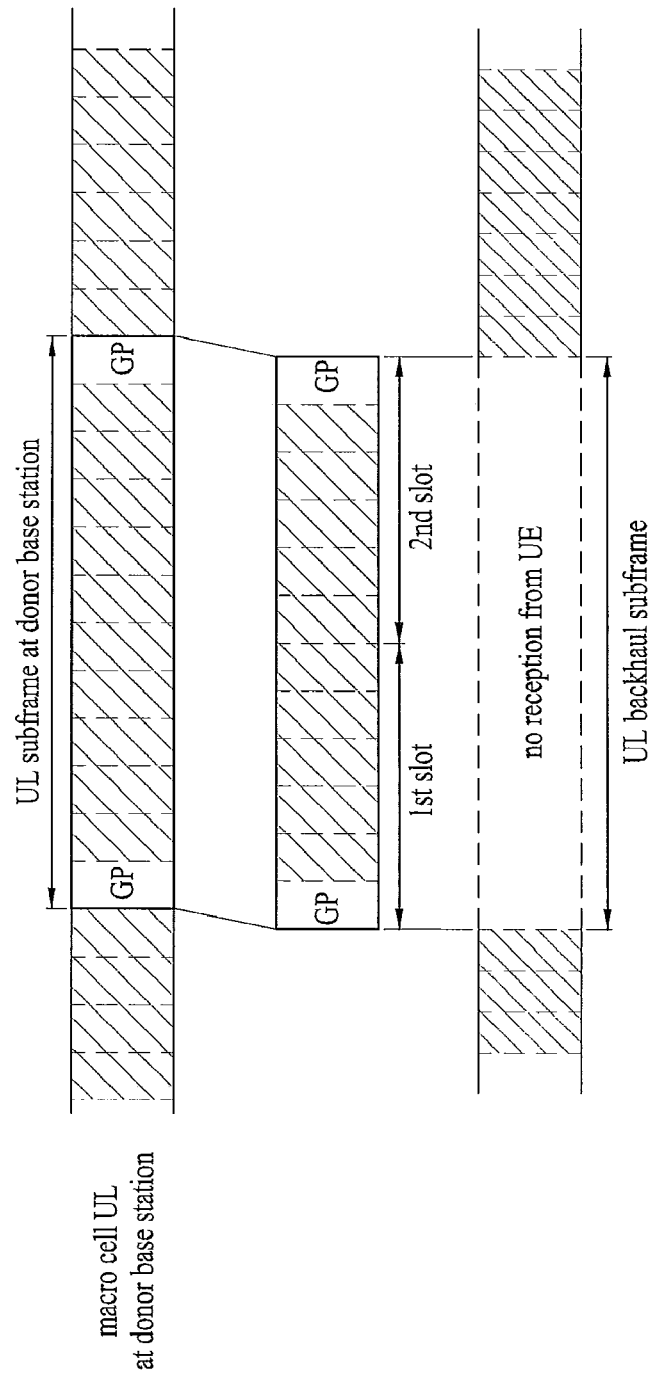
Figure 39:
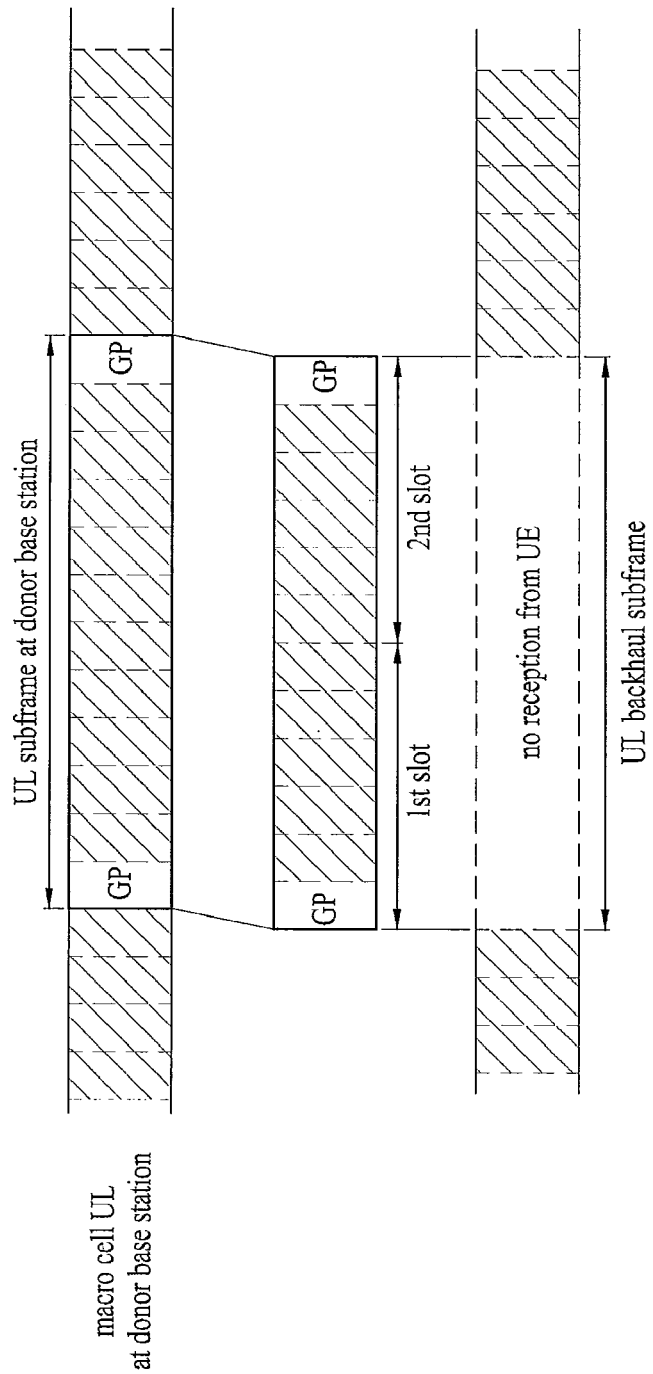

FIGS. 37 to 39 are diagrams for one example of a frame structure for describing a timing of an uplink frame in a relay node and an uplink frame reception timing in a base station.

Referring to FIGS. 37 to 39, a timing of a UL backhaul frame in a relay node and a timing of a UL frame in a base station can be aligned in a straight line together. In this case, as shown in FIGS. 37 to 39, a UL subframe of the relay node is synchronized in accordance with a UL timing advance value adjusted by an RACH procedure with a donor base station in an initial entry process of the relay node. In particular, one symbol at each of head and tail of a UL backhaul subframe can be set as a guard time (GT).

In case that both a backhaul link and an access link are normal CP (cyclic prefix) [FIG. 37], 12 of total 14 symbols can become symbols available for a UL backhaul transmission. If an extended CP is used in a UL backhaul subframe [FIG. 38] or an extended CP is used in an access link as well as a UL backhaul subframe [FIG. 39], 10 of total 12 symbols can become symbols available for a UL backhaul transmission.

Figure 40:
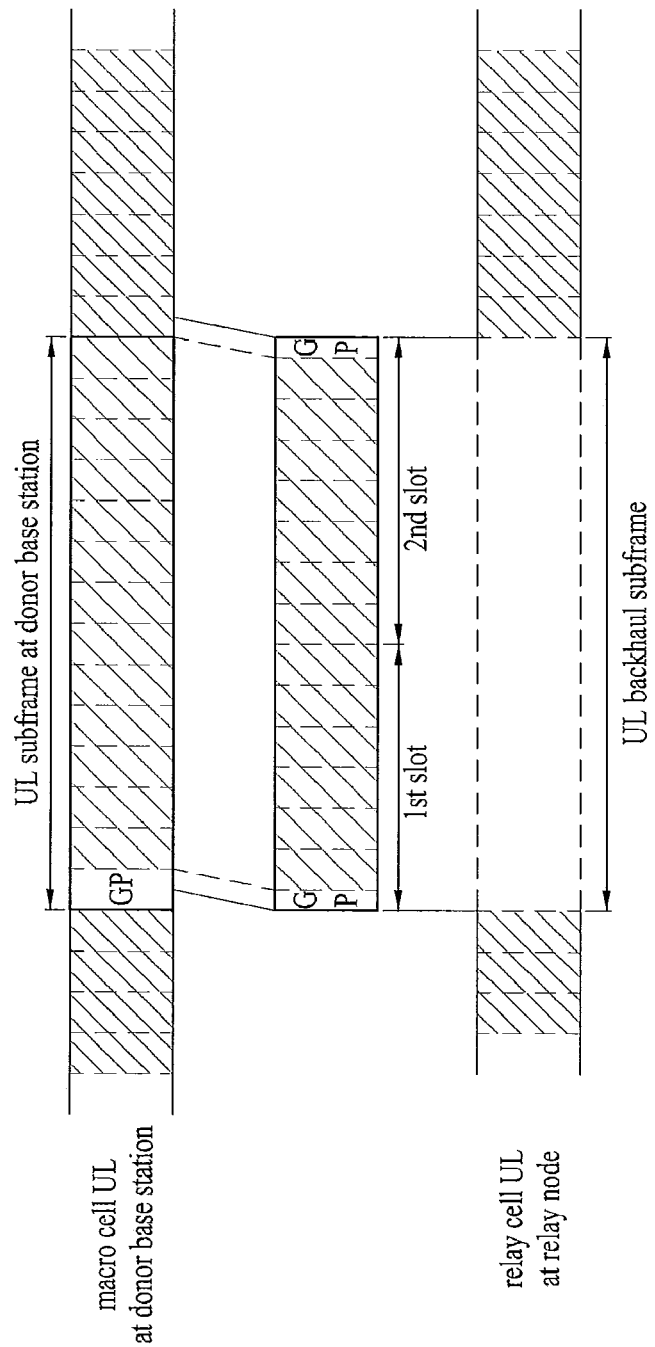
FIGS. 40 to 42 are diagrams for another example of a frame structure for describing a timing of an uplink frame in a relay node and an uplink frame reception timing in a base station.
Figure 41:
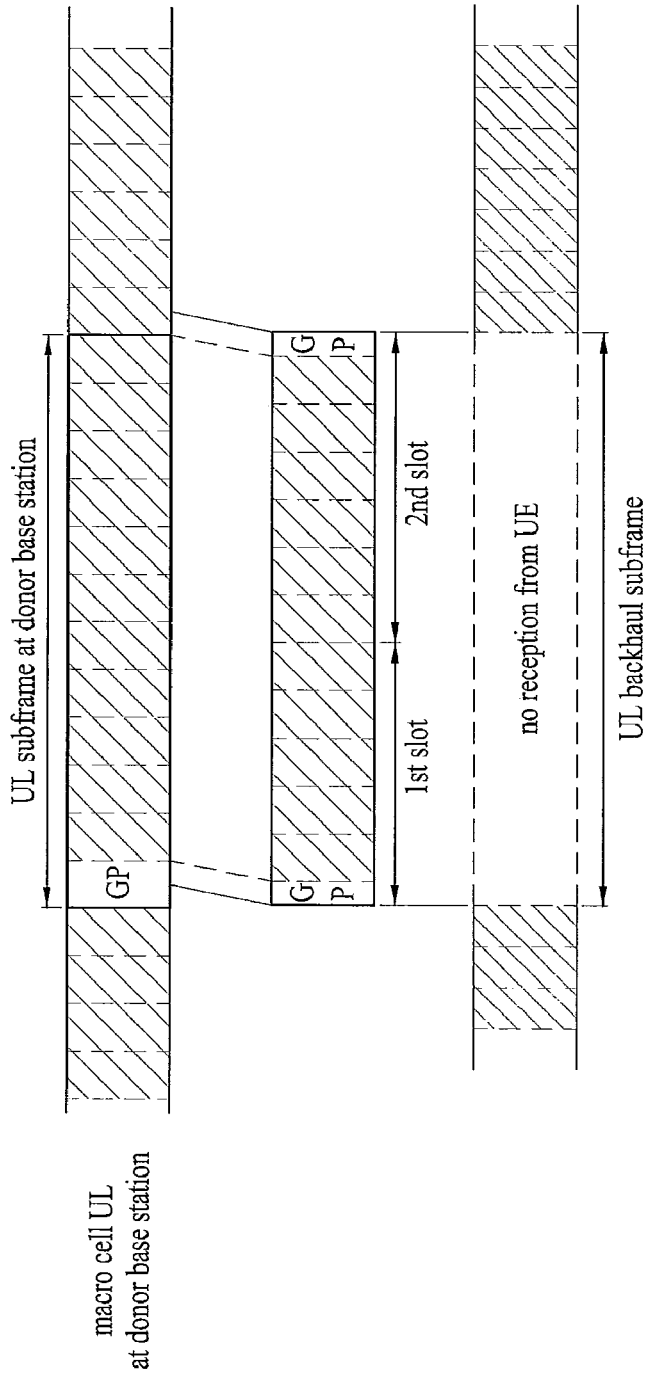
Figure 42:
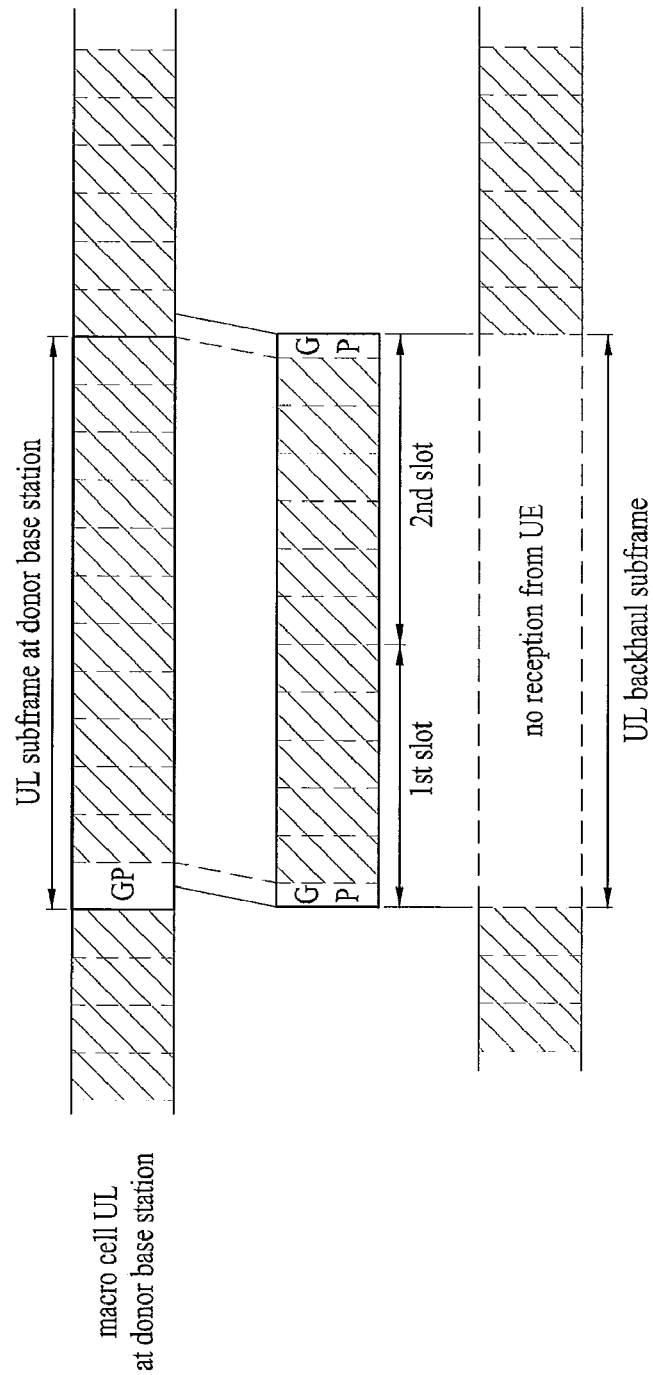

FIGS. 40 to 42 are diagrams for another example of a frame structure for describing a timing of an uplink frame in a relay node and an uplink frame reception timing in a base station.

Referring to FIGS. 40 to 42, a timing of a UL frame in a relay node can be set to be delayed by 0.5 symbol behind a reception timing of a UL frame in a base station. In this case, a UL frame timing of the relay node is synchronized in accordance with a value resulting from subtracting a 0.5-symbol length from a UL timing advance value adjusted through an RACH procedure of a donor base station in an initial entry process o the relay node. In this case, a guard time (GT) can be set to 0.5 symbol at each of a head and tail of a UL backhaul subframe given by the relay node. Hence, a UL backhaul can be transmitted through 13 or 11 symbols.

If a normal CP is used in a UL backhaul (i.e., a UL subframe of a macro cell) [FIG. 40], 13 of total 14 symbols (e.g., 6 symbols in $1^{st}$ slot and 7 symbols in $2^{nd}$ slot) are available for the relay node to use for a UL backhaul transmission. If an extended CP is used [FIG. 41, FIG. 42], 11 of total 12 symbols (e.g., 5 symbols in $1^{st}$ slot and 6 symbols in $2^{nd}$ slot) are available for the relay node to use for a UL backhaul transmission.

Figure 43:
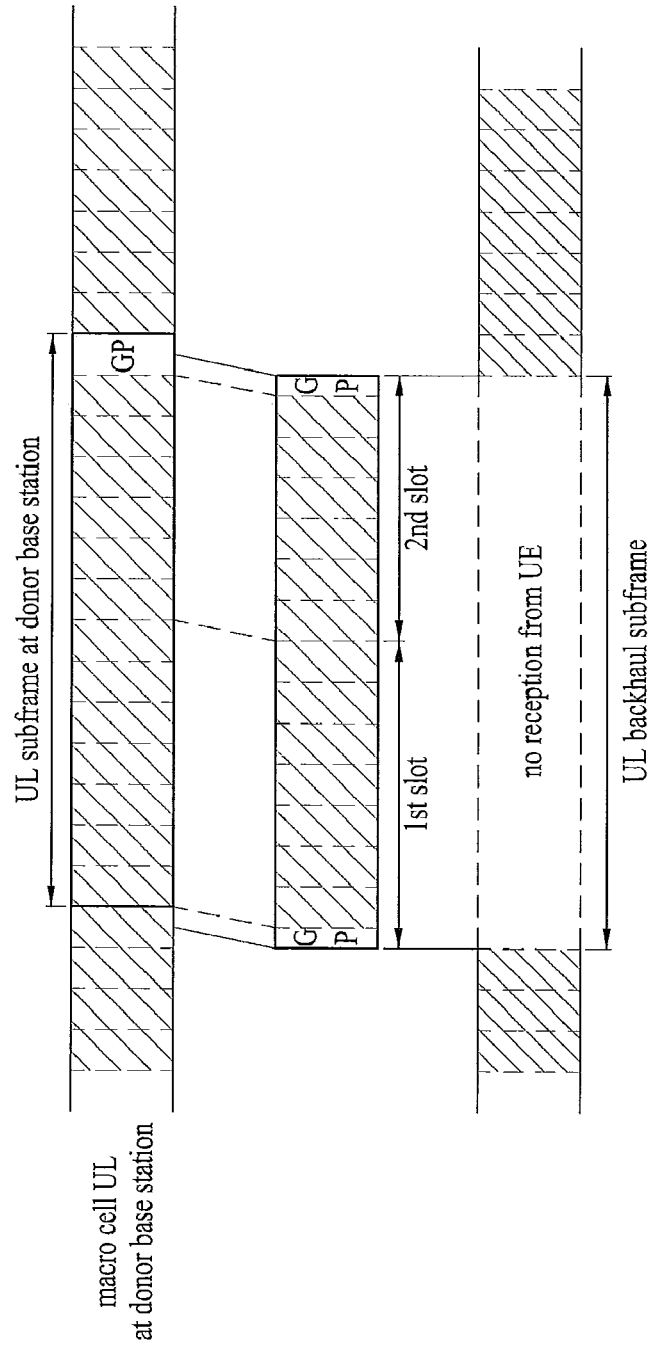
FIGS. 43 to 45 are diagrams for further example of a frame structure for describing a timing of an uplink frame in a relay node and an uplink frame reception timing in a base station.
Figure 44:
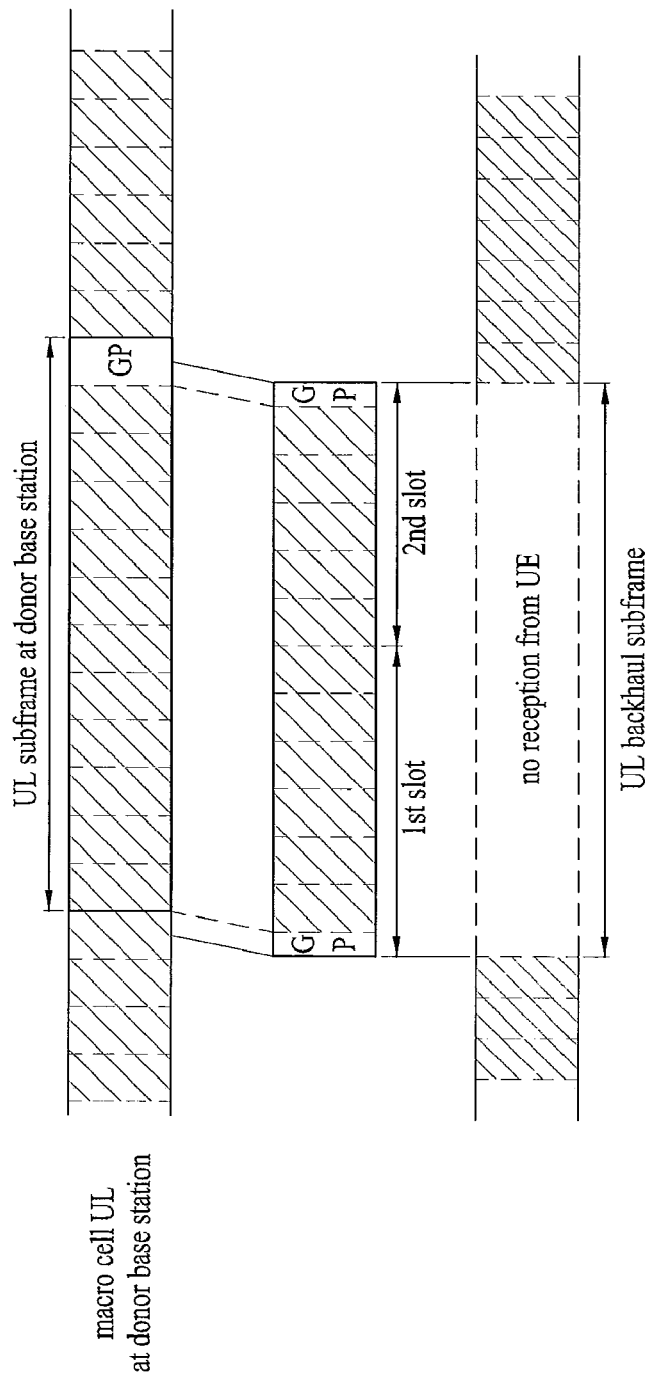
Figure 45:
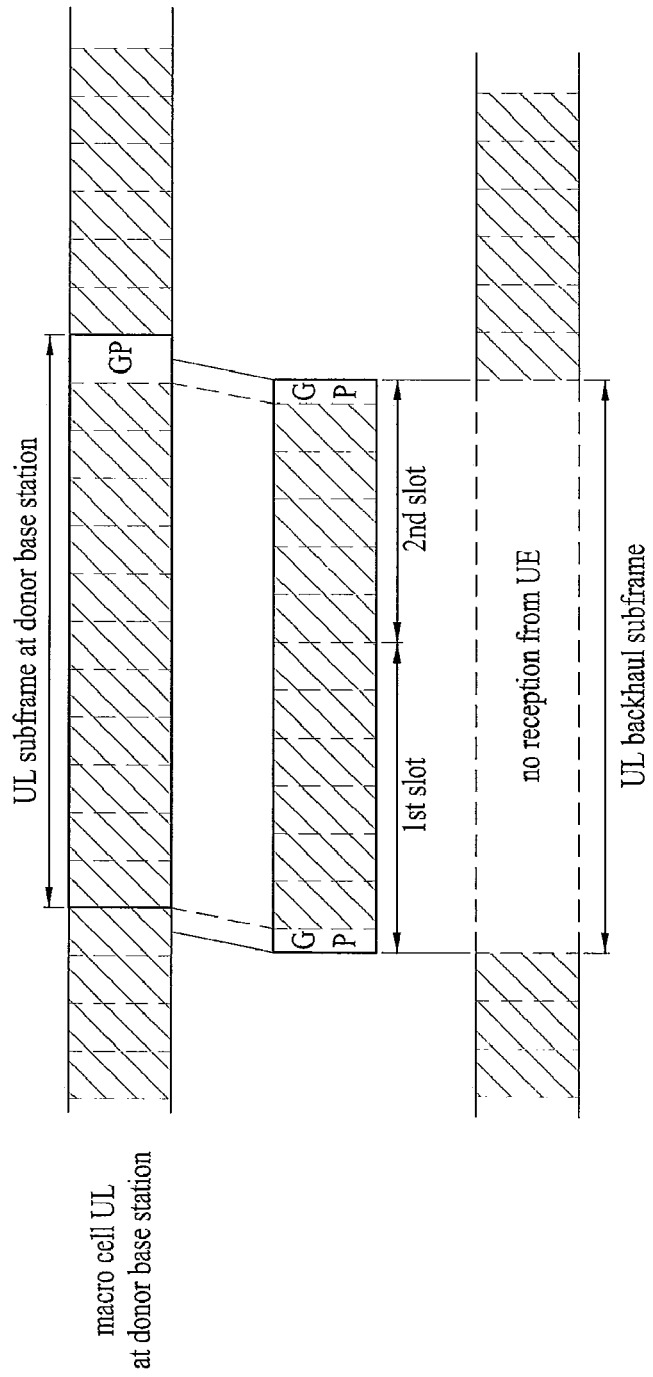

FIGS. 43 to 45 are diagrams for further example of a frame structure for describing a timing of an uplink frame in a relay node and an uplink frame reception timing in a base station.

Referring to FIGS. 43 to 45, a timing of a UL frame in a relay node can be set to be advanced by 0.5 symbol more than a reception timing of a UL frame in a base station. In this case, a UL frame timing of the relay node is synchronized in accordance with a value resulting from adding a 0.5-symbol length to a UL timing advance value adjusted through an RACH procedure of a donor base station in an initial entry process o the relay node. In this case, a guard time (GT) can be set to 0.5 symbol at each of a head and tail of a given UL backhaul subframe. Hence, a UL backhaul can be transmitted through 13 or 11 symbols.

If a normal CP is used in a UL backhaul (i.e., a UL subframe of a macro cell) [FIG. 43], 13 of total 14 symbols (e.g., 7 symbols in $1^{st}$ slot and 6 symbols in $2^{nd}$ slot) are available for the relay node to use for a UL backhaul transmission. If an extended CP is used [FIG. 44, FIG. 45], 11 of total 12 symbols (e.g., 6 symbols in $1^{st}$ slot and 5 symbols in $2^{nd}$ slot) are available for the relay node to use for a UL backhaul transmission.

Figure 46:
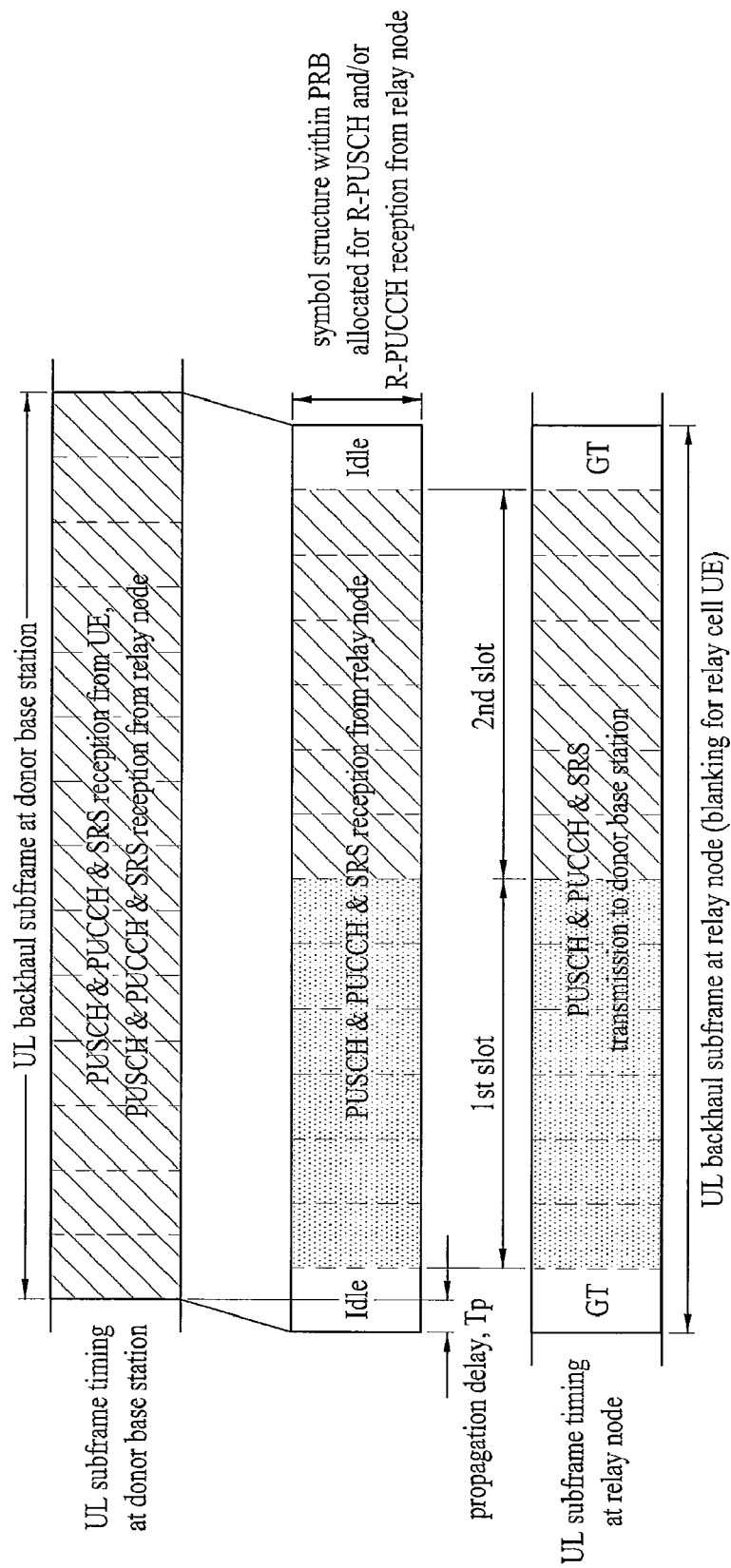
FIG. 46 is a diagram for one example of a symbol structure of PRB allocated for R-PUSCH or R-PUCCH transmission in a base station and an uplink backhaul transmission structure in a relay node.

FIG. 46 is a diagram for one example of a symbol structure of PRB allocated for R-PUSCH or R-PUCCH transmission in a base station and an uplink backhaul transmission structure in a relay node.

Referring to FIG. 46, a UL subframe reception timing in an access link of a relay node is synchronized in viewpoint of a timing of a backhaul transmission to a base station. This is the case that a UL subframe timing of a base station is advanced by a propagation delay time. Total 2 symbols at a head and tail of a given backhaul subframe can be set to guard times (GT), respectively. And, 12 symbols, as shown in FIG. 46, can be allocated to R-PUSCH, R-PUCCH and SRS transmission to a base station.

Figure 47:
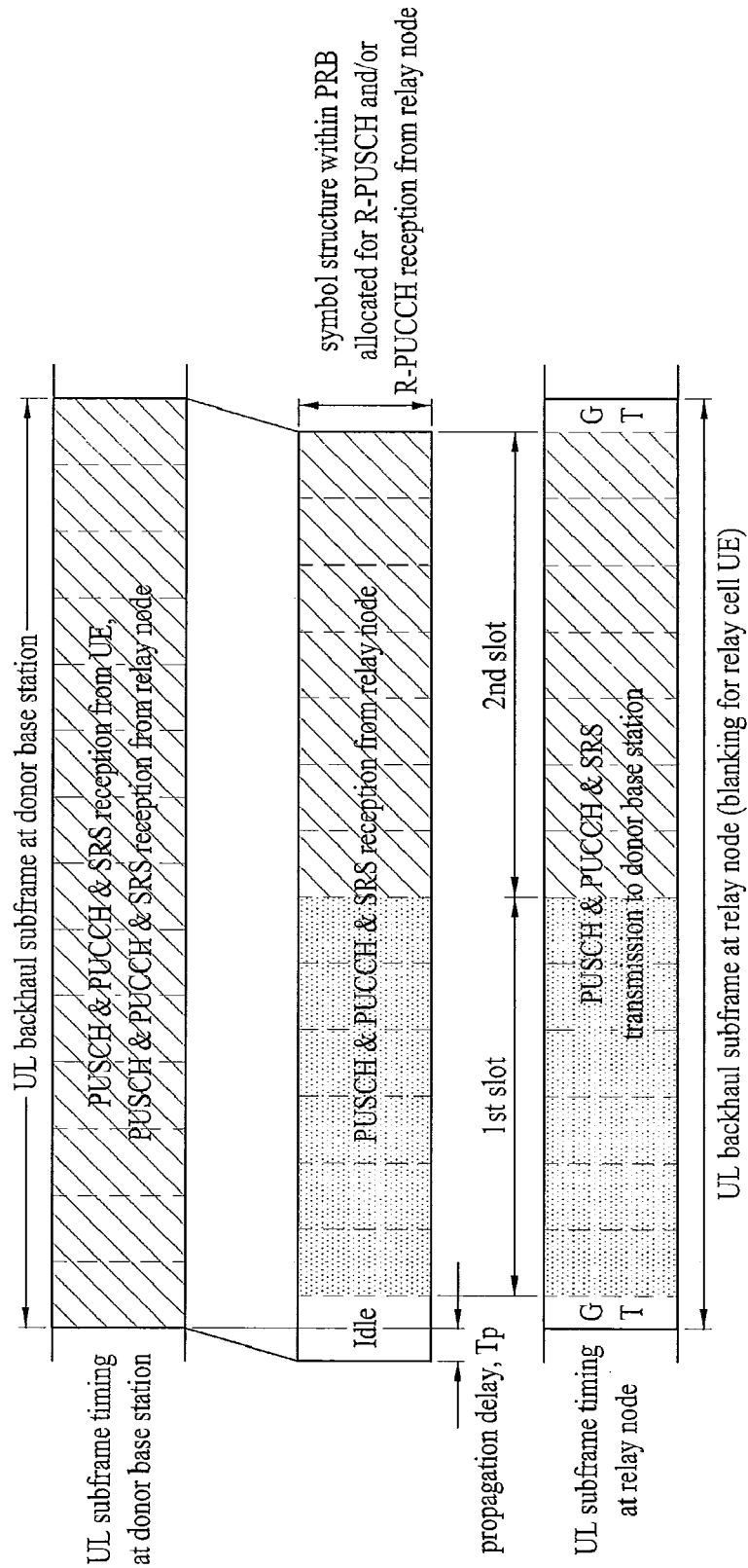
FIG. 47 is a diagram for another example of a symbol structure of PRB allocated for R-PUSCH or R-PUCCH transmission in a base station and an uplink backhaul transmission structure in a relay node.

FIG. 47 is a diagram for another example of a symbol structure of PRB allocated for R-PUSCH or R-PUCCH transmission in a base station and an uplink backhaul transmission structure in a relay node.

Referring to FIG. 47, a UL subframe reception timing in an access link of a relay node is delayed by 0.5 symbol in comparison with FIG. 46. A base station is able to receive SRS transmitted by the relay node through a last symbol. As can be observed from FIG. 47, total 1 symbol duration (i.e., 0.5 symbol at each of a head and tail of a given UL backhaul subframe as a guard time in the relay node) can be consumed. Moreover, in aspect of reception in a base station, one symbol at a head of a given UL backhaul subframe is allocated to an idle interval and R-PUSCH, R-PUCCH or SRS transmission can be performed via the remaining 13 symbols.

Figure 48:
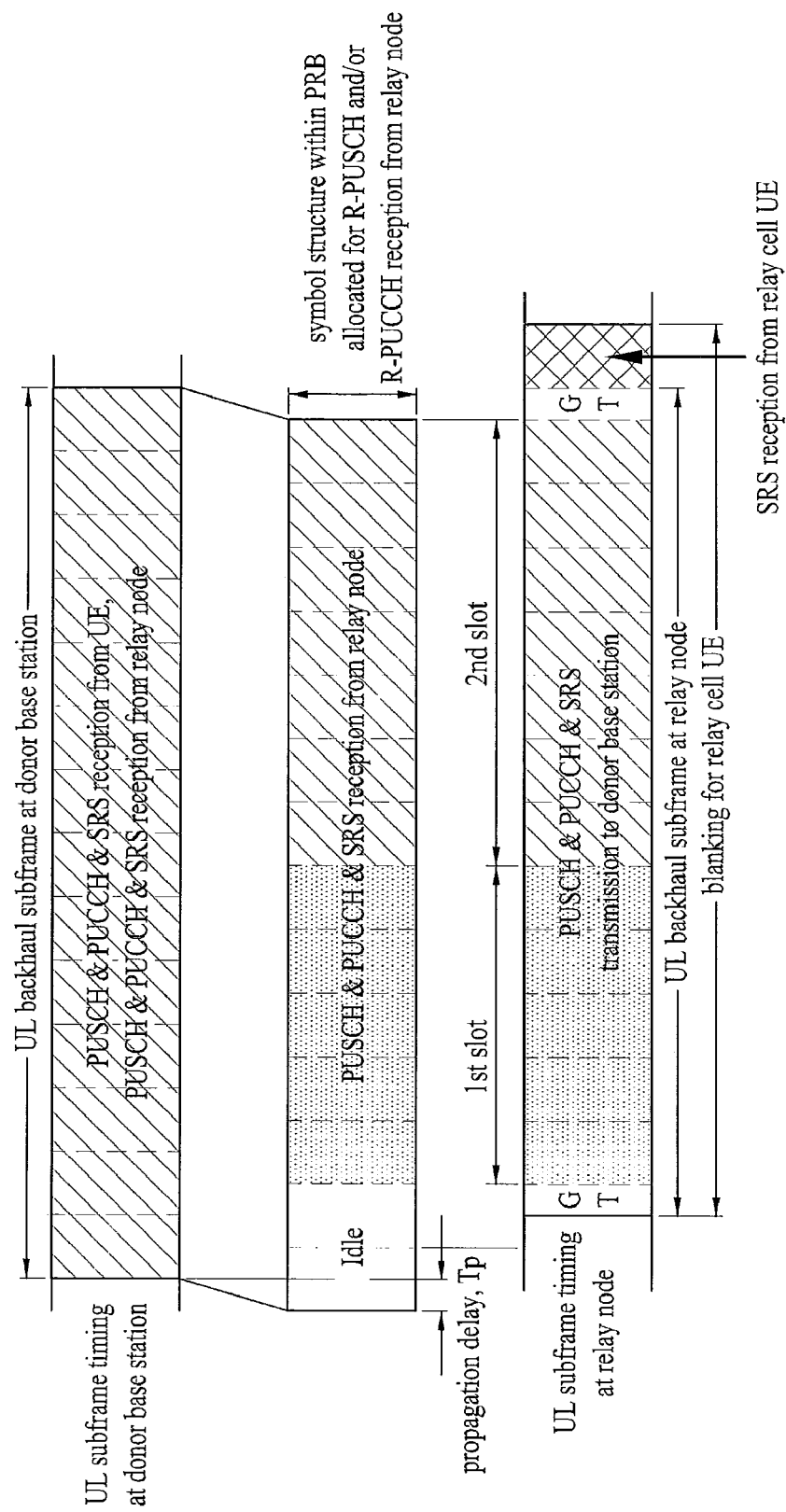
FIG. 48 and FIG. 49 are diagrams for further example of a symbol structure of PRB allocated for R-PUSCH or R-PUCCH transmission in a base station and an uplink backhaul transmission structure in a relay node.
Figure 49:
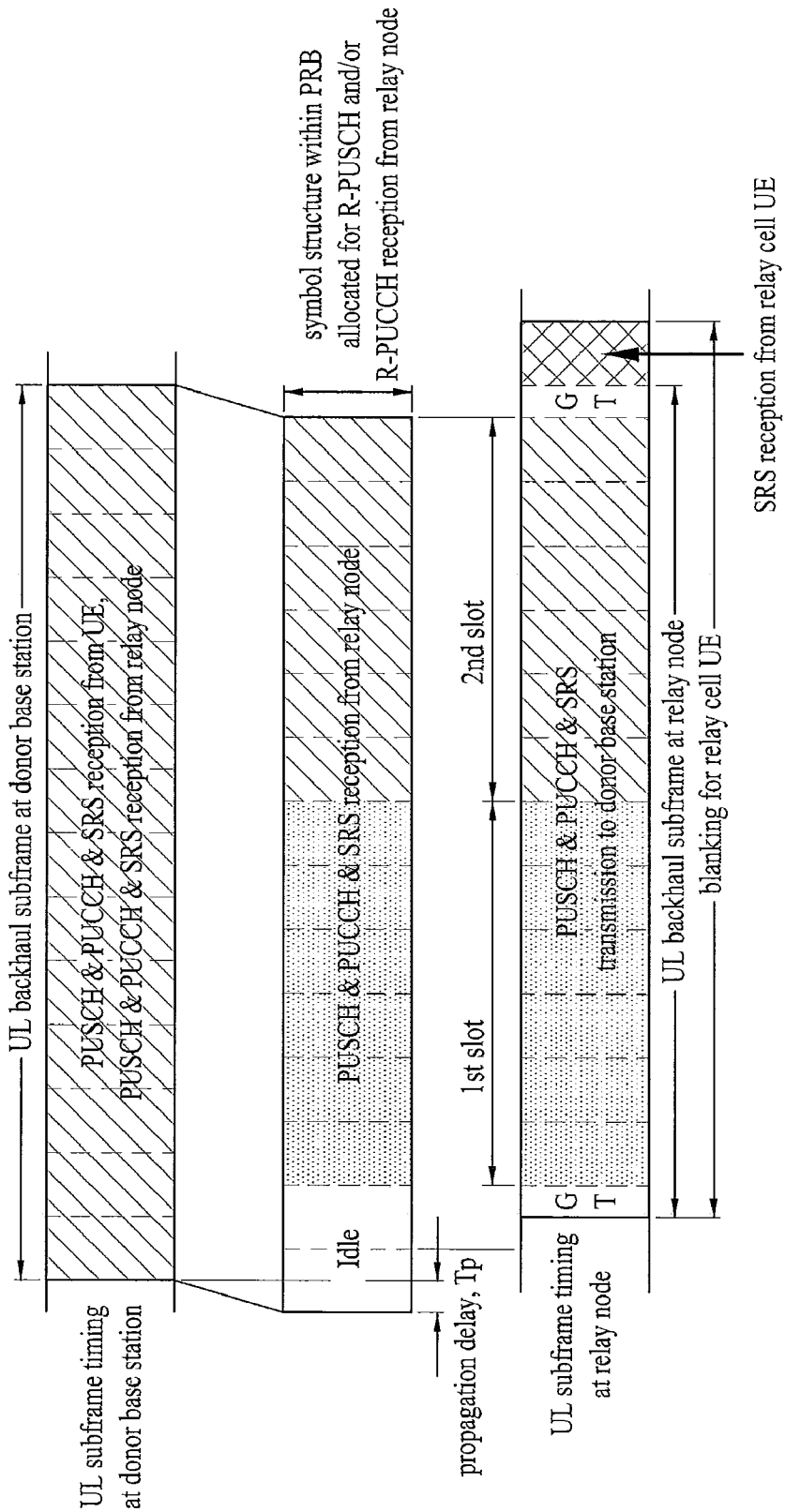

FIG. 48 and FIG. 49 are diagrams for further example of a symbol structure of PRB allocated for R-PUSCH or R-PUCCH transmission in a base station and an uplink backhaul transmission structure in a relay node.

Referring to FIG. 48, a UL subframe reception timing in an access link of a relay node is delayed by 1.5 symbol in comparison with FIG. 46. The relay node switches a last symbol to enter a reception mode through a guard time (GT) in advance and is then able to receive SRS of a relay cell user equipment through the last symbol. The relay node, as shown in FIG. 48, is able to transmit SRS to a base station through a last symbol of a $2^{nd}$ slot. In FIG. 48, the relay node is able to perform R-PUSCH or R-PUCCH transmission using 5 symbols in $1^{st}$ slot and 7 symbols in $2^{nd}$ slot. Thus, a slot structure in a UL backhaul subframe of the relay node can be asymmetric.

Referring to FIG. 49, a relay node is able to transmit SRS to a base station through a last symbol of a $2^{nd}$ slot. In FIG. 48, the relay node is able to transmit R-PUSCH or R-PUCCH to a base station using 5 symbols in $1^{st}$ slot and 7 symbols in $2^{nd}$ slot. Thus, unlike FIG. 48, a slot structure of a UL backhaul subframe of the relay node can be symmetric. Using the symmetric structure shown in FIG. 49, the relay node is able to transmit R-PUSCH or R-PUCCH to the base station suing 6 symbols in $1^{st}$ slot and 6 symbols in $2^{nd}$ slot.

FIG. 50 is a block diagram for a preferred configuration of a relay node device according to one embodiment of the present invention.

Referring to FIG. 50, a relay node includes a receiving module 5010, a transmitting module 5020, a processor 5030 and a memory 5040.

The receiving module 5010 of the relay node is able to receive various kinds of control information, data, signals and the like from a base station and a user equipment. In particular, the receiving module 5010 is able to receive control information and the like from the base station using a specific symbol duration in a specific subframe and is also able to receive a signal from the user equipment via a subframe different from the specific subframe.

The transmitting module 5020 of the relay node is able to transmit various kinds of control information, data, signals and the like to the base station, the user equipment and the like. The transmitting module 5020 of the relay node is able to transmit signals and the like to the base station using a specific subframe, and more particularly, a prescribed symbol duration in the specific subframe and is also able to transmit a signal and the like using a subframe different from the former subframe used for the transmission to the base station.

The processor 5030 is able to perform processing on various signals and informations received by the relay node or various signals and information to be transmitted by the relay node.

The memory 5040 is able to store information processed by the processor 5030, information received by the receiving module 5010 of the relay node and the like for a prescribed period of time and can be replaced by such a component as a buffer (not shown in the drawing) and the like.

Embodiments of the present invention can be implemented using various means. For instance, embodiments of the present invention can be implemented using hardware, firmware, software and/or any combinations thereof. In case of the implementation by hardware, a control information transmitting/receiving method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

And, it is apparently understandable that an embodiment is configured by combining claims failing to have relation of explicit citation in the appended claims together or can be included as new claims by amendment after filing an application.

INDUSTRIAL APPLICABILITY

Accordingly, a signal transmitting/receiving method of a relay node according to the present invention is applicable to various wireless communication systems such as IEEE 802.16m system, 3GPP LTE system and the like.

What is claimed is:

1. A method of transceiving signals at a relay node (RN) via a specific downlink subframe in a wireless communication system, the method comprising:
   selectively transmitting a physical downlink control channel (PDCCH) to at least one user equipment (UE) in a relay cell at a first timing point after a time corresponding to a propagation delay in accordance with a distance between a base station (BS) and the RN from a specific downlink subframe start timing point of the BS or at a second timing point after an elapse of a time corresponding to a prescribed delayed symbol from the first timing point; and
   receiving a relay-PDCCH (R-PDCCH) or a physical downlink shared channel (PDSCH) from the BS after elapse of a first guard time subsequent to an interval of the PDCCH,
   wherein a prescribed number of symbols are allocated to the PDCCH, and
   wherein a second guard time is allocated in continuation with the received R-PDCCH or the received PDSCH,
   wherein the first guard time corresponds to one of a 0.5 symbol duration, a 1 symbol duration, a 1.5 symbol duration, 2 symbol durations, 2.5 symbol durations and 3 symbol durations, and
   wherein the second guard time corresponds to a 0.5 symbol duration or a 1 symbol duration.

2. The method of claim 1, wherein the prescribed delayed symbol corresponds to a 0.5 or a 1 symbol duration.

3. The method of claim 1, wherein the prescribed number of the symbols is set to 1 or 2.

4. The method of claim 1, wherein the PDCCH transmitted to the at least one UE in the relay cell is allocated to 1 or 2 symbols.

5. The method of claim 1, wherein the R-PDCCH or the PDSCH received from the BS is allocated to one of 9 symbols, 10 symbols, 11 symbols and 12 symbols.

6. A method of transceiving signals at a relay node (RN) via a specific uplink backhaul subframe in a wireless communication system, the method comprising:

selectively transmitting at least one of a physical uplink shared channel (PUSCH), a physical uplink control channel (PUCCH) and a sounding reference signal (SRS) at a first timing point advancing a time corresponding to a propagation delay in accordance with a distance between a base station (BS) and the RN from a specific uplink backhaul subframe start timing point of the BS, at a second timing point after a prescribed delayed symbol duration from the first timing point, or at a third timing point after an elapse of a first guard time from the second timing point, wherein a prescribed number of symbols are allocated to the at least one of the PUSCH, the PUCCH and the SRS, wherein a second guard time is allocated to a last symbol of the specific uplink backhaul subframe or a symbol previous to the last symbol, wherein at least one the first timing point, second timing point or the third timing point corresponds to a second slot of the specific uplink backhaul subframe of the BS or a first slot of an uplink backhaul subframe subsequent to the specific uplink backhaul subframe of the BS, wherein the first guard time is a time corresponding to a 0.5 symbol or a 1 symbol; and wherein the second guard time corresponds to a 0.5 symbol duration or a 1 symbol duration.

7. The method of claim 6, wherein the prescribed delayed symbol corresponds to a 0.5 symbol duration or 1 symbol duration.

8. The method of claim 6, wherein the prescribed number of symbols allocated to the at least one of the PUSCH, the PUCCH and the SRS is 12 or 13 symbols.

9. The method of claim 8, further comprising:

receiving a UE SRS via a last symbol of the specific uplink backhaul subframe from at least one UE within a relay cell.

10. A relay node apparatus for transceiving signals via a specific downlink subframe in a wireless communication system, the relay node apparatus comprising:

a transmitting device configured to selectively transmit a physical downlink control channel (PDCCH) to at least one user equipment in a relay cell at a first timing point after a time corresponding to a propagation delay in accordance with a distance between a base station and the relay node from a specific downlink subframe start timing point of the base station or at a second timing point after an elapse of a time corresponding to a prescribed delayed symbol from the first timing point; and a receiving device configured to receive a relay-PDCCH (R-PDCCH) or a physical downlink shared channel (PDSCH) from the base station after an elapse of a first guard time subsequent to an interval of the PDCCH, wherein a prescribed number of symbols are allocated to the PDCCH, and wherein a second guard time is allocated in continuation with the received R-PDCCH or the received PDSCH, wherein the first guard time corresponds to one of a 0.5 symbol duration, a 1 symbol duration, a 1.5 symbol duration, 2 symbol durations, 2.5 symbol durations and 3 symbol durations, and wherein the second guard time corresponds to a 0.5 symbol duration or a 1 symbol duration.

11. A relay node apparatus for transceiving signals via a specific uplink backhaul subframe in a wireless communication system, the relay node apparatus comprising:

a transmitting device configured to selectively transmit at least one of a physical uplink shared channel (PUSCH), a physical uplink control channel (PUCCH) and a sounding reference signal (SRS) from a first timing point advancing a time corresponding to a propagation delay in accordance with a distance between a base station (BS) and the relay node from a specific uplink backhaul subframe start timing point of the BS, at a second timing point after a prescribed delayed symbol duration from the first timing point, or at a third timing point after an elapse of a first guard time from the second timing point, wherein a prescribed number of symbols are allocated to the at least one of the PUSCH, the PUCCH and the SRS, wherein a second guard time is allocated to a last symbol of the specific uplink backhaul subframe or a symbol previous to the last symbol, wherein at least one the first timing point, second timing point or the third timing point corresponds to a second slot of the specific uplink backhaul subframe of the BS or a first slot of an uplink backhaul subframe subsequent to the specific uplink backhaul subframe of the BS, wherein the first guard time is a time corresponding to a 0.5 symbol or a 1 symbol; and wherein the second guard time corresponds to a 0.5 symbol duration or a 1 symbol duration.

* * * * *